(12) United States Patent
Tsuzuki et al.

(10) Patent No.: US 8,725,393 B2
(45) Date of Patent: May 13, 2014

(54) PLANT CONTROL APPARATUS

(75) Inventors: Koichiro Tsuzuki, Wako (JP); Yuji Yasui, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 686 days.

(21) Appl. No.: 12/984,103

(22) Filed: Jan. 4, 2011

(65) Prior Publication Data
US 2011/0172897 A1   Jul. 14, 2011

(30) Foreign Application Priority Data
Jan. 14, 2010 (JP) ................................. 2010-006187

(51) Int. Cl.
*G06F 19/00* (2011.01)

(52) U.S. Cl.
USPC ............................................. 701/114; 700/29

(58) Field of Classification Search
USPC ........................ 701/99, 101, 114, 115; 700/29
See application file for complete search history.

(56) References Cited

U.S. PATENT DOCUMENTS

| 6,990,402 | B2 * | 1/2006 | Yasui et al. | 701/108 |
| 7,949,458 | B2 | 5/2011 | Yasui et al. | |
| 2004/0158387 | A1 * | 8/2004 | Yasui et al. | 701/108 |
| 2010/0324749 | A1 | 12/2010 | Iwamoto et al. | |

FOREIGN PATENT DOCUMENTS

| JP | 2002-180879 | 6/2002 |
| JP | 2005-120896 | 5/2005 |
| JP | 2009-162125 | 7/2009 |
| JP | 2009-190913 | 8/2009 |
| JP | 2009-275691 | 11/2009 |

OTHER PUBLICATIONS

Japanese Office Action for corresponding JP Application No. 2010-006187, Dec. 20, 2011.

* cited by examiner

*Primary Examiner* — John Kwon
(74) *Attorney, Agent, or Firm* — Ditthavong Mori & Steiner, P.C.

(57) ABSTRACT

A plant control apparatus includes a plant model and a control input determining device. The plant model estimates a control variable of a plant based on an input including a control parameter to adjust a first control variable of the plant. The control input determining device is configured to correct a temporary value of the control parameter so that a first control variable model value satisfies a predetermined constraint. The control input determining device is configured to determine a control input for the plant based on the temporary value of the control parameter that has been corrected. The first control variable model value is defined as an estimated value of the first control variable calculated by the plant model when the temporary value of the control parameter is input to the plant model.

20 Claims, 28 Drawing Sheets

FIG. 19

| | COMBUSTION MODEL CONTROLLER | MODEL ADAPTER | MODELING ERROR |
|---|---|---|---|
| CONDITION 1 | ON | OFF | OFF |
| CONDITION 2 | ON | OFF | ON |
| CONDITION 3 | ON | ON | ON |

BACKGROUND ART

PLANT CONTROL APPARATUS

CROSS-REFERENCE TO RELATED APPLICATIONS

The present application claims priority under 35 U.S.C. §119 to Japanese Patent Application No. 2010-006187, filed Jan. 14, 2010, entitled "Plant Control Apparatus". The contents of this application are incorporated herein by reference in their entirety.

BACKGROUND OF THE INVENTION

1. Field of the Invention

The present invention relates to a plant control apparatus.

2. Description of the Related Art

Existing control methods for a gasoline engine and a diesel engine set the optimum ignition timing and the optimum fuel injection timing in accordance with an engine speed, an air-fuel ratio, and the like so as to maximize the performance of the engine. It is known that the ignition timing and the injection timing are correlated with the maximum value of the cylinder pressure in each combustion cycle (hereinafter referred to as the maximum cylinder pressure). In order to prevent overloading of the engine, the maximum cylinder pressure is controlled so as not to exceed a predetermined upper limit.

FIG. 30 is a schematic graph illustrating the relationship between the ignition (injection) timing and the engine power and the relationship between the ignition (injection) timing and the maximum cylinder pressure. When the ignition (injection) timing is advanced, the power increases. However, the maximum cylinder pressure also increases. Therefore, if the ignition (injection) timing is set at the optimum timing (minimum advance for the best torque (MBT)), at which the power is at the maximum as illustrated FIG. 30, the maximum cylinder pressure may exceed the upper limit, which is determined in accordance with the strength of the engine block. In such a case, it is necessary to retard the ignition (injection) timing so that the maximum cylinder pressure does not exceed the upper limit. To prevent the maximum cylinder pressure from exceeding the upper limit with existing techniques, the ignition (injection) timing is set at a level having a predetermined margin with respect to the upper limit. This margin is determined with consideration of a production variation of the engine, a variation among cylinders, and a variation in environment. By making the margin with respect to the upper limit larger, overloading of the engine is more reliably reduced, whereas the power of the engine may decrease and the weight of the engine may increase.

Japanese Unexamined Patent Application Publication No. 2002-180879 describes a technology for controlling the maximum cylinder pressure so that the strength of the engine block can be fully exploited. This technology adjusts the fuel supply quantity, the ignition (injection) timing, and the like by monitoring the cylinder pressure of the engine using a cylinder pressure sensor. To be specific, a threshold that is lower than the upper limit is set, and if the value of the maximum cylinder pressure detected by the cylinder pressure sensor exceeds the threshold, the maximum cylinder pressure is controlled to be equal to or lower than the upper limit by reducing the fuel supply quantity.

However, when the value of the cylinder pressure is detected by the cylinder pressure sensor as described above and the maximum cylinder pressure is controlled to be equal to or lower than the upper limit by using a feedback control algorithm, a control delay inevitably occurs in the maximum cylinder pressure because the ignition (injection) timing that is calculated based on the present combustion cycle is used in the next combustion cycle. Therefore, for example, the maximum cylinder pressure may temporarily exceed the upper limit, or conversely, the power may decrease because control may be performed so as to unnecessarily reduce the maximum cylinder pressure. Such phenomena, which are against the driver's intention, often occur in a transient driving state. Accordingly, with existing technologies, the strength of the engine block is not maximally utilized, because it is necessary to control the maximum cylinder pressure to be sufficiently lower than the upper limit.

Heretofore, a problem due to a control delay in a control variable has been described by using the control of the maximum cylinder pressure of an engine as an example. However, the same problem related to a control delay may also arise when performing feedback control so as to limit a control variable of an engine to be equal to or lower than an upper limit.

SUMMARY OF THE INVENTION

According to one aspect of the present invention, a plant control apparatus includes a plant model and a control input determining device. The plant model estimates a control variable of a plant based on an input including a control parameter to adjust a first control variable of the plant. The control input determining device is configured to correct a temporary value of the control parameter so that a first control variable model value satisfies a predetermined constraint. The control input determining device is configured to determine a control input for the plant based on the temporary value of the control parameter that has been corrected. The first control variable model value is defined as an estimated value of the first control variable calculated by the plant model when the temporary value of the control parameter is input to the plant model.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 19 is table illustrating the contents of a condition 1, a condition 2, and a condition 3;

DESCRIPTION OF THE EMBODIMENTS

Figure 1:
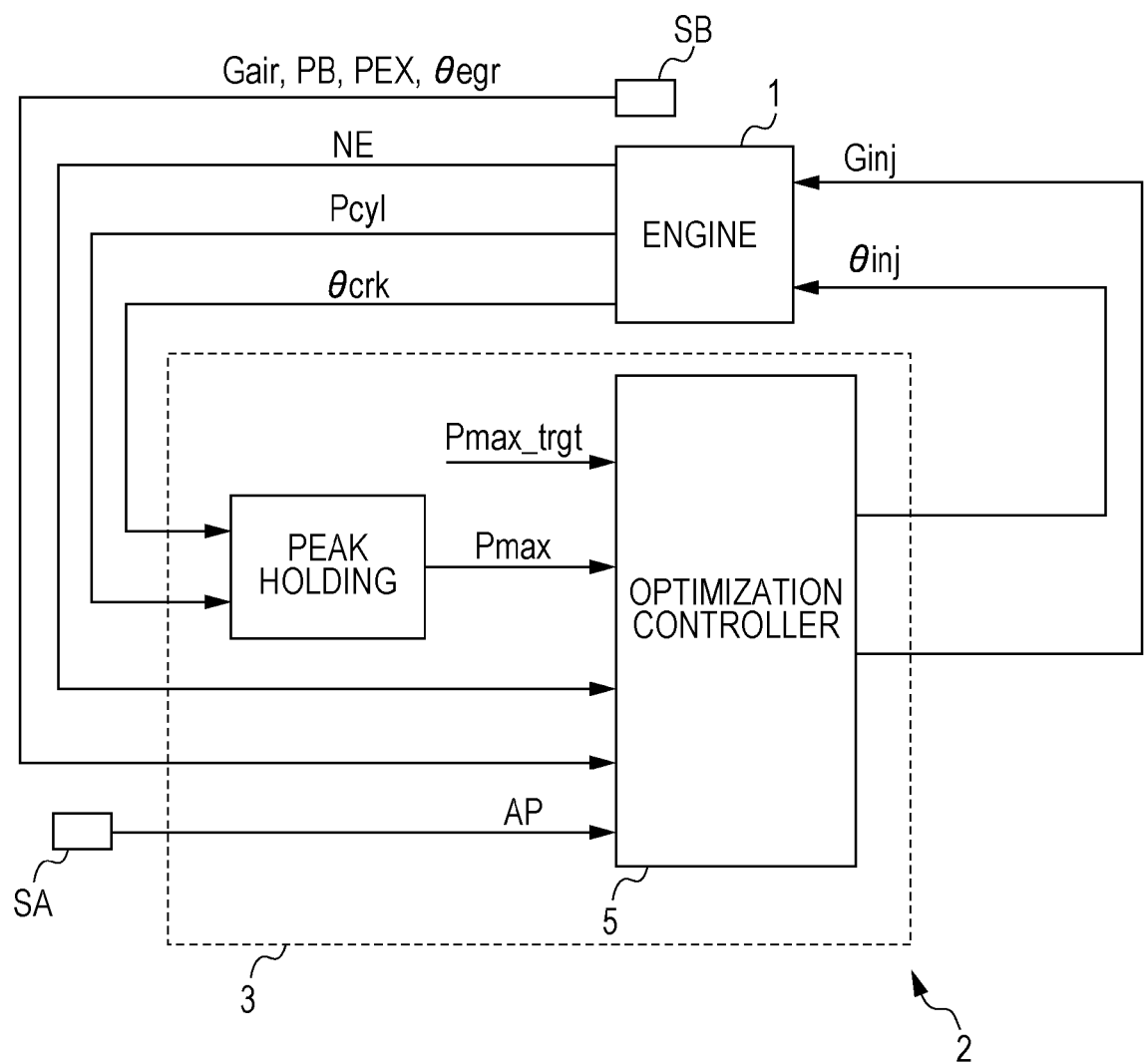
FIG. 1 is a block diagram of an engine and a control device for the engine according to a first embodiment of the present invention.

The embodiments will now be described with reference to the accompanying drawings, wherein like reference numerals designate corresponding or identical elements throughout the various drawings.

First Embodiment

Hereinafter, a first embodiment of the present invention will be described with reference to the drawings. FIG. 1 is a block diagram of an internal combustion engine 1 (hereinafter referred to as an engine), which corresponds to a plant, and a control device 2 for the engine 1 according to the present embodiment.

The engine 1 is a lean burn gasoline or diesel engine that is mounted in a vehicle (not shown). The engine 1 has a plurality of cylinders. For each cylinder, a fuel injection valve for injecting fuel into the combustion chamber of the cylinder is provided.

The control device 2 includes a crank angle sensor (not shown), a cylinder pressure sensor (not shown), and an electronic control unit 3 (hereinafter referred to as an ECU). The crank angle sensor detects the rotation angle of the crankshaft of the engine 1. The cylinder pressure sensor detects the cylinder pressure of the engine 1. The ECU 3 determines a fuel injection quantity Ginj and a fuel injection timing θinj, which are input to the fuel injection valve of the engine 1 for each combustion cycle, based on a pulse signal (hereinafter referred to as a crank angle signal θcrk) that is output from the crank angle sensor and a detection value of the cylinder pressure sensor (hereinafter referred to as a cylinder pressure detection value Pcyl). The control device 2 further includes an accelerator sensor SA, which is connected to the ECU 3, and miscellaneous sensors SB.

One combustion cycle of the engine 1 corresponds to an increase of 720 degrees in the crank angle signal θcrk. An engine speed NE of the engine 1 is calculated by the ECU 3 based on the crank angle signal θcrk. The maximum cylinder pressure Pmax in each combustion cycle of the engine 1 is detected by peak holding the cylinder pressure detection value Pcyl based on the crank angle signal θcrk over the combustion cycle.

The accelerator sensor SA detects an accelerator opening AP, which is the degree to which the accelerator pedal is depressed, and outputs a signal that is substantially proportional to the accelerator opening AP to the ECU 3. The miscellaneous sensors SB include, for example, an airflow sensor, an intake pressure sensor, an exhaust pressure sensor, and an EGR valve opening sensor. The airflow sensor detects an air intake quantity Gair, which is the quantity of air that is taken into the engine 1, and outputs a signal that is substantially proportional to the air intake quantity Gair to the ECU 3. The intake pressure sensor detects an intake air pressure PB in the air intake manifold of the engine, and outputs a signal that is substantially proportional to the intake air pressure PB to the ECU 3. The exhaust pressure sensor detects an exhaust pressure PEX in the exhaust manifold of the engine, and outputs a signal that is substantially proportional to the exhaust pressure PEX to the ECU 3. The EGR valve opening sensor detects an EGR valve opening θegr, which is the degree to which an EGR valve (a valve that opens and closes an exhaust gas recirculation passage of the engine) is open (the "lift" of the valve), and outputs a signal that is substantially proportional to the EGR valve opening θegr to the ECU 3.

The ECU 3 includes an input circuit and a central processing unit (hereinafter referred to as a CPU). The input circuit shapes the waveforms of input signals from the sensors, corrects the voltage of the input signals to predetermined levels, converts analog signals to digital signals, and performs other functions. The ECU 3 further includes a storage circuit and an output circuit. The storage circuit stores calculation programs that are executed by the CPU and calculation results. The output circuit outputs control signals to the fuel injection valves and other components of the engine 1.

The ECU 3, which has the hardware structure described above, includes an optimization controller 5 that determines the optimum fuel injection quantity Ginj and the optimum fuel injection timing θinj so that the maximum cylinder pressure Pmax does not exceed a predetermined target maximum cylinder pressure Pmax_trgt based on the inputs from the sensors. Hereinafter, the structure of the optimization controller 5 will be described in detail.

1. Optimization Controller

Figure 2:
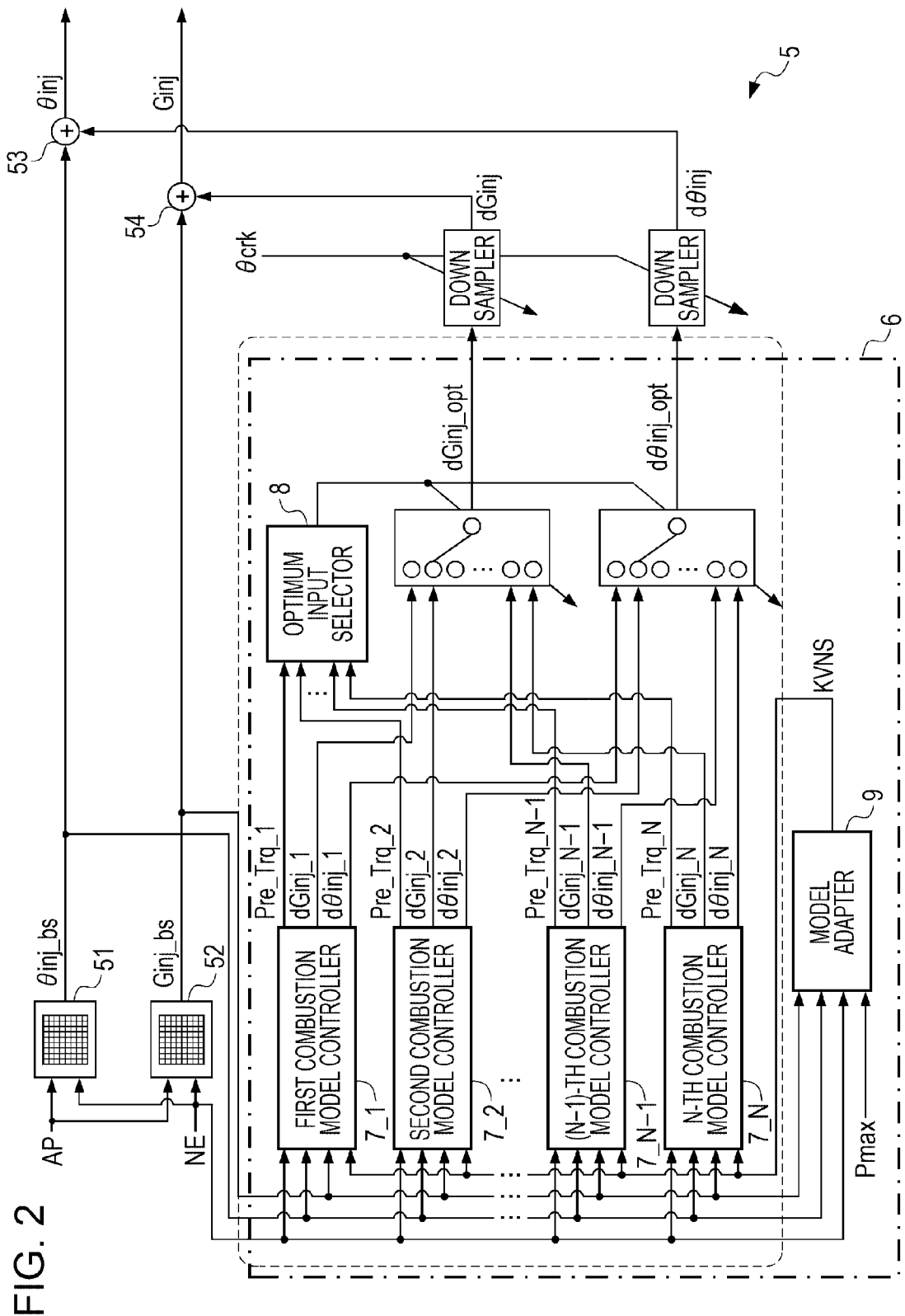
FIG. 2 is a block diagram of an optimization controller according to the first embodiment.

FIG. 2 is a block diagram of the optimization controller 5. As illustrated in FIG. 2, the optimization controller 5 includes a basic injection timing calculator 51, a basic injection quantity calculator 52, a correction value calculator 6, and adders 53 and 54. The basic injection timing calculator 51 calculates a basic fuel injection timing θinj_bs. The basic injection quantity calculator 52 calculates a basic fuel injection quantity Ginj_bs. The correction value calculator 6 calculates a fuel injection timing correction value dθinj and a fuel injection quantity correction value dGinj. The adders 53 and 54 respectively add the correction values dθinj and dGinj to the basic values θinj_bs and Ginj_bs.

The optimization controller 5 calculates the fuel injection timing θinj(k) by adding the basic fuel injection timing θinj_bs(k), which is calculated by the basic injection timing calculator 51, and the fuel injection timing correction value dθinj(k), which is calculated by the correction value calculator 6, by using the adder 53 (see the following expression (1-1)).

$$\theta inj(k) = \theta inj\_bs(k) + d\theta inj(k) \quad (1\text{-}1)$$

The optimization controller 5 calculates the fuel injection quantity Ginj(k) by adding the basic fuel injection quantity Ginj_bs(k), which is calculated by the basic injection quantity calculator 52, and the fuel injection quantity correction value dGinj(k), which is calculated by the correction value calculator 6, by using the adder 54 (see the following expression (1-2)).

$$Ginj(k) = Ginj\_bs(k) + dGinj(k) \quad (1\text{-}2)$$

The basic injection timing calculator 51 calculates a driver requested torque TRQ_DRV by performing a search in a predetermined map based on the engine speed NE and the accelerator opening AP. Moreover, the basic injection timing calculator 51 calculates the basic fuel injection timing θinj_bs (k) by performing a search in a control map (not shown) based on the driver requested torque TRQ_DRV and the engine speed NE. The basic injection quantity calculator 52 calculates a driver requested torque TRQ_DRV by performing a search in a predetermined map based on the engine speed NE and the accelerator opening AP. Moreover, the basic injection timing calculator 51 calculates the basic injection quantity Ginj_bs(k) by performing a search in a control map (not shown) based on the driver requested torque TRQ_DRV and the engine speed NE.

In the optimization controller 5, different blocks perform calculations at different cycles in order to calculate the optimum fuel injection timing θinj and the optimum fuel injection quantity Ginj for each combustion cycle. The basic injection timing calculator 51, the basic injection quantity calculator 52, and the adders 53 and 54 perform calculations at a calculation cycle Tk that is the same as the combustion cycle of an actual engine, i.e., for every 720 degrees advance of the crank angle signal θcrk. In the present embodiment, the calculation values that are updated at the calculation cycle Tk are denoted by adding "k", as illustrated in the expressions (1-1) and (1-2).

In contrast, as described below in detail, in the blocks of the correction value calculator 6 surrounded by a broken line in FIG. 2, calculations are performed at a cycle that is shorter than the calculation cycle Tk that synchronizes with the combustion cycle of an actual engine. Therefore, the optimum fuel injection timing correction value Dθinj_opt and the optimum fuel injection quantity correction value dGinj_opt, which are calculated by the correction value calculator 6, are downsampled at the calculation cycle Tk based on the crank angle signal θcrk so as to be used as the fuel injection timing correction value dθinj and the fuel injection quantity correction value dGinj.

The correction value calculator 6 includes N combustion model-based controllers 7_1 to 7_N, an optimum input selector 8, and a model adapter 9. The model adapter 9 adaptively corrects the combustion models, which are included in the combustion model-based controllers 7_1 to 7_N as described below, in accordance with a variation in the characteristics of the engine.

The combustion model-based controllers 7_1 to 7_N of the correction value calculator 6 predict whether or not a predetermined constraint on the maximum cylinder pressure Pmax is satisfied by inputting the basic fuel injection timing θinj_bs and the basic fuel injection quantity Ginj_bs, which have been calculated by performing a search in the map as described above, to the combustion models. If it is predicted that the maximum cylinder pressure does not satisfy the constraint, the combustion model-based controllers 7_1 to 7_N calculate sets of correction values (dθinj_1, dGinj_1) to (dθinj_N, dGinj_N) for the set of basic values (θinj_bs, Ginj_bs). The optimum input selector 8 selects the optimum set of values from the sets (dθinj_1, dGinj_1) to (dθinj_N, dGinj_N), and calculates the optimum fuel injection timing correction value dθinj_opt and the optimum fuel injection quantity correction value dGinj_opt based on the optimum set of values that has been selected.

Next, the structure of the combustion model provided in each of the combustion model-based controllers 7_1 to 7_N and the model adapter 9 will be described in detail, and then the structures of the combustion model-based controllers 7_1 to 7_N, the model adapter 9, and the optimum input selector 8 of the correction value calculator 6 will be described.

2. Combustion Model

Referring to FIGS. 3 to 10, the structure of the combustion model of the engine will be described in detail. Two combustion models are used in the present embodiment: a maximum cylinder pressure combustion model estimates the maximum cylinder pressure based on a predetermined input, and a torque combustion model estimates the torque of an engine based on a predetermined input. The maximum cylinder pressure combustion model will be described first, and thereafter the torque combustion model will be described.

2-1. Maximum Cylinder Pressure Combustion Model

As will be described below in detail, the correlation between an input and an output of a combustion model is adaptively corrected in accordance with a variation in the characteristics of an actual engine due to production variation or deterioration of the engine. The adaptive correction of the combustion model is performed by inputting an adaptive correction coefficient KVNS, which is calculated by the model adapter 9 (see FIG. 2), to the combustion model. Combustion models are classified into an output-correction type (see FIG. 3) and an input-correction type (see FIG. 6) according to the way the adaptive correction coefficient KVNS is input to the combustion model. As will be described below in detail, the combustion model calculates an estimated value of the maximum cylinder pressure based on an output of a neural network. In order to calculate the estimated value of the maximum cylinder pressure, the combustion model may include two types of neural networks: a neural network configured to output a value corresponding to a cylinder pressure for each predetermined crank angle (cylinder pressure estimation neural network), and a neural network configured to output a value corresponding to the maximum cylinder pressure for each combustion cycle (maximum cylinder pressure estimation neural network). Hereinafter, four types of combustion models will be described: first, an output-correction type maximum cylinder pressure combustion model including a cylinder pressure estimation neural network; second, an input-correction type maximum cylinder pressure combustion model including a cylinder pressure estimation neural network; third, an output-correction type maximum cylinder pressure combustion model including a maximum cylinder pressure estimation neural network; and fourth, an input-correction type maximum cylinder pressure combustion model including a maximum cylinder pressure estimation neural network.

2-1-1. Output-Correction Type Maximum Cylinder Pressure Combustion Model (Example of Using Cylinder Pressure Estimation Neural Network)

Figure 3:
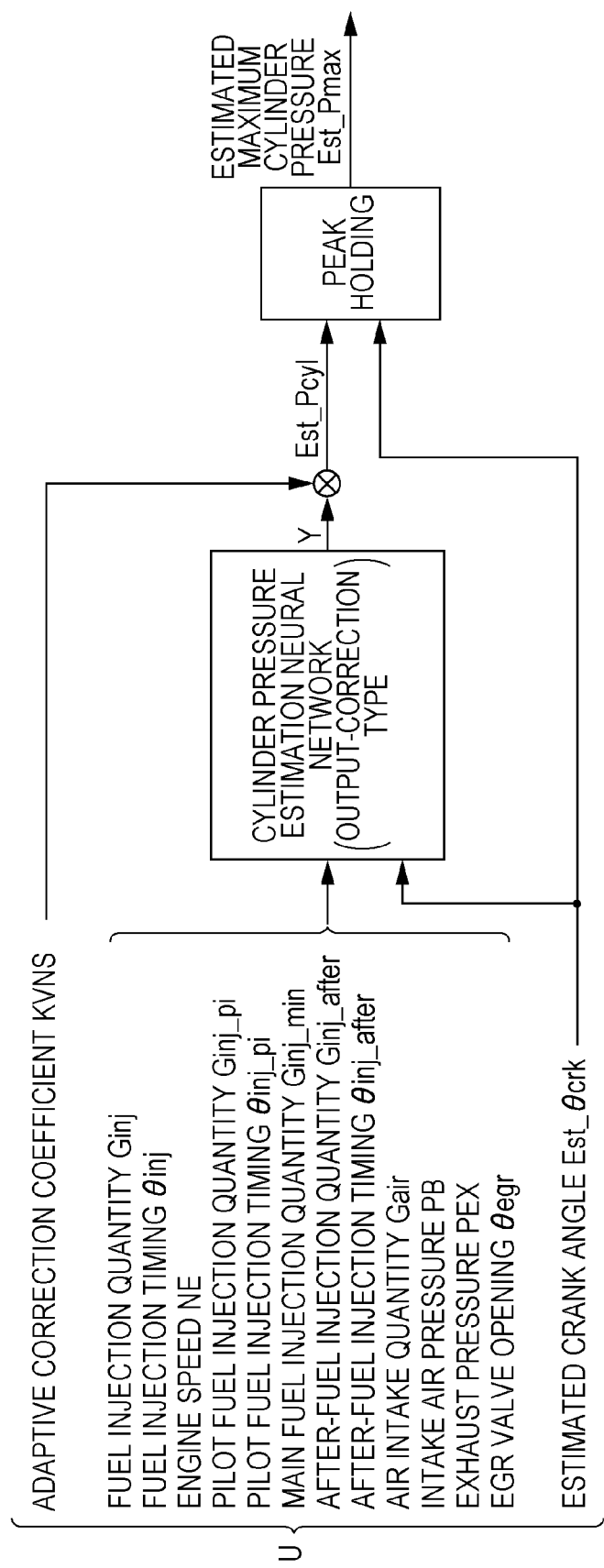
FIG. 3 is a block diagram of an output-correction type maximum cylinder pressure combustion model including a cylinder pressure estimation neural network according to the first embodiment.

FIG. 3 is a block diagram of an output-correction type maximum cylinder pressure combustion model including a cylinder pressure estimation neural network. The maximum cylinder pressure combustion model calculates an estimated maximum cylinder pressure Est_Pmax based on an input vector U. The components of the input vector U are a plurality of parameters correlated with the cylinder pressure (a fuel injection quantity Ginj, a fuel injection timing $\theta$inj, an engine speed NE, a pilot fuel injection quantity Ginj_pi, a pilot fuel injection timing $\theta$inj_pi, a main fuel injection quantity Ginj_min, an after-fuel injection quantity Ginj_after, an after-fuel injection timing $\theta$inj_after, an air intake quantity Gair, an intake air pressure PB, an exhaust pressure PEX, and an EGR valve opening $\theta$egr) and an estimated crank angle Est_$\theta$crk.

The main fuel injection quantity Ginj_min, which is one of the components of the input vector U, represents the fuel injection quantity of main injection that is performed to make the engine produce power. The fuel injection timing $\theta$inj represents the timing at which the main injection is performed. The pilot fuel injection quantity Ginj_pi represents the fuel injection quantity of pilot injection, which is performed before the main injection. The pilot fuel injection timing $\theta$inj_pi represents the timing at which the pilot injection is performed. The after-fuel injection quantity Ginj_after represents the fuel injection quantity of after-injection, which is performed after the main injection. The after-fuel injection timing $\theta$inj_after represents the timing at which the after-injection is performed. As shown in the following expression (2-1), the sum of the injection quantities Ginj_pi, Ginj_min, and Ginj_after is equal to the fuel injection quantity Ginj.

$$Ginj(k)=Ginj\_pi(k)+Ginj\_\min(k)+Ginj\_after(k) \quad (2\text{-}1)$$

The estimated crank angle Est_$\theta$crk, which is one of the components of the input vector U, is not the crank angle of an actual engine. Instead, the estimated crank angle Est_$\theta$crk is the crank angle of an imaginary engine of the combustion model, and is calculated in the combustion model. As shown in the following expression (2-2), the estimated crank angle Est_$\theta$crk is advanced by a crank angle resolution d$\theta$crk_est at each predetermined calculation cycle that is set in the combustion model, and is reset when the estimated crank angle Est_$\theta$crk exceeds 720 degrees. Calculation values that are updated at the calculation cycle of the maximum cylinder pressure combustion model will be denoted by "tp". The crank angle resolution d$\theta$crk_est is set, for example, in the range of 2 to 6 degrees.

$$\text{Est}\_\theta crk(tp) = \begin{cases} \text{Est}\_\theta crk(tp-1) + d\theta crk\_est \\ (\text{Est}\_\theta crk(tp-1) + d\theta crk\_est < 720) \\ \text{Est}\_\theta crk(tp-1) + d\theta crk\_est - 720 \\ (\text{Est}\_\theta crk(tp-1) + d\theta crk\_est \geq 720) \end{cases} \quad (2\text{-}2)$$

The relationship between the calculation cycle of the combustion model and the calculation cycle Tk, which is synchronized with the combustion cycle of the actual engine, is appropriately set for each block (the model adapter, the combustion model-based controller, or the like) to which the combustion model is applied.

As illustrated in FIG. 3, the output-correction type maximum cylinder pressure combustion model includes a cylinder pressure estimation neural network that is configured to estimate the cylinder pressure. The input vector U for the output-correction type combustion model is defined by the following expression (2-3).

$$U(tp) = \begin{bmatrix} U1(tp) \\ U2(tp) \\ U3(tp) \\ U4(tp) \\ U5(tp) \\ U6(tp) \\ U7(tp) \\ U8(tp) \\ U9(tp) \\ U10(tp) \\ U11(tp) \\ U12(tp) \end{bmatrix} = \begin{bmatrix} Ginj(k) \\ \theta inj(k) \\ NE(k) \\ Ginj\_pi(k) \\ \theta inj\_pi(k) \\ Ginj\_after(k) \\ \theta inj\_after(k) \\ Gair(k) \\ PB(k) \\ PEX(k) \\ \theta egr(k) \\ \text{Est}\_\theta crk(tp) \end{bmatrix} \quad (2\text{-}3)$$

As shown in the following expression (2-4), an estimated cylinder pressure Est_Pcyl at the estimated crank angle Est_$\theta$crk is defined as the product of an output Y, which is obtained by inputting the input vector U to the cylinder pressure estimation neural network, and the adaptive correction coefficient KVNS.

$$\text{Est}\_Pcyl(tp)=KVNS(k)Y(tp) \quad (2\text{-}4)$$

The estimated cylinder pressure Est_Pcyl is subjected to peak holding over one combustion cycle (estimated crank angle Est_$\theta$crk=0 to 720 degrees) of the combustion model to calculate the estimated maximum cylinder pressure Est_Pmax.

Est_Pmax(tp)←Hold the maximum value of the estimated cylinder pressure EST_Pcyl in one combustion cycle(Est_$\theta$crk=0 to 720 degrees). (2-5)

Instead of the expression (2-4) above, as shown in the following expression (2-6), the estimated cylinder pressure Est_Pcyl at the estimated crank angle Est_$\theta$crk may be defined as the sum of the output Y of the cylinder pressure estimation neural network and the adaptive correction coefficient KVNS.

$$\text{Est}\_Pcyl(tp) = KVNS(k) + Y(tp) \qquad (2\text{-}6)$$

Figure 4:
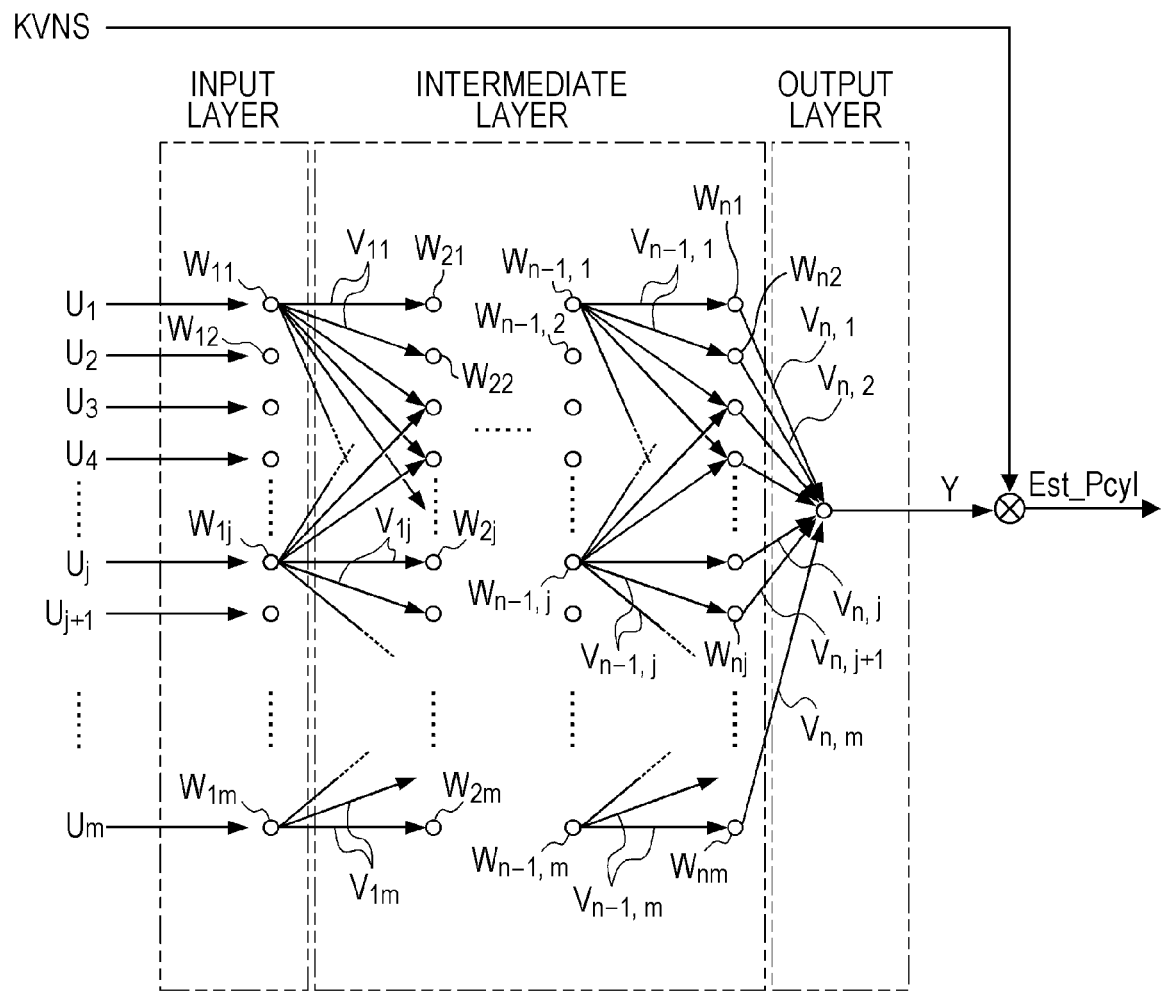
FIG. 4 illustrates the structure of the cylinder pressure estimation neural network.

FIG. 4 illustrates the structure of the cylinder pressure estimation neural network. This neural network includes a plurality of neurons that are connected to each other, and each of the neurons outputs a value in accordance with a predetermined function. When the input vector U(tp) having m components is input to the neural network, the neural network outputs an output Y(tp). As illustrated in FIG. 4, the neural network is a multilayer neural network that includes an input layer, an intermediate layer, and an output layer. The input layer includes m neurons $W_{1j}$ (j=1 to m), which correspond to m components of the input vector U(tp). The intermediate layer includes m×(n−1) neurons $W_{ij}$ (i=2 to n, j=1 to m). The output layer includes one neuron Y.

Input layer: $W_{1j}$ (j=1, 2, ..., m)
Intermediate layer: $W_{ij}$ (i=2, 3, ..., n; j=1, 2, ..., m)
Output layer: Y The operations of the m neurons $W_{1j}$ (j=1 to m) of the input layer will be described. Signals $T_{1j}(tp)$ are input to the neurons W1j of the input layer. As shown in the following expression (2-7), the j-th component $U_j(tp)$ of the input vector U(tp) is used as the input signal $T_{1j}(tp)$.

$$T_{1j}(tp) = U_j(tp)(j=1,2,\ldots,m) \qquad (2\text{-}7)$$

Each of the neurons $W_{1j}$ of the input layer is connected to the m neurons $W_{2j}$ (j=1 to m) of the intermediate layer with predetermined weights, and the neuron $W_{1j}$ outputs a signal $V_{1j}(tp)$ to the m neurons $W_{2j}$. That is, as shown in the following expressions (2-8) and (2-9), the neuron $W_{1j}$ outputs the signal $V_{1j}(tp)$, which is determined by the input signal $T_{1j}(tp)$ in accordance with a sigmoid function f(x), to the m neurons $W_{2j}$.

$$v_{1j}(tp) = f(T_{1j}(tp)) \qquad (2\text{-}8)$$
$$(j = 1, 2, \ldots, m)$$

$$f(x) = \frac{1}{1 + \exp(-\beta x)} + \varepsilon \qquad (2\text{-}9)$$

Figure 5:
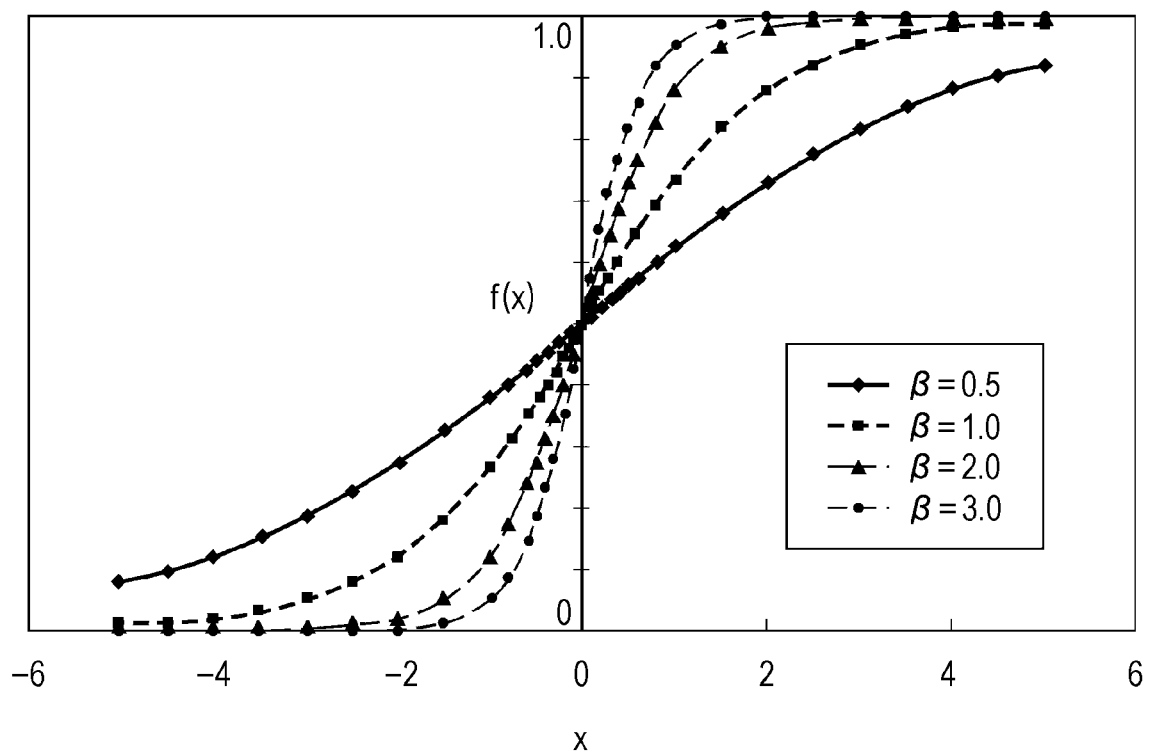
FIG. 5 is a graph of a sigmoid function.

FIG. 5 is a graph of the sigmoid function f(x). FIG. 5 illustrates the cases where $\varepsilon=0$ and $\beta=0.5, 1.0, 2.0,$ and $3.0$ in the expression (2-9). The range of the sigmoid function f(x) is [$\varepsilon, \varepsilon+1$]. As illustrated in FIG. 5, as the coefficient $\beta$ becomes larger, the sigmoid function f(x) becomes closer to a step function centered at x=0.

In the expression (2-9), the coefficient $\beta$ represents the slope gain of the sigmoid function f(x), and the coefficient $\varepsilon$ represents the offset value of the sigmoid function f(x). The slope gain $\beta$ is set by learning of a neural network described below. The offset value $\varepsilon$ is set by learning of a neural network described below, or is preset at a predetermined value.

The operations of the (n−1)×m neurons $W_{ij}$ (i=2 to n, j=1 to m) of the intermediate layer will be described. Neurons connected to the neuron $W_{ij}$ (i=2 to n, j=1 to m) of the intermediate layer output m signals $V_{i-1,j}$ (j=1 to m). The sum of the products of the m signals $V_{i-1,j}$ (j=1 to m) and predetermined weights $\omega_{i-1,j}$ (j=1 to m) is input to the neuron $W_{ij}$ (i=2 to n, j=1 to m). Thus, the signal $T_{ij}(tp)$ shown in the following expression (2-10) is input to the neuron $W_{ij}$ of the intermediate layer.

$$T_{ij}(tp) = \sum_{k=1}^{m} \omega_{i-1,k}(tp) V_{i-1,k}(tp) \qquad (2\text{-}10)$$

$$(i = 2, 3, \ldots, n, \quad j = 1, 2, \ldots, m)$$

The neurons of the intermediate layer excluding m neurons that are connected to the output layer, i.e., (n−2)×m neurons $W_{ij}$ (i=2 to n−1, j=1 to m), are connected to m neurons $W_{i+1,j}$ (j=1 to m) of the intermediate layer with weights $\omega_{ij}$, and output signals $V_{ij}(tp)$ to the neurons $W_{i+,j}$. As shown in the following expression (2-11), the neurons $W_{ij}$ (i=2 to n−1, j=1 to m) output signals $V_{ij}(tp)$, which are determined by the input signals $T_{ij}(tp)$ in accordance with the sigmoid function f(x), to the m neurons $W_{i+1,j}$.

$$V_{ij}(tp) = f(T_{ij}(tp))(j=1,2,\ldots,m) \qquad (2\text{-}11)$$

Moreover, m neurons $W_{nj}$ (j=1 to m) of the intermediate layer are connected to the neuron Y of the output layer with weights $\omega_{nj}$, and output signals $V_{nj}(tp)$ to the neuron Y of the output layer. That is, as shown in the following expression (2-12), the neurons $W_{nj}$ (j=1 to m) output signals $V_{nj}(tp)$, which are determined by the input signals $T_{nj}(tp)$ in accordance with the sigmoid function f(x), to the neuron Y.

$$V_{nj}(tp) = f(T_{nj}(tp))(j=1,2,\ldots,m) \qquad (2\text{-}12)$$

Next, the operation of the neuron Y of the output layer will be described. The neurons of the intermediate layer that are connected to the neuron Y output m signals $V_{n,j}$ (j=1 to m), and the sum of the products of the m signals $V_{n,j}$ and predetermined weights $\omega_{n,j}$ (j=1 to m) is input to the neuron Y of the output layer. Therefore, a signal T(tp) shown in the following expression (2-13) is input to the neuron Y of the output layer.

$$T(tp) = \sum_{k=1}^{m} \omega_{n,k}(tp) V_{n,k}(tp) \qquad (2\text{-}13)$$

As shown in the following expressions (2-14) and (2-15), the neuron Y of the output layer outputs a signal Y(tp), which is determined by the input signal T(tp) in accordance with a sigmoid function g(x).

$$Y(tp) = g(T(tp)) \qquad (2\text{-}14)$$

$$g(x) = \frac{\alpha}{1 + \exp(-\gamma x)} + \delta \qquad (2\text{-}15)$$

The behavior of the sigmoid function g(x) is similar to that of the function f(x) illustrated in FIG. 5 except that the range of g(x) is [$\delta, \delta+\alpha$]. In the expression (2-15), the coefficient $\gamma$ represents the slope gain of the sigmoid function g(x), and the coefficient $\delta$ represents the offset value of the sigmoid function g(x). The coefficient $\alpha$ represents the output gain, which is used for setting the range of the output of the neural network. The slope gain $\gamma$ and the output gain $\alpha$ are set by learning of the neural network described below. The offset value $\delta$ is set by learning of the neural network described below, or preset at a predetermined value.

Learning of the neural network having the structure described above is performed as follows. Data representing the correlations between the cylinder pressure and the components (Ginj, θinj, NE, Ginj_pi, θinj_pi, Ginj_min, Ginj_after, θinj_after, Gair, PB, PEX, θegr, θcrk) of the input U in the expression (2-3) is obtained based on an actual engine. The gains (α, β, γ, δ, ε) of the functions f(x) and g(x) for neurons and the weights $\omega_{ij}$ (i=1 to n, j=1 to m), which represent the strengths of the connections between the neurons, are set so that the estimated cylinder pressure Est_Pcyl calculated based on the input U becomes equal to the value of the above data. As will be described below in detail, the value of the adaptive correction coefficient KVNS is set at 1 if the engine is new or normal in terms of variation. In this case, the data representing the correlation between the input U and the cylinder pressure is obtained based on an actual new engine that corresponds to the adaptive correction coefficient KVNS of 1. A known method is used as a learning algorithm of the neural network. Examples of such an algorithm include a learning algorism, such as backpropagation, and an optimization algorithm, such as a genetic algorithm.

2-1-2. Input-Correction Type Maximum Cylinder Pressure Combustion Model (Example of Using Cylinder Pressure Estimation Neural Network)

Figure 6:
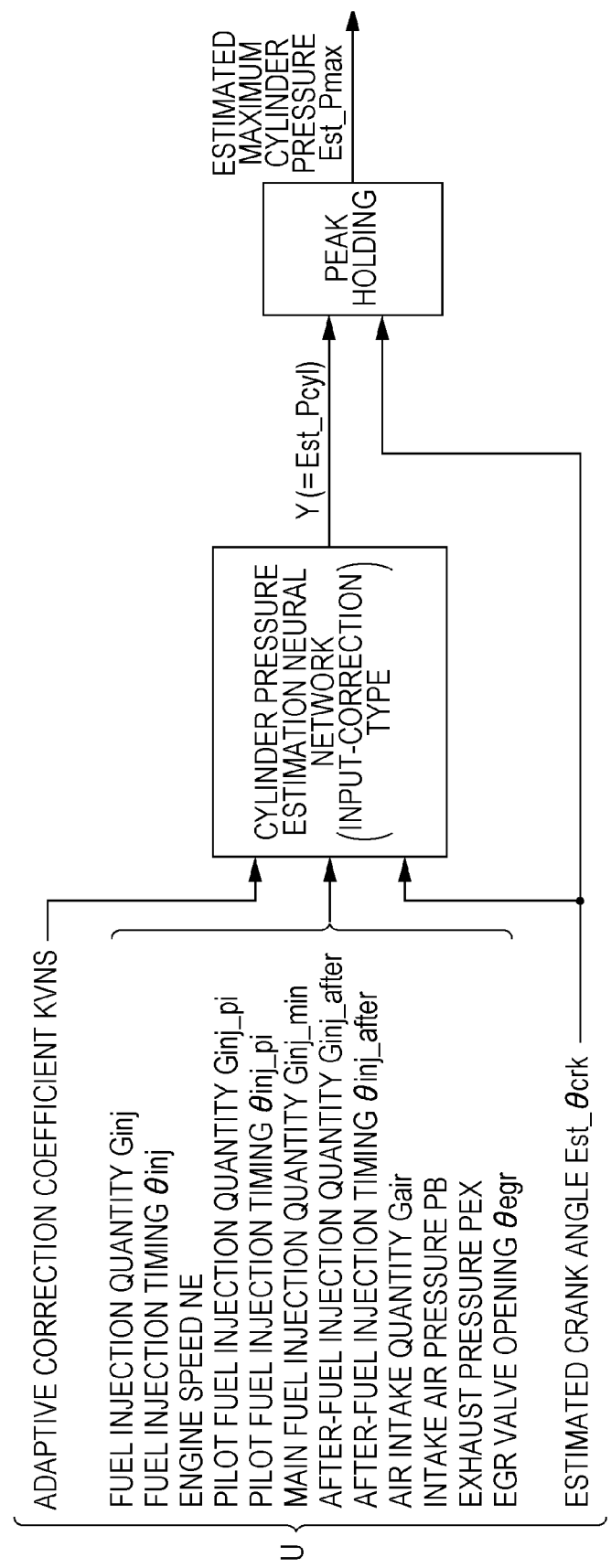
FIG. 6 is a block diagram of an input-correction type maximum cylinder pressure combustion model including the cylinder pressure estimation neural network according to the first embodiment.

FIG. 6 is a block diagram of an input-correction type maximum cylinder pressure combustion model including a cylinder pressure estimation neural network. In the output-correction type combustion model described above, the product or the sum of the adaptive correction coefficient KVNS and the output Y of the neural network is calculated (see FIG. 3). In contrast, in the input-correction type combustion model, as shown in the following expression (2-16), the adaptive correction coefficient KVNS is included in the input vector U for the cylinder pressure estimation neural network as one of the components.

$$U(tp) = \begin{bmatrix} U1(tp) \\ U2(tp) \\ U3(tp) \\ U4(tp) \\ U5(tp) \\ U6(tp) \\ U7(tp) \\ U8(tp) \\ U9(tp) \\ U10(tp) \\ U11(tp) \\ U12(tp) \end{bmatrix} = \begin{bmatrix} Ginj(k) \\ \theta inj(k) \\ NE(k) \\ Ginj\_pi(k) \\ \theta inj\_pi(k) \\ Ginj\_after(k) \\ \theta inj\_after(k) \\ Gair(k) \\ PB(k) \\ PEX(k) \\ \theta egr(k) \\ Est\_\theta crk(tp) \\ KVNS(k) \end{bmatrix} \quad (2\text{-}16)$$

As shown in the following expression (2-17), an output Y, which is obtained by inputting the input vector U to the cylinder pressure estimation neural network, is determined as the estimated cylinder pressure Est_Pcyl at the estimated crank angle Est_θcrk.

$$Est\_Pcyl(tp) = Y(tp) \quad (2\text{-}17)$$

As with the output-correction type combustion model described above, the estimated cylinder pressure Est_Pcyl is subjected to peak holding over one combustion cycle of the combustion model to calculate the estimated maximum cylinder pressure Est_Pmax.

The structure of the input-correction type cylinder pressure estimation neural network is basically the same as that of the neural network illustrated in FIG. 4. Therefore, detailed description of the structure will be omitted.

The process of learning differs between the input-correction type neural network and the output-correction type neural network. The neural network for the input-correction type combustion model uses (at least) two sets of data representing the correlation between the components of the input vector U (Ginj, θinj, NE, Ginj_pi, θinj_pi, Ginj_min, Ginj_after, θinj_after, Gair, PB, PEX, θegr, θcrk, KVNS) shown in the expression (2-16) and the cylinder pressure. One is new engine data, which is obtained based on an engine that is new or normal in terms of variation. The other is deteriorated engine data, which is obtained based on an engine that has a problem due to deterioration or production variation.

When performing learning based on the new engine data, the adaptive correction coefficient KVNS, which is included in the input vector U, is set at 1, which corresponds to an engine that is new or normal in terms of variation. When performing learning based on the deteriorated engine data, the adaptive correction coefficient KVNS, which is included in the input vector U, is set at 0, which corresponds to an engine that has a problem due to deterioration or production variation. By performing learning of the neural network using the input vector U, which includes the adaptive correction coefficient KVNS, the estimated cylinder pressure Est_Pcyl can be changed in accordance with the characteristics of an actual engine when the adaptive correction coefficient KVNS is continuously changed between 0 and 1. Alternatively, more than two sets of data may be used. For example, an intermediate engine having characteristics between those of a new engine and a deteriorated engine may be prepared. In this case, the adaptive correction coefficient KVNS of the intermediate engine is set at a value between 1 and 0, for example, 0.3 or 0.6, and learning of the neural network is performed. Thus, a change in the characteristics of the engine can be more realistically simulated with the neural network.

2-1-3. Output-Correction Type Maximum Cylinder Pressure Combustion Model (Example of Using Maximum Cylinder Pressure Estimation Neural Network)

As described above, the maximum cylinder pressure combustion model using the cylinder pressure estimation neural network calculates the estimated cylinder pressure Est_Pcyl for each estimated crank angle Est_θcrk from the output Y of the neural network, and calculates the estimated maximum cylinder pressure Est_Pmax by performing peak holding on the estimated cylinder pressure Est_Pcyl. Alternatively, the neural network may be configured to directly calculate the estimated maximum cylinder pressure Est_Pmax without calculating the estimated cylinder pressure Est_Pcyl for each estimated crank angle Est_θcrk. Hereinafter, a combustion model that directly calculates the estimated maximum cylinder pressure Est_Pmax from the output Y of the neural network will be described.

Figure 7:
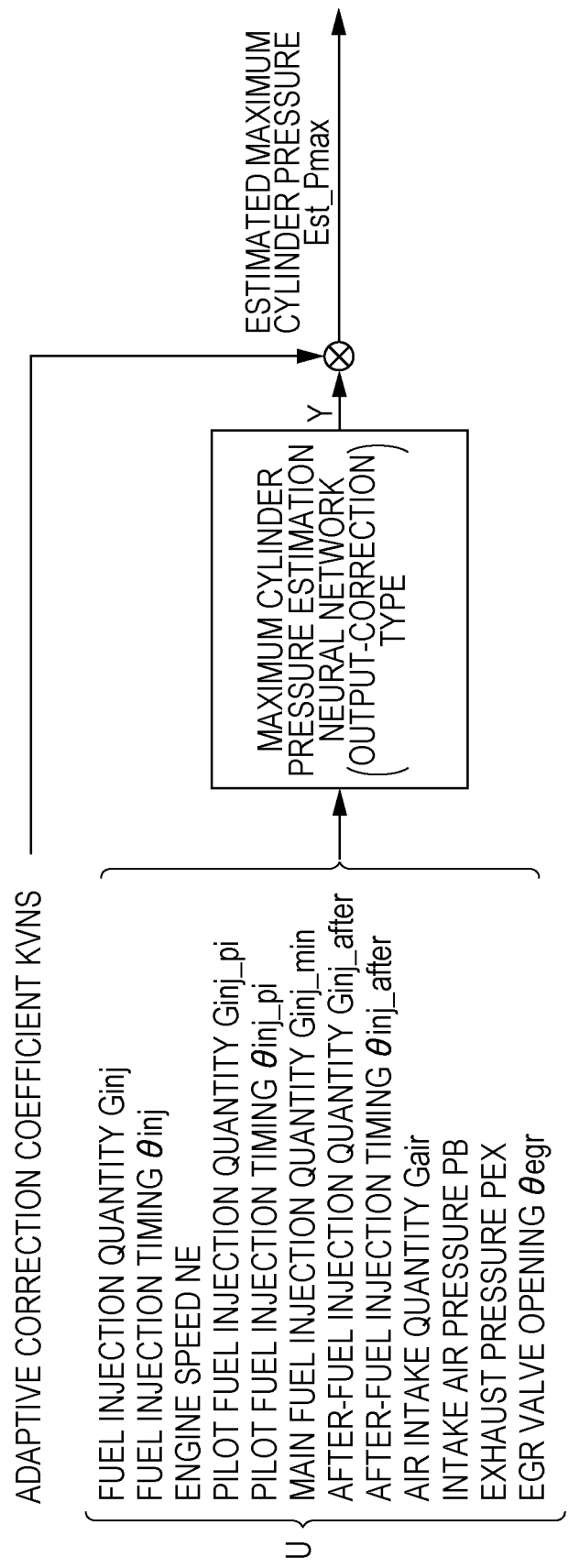
FIG. 7 is a block diagram of an output-correction type maximum cylinder pressure combustion model including a maximum cylinder pressure estimation neural network according to the first embodiment.

FIG. 7 is a block diagram of an output-correction type maximum cylinder pressure combustion model including a maximum cylinder pressure estimation neural network. When directly calculating the estimated maximum cylinder pressure Est_Pmax by using the output-correction type maximum cylinder pressure combustion model, the input vector U for the neural network is defined as shown in the following expression (2-17). The input vector U does not include the estimated crank angle Est_θcrk as a component in contrast to the vector U in the expression (2-3). Moreover, when directly calculating the estimated maximum cylinder pressure Est_Pmax, it is not necessary to synchronize the calculation cycle of the combustion model with the estimated crank angle Est_θcrk. Therefore, the calculation time tp' is different from the calculation time tp described above.

$$U(tp') = \begin{bmatrix} U1(tp') \\ U2(tp') \\ U3(tp') \\ U4(tp') \\ U5(tp') \\ U6(tp') \\ U7(tp') \\ U8(tp') \\ U9(tp') \\ U10(tp') \\ U11(tp') \end{bmatrix} = \begin{bmatrix} Ginj(k) \\ \theta inj(k) \\ NE(k) \\ Ginj\_pi(k) \\ \theta inj\_pi(k) \\ Ginj\_after(k) \\ \theta inj\_after(k) \\ Gair(k) \\ PB(k) \\ PEX(k) \\ \theta egr(k) \end{bmatrix} \quad (2\text{-}17)$$

As shown in the following expression (2-18), the estimated maximum cylinder pressure Est_Pmax is defined as the product of the output Y, which is obtained by inputting the input vector U to the neural network, and the adaptive correction coefficient KVNS.

$$Est\_Pmax(tp')=KVNS(k)Y(tp') \quad (2\text{-}18)$$

The structure of this output-correction type maximum cylinder pressure estimation neural network is basically the same as that of the neural network illustrated in FIG. 4. Therefore, detailed description of the structure will be omitted.

Learning of the maximum cylinder pressure estimation neural network is performed in accordance with the same process as that of the cylinder pressure estimation neural network illustrated in FIG. 3. For the learning, data representing the correlation between the maximum cylinder pressure and the components of the vector (Ginj, θinj, NE, Ginj_pi, θinj_pi, Ginj_min, Ginj_after, θinj_after, Gair, PB, PEX, θegr) of the expression (2-17), which are obtained based on an actual engine, is used.

2-1-4. Input-Correction Type Maximum Cylinder Pressure Combustion Model (Example of Using Maximum Cylinder Pressure Estimation Neural Network)

Figure 8:
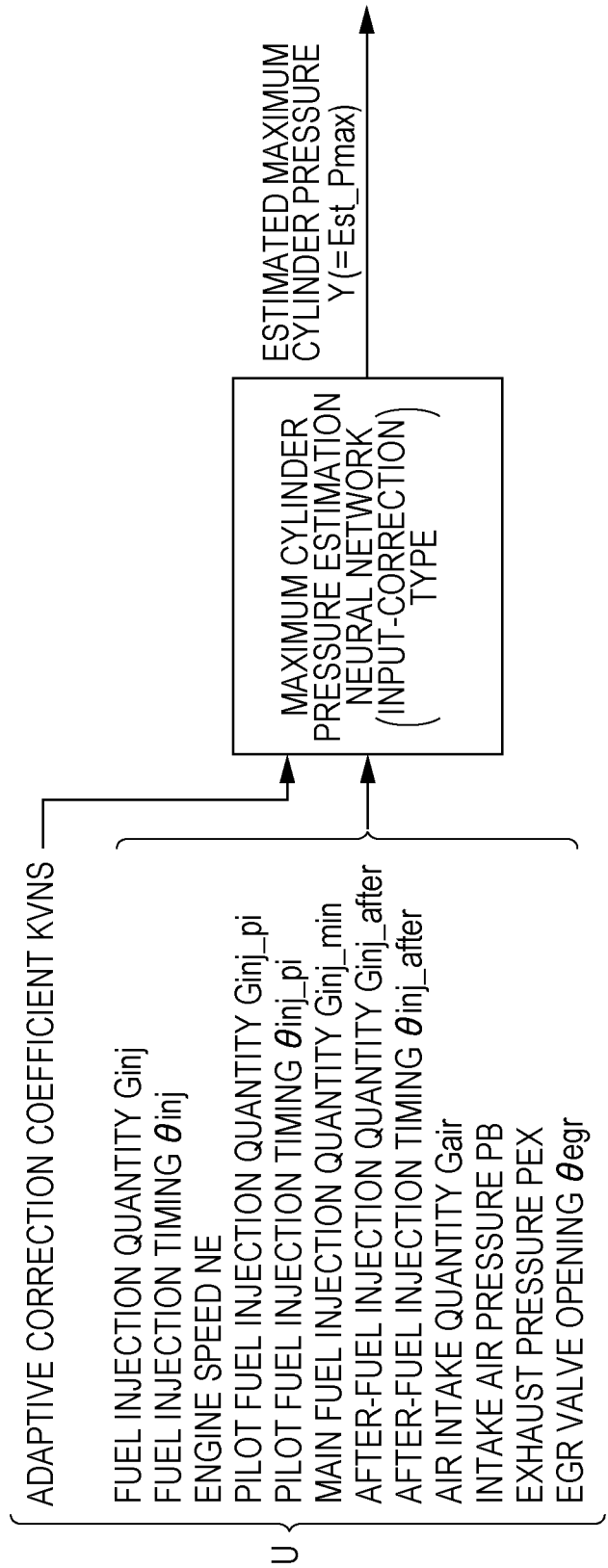
FIG. 8 is a block diagram of an input-correction type maximum cylinder pressure combustion model including the maximum cylinder pressure estimation neural network according to the first embodiment.

FIG. 8 is a block diagram of an input-correction type maximum cylinder pressure combustion model including a maximum cylinder pressure estimation neural network. When directly calculating the estimated maximum cylinder pressure Est_Pmax, the input-correction type maximum cylinder pressure combustion model defines the input vector U for the neural network as shown in the following expression (2-19). This vector U differs from the vector U of the expression (2-16) in that the estimated crank angle Est_θcrk is not included as a component.

$$U(tp') = \begin{bmatrix} U1(tp') \\ U2(tp') \\ U3(tp') \\ U4(tp') \\ U5(tp') \\ U6(tp') \\ U7(tp') \\ U8(tp') \\ U9(tp') \\ U10(tp') \\ U11(tp') \\ U12(tp') \end{bmatrix} = \begin{bmatrix} Ginj(k) \\ \theta inj(k) \\ NE(k) \\ Ginj\_pi(k) \\ \theta inj\_pi(k) \\ Ginj\_after(k) \\ \theta inj\_after(k) \\ Gair(k) \\ PB(k) \\ PEX(k) \\ \theta egr(k) \\ KVNS(k) \end{bmatrix} \quad (2\text{-}19)$$

As shown in the following expression (2-20), an output Y, which is obtained by inputting the input vector U to the neural network, is determined as the estimated maximum cylinder pressure Est_Pmax.

$$Est\_Pmax(tp')=Y(tp') \quad (2\text{-}20)$$

Learning of the neural network is performed in the same process as that of the neural network illustrated in FIG. 6. For the learning, data representing the correlation between the maximum cylinder pressure and the components (Ginj, θinj, NE, Ginj_pi, θinj_pi, Ginj_min, Ginj_after, θinj_after, Gair, PB, PEX, θegr, KVNS) of the expression (2-19), which are obtained based on an actual engine, is used.

2-2. Torque Combustion Model

Torque combustion models are classified into an output-correction type and an input-correction type according to the way the adaptive correction coefficient KVNS is input, as with the maximum cylinder pressure models described above.

2-2-1. Input-Correction Type Torque Combustion Model

Figure 9:
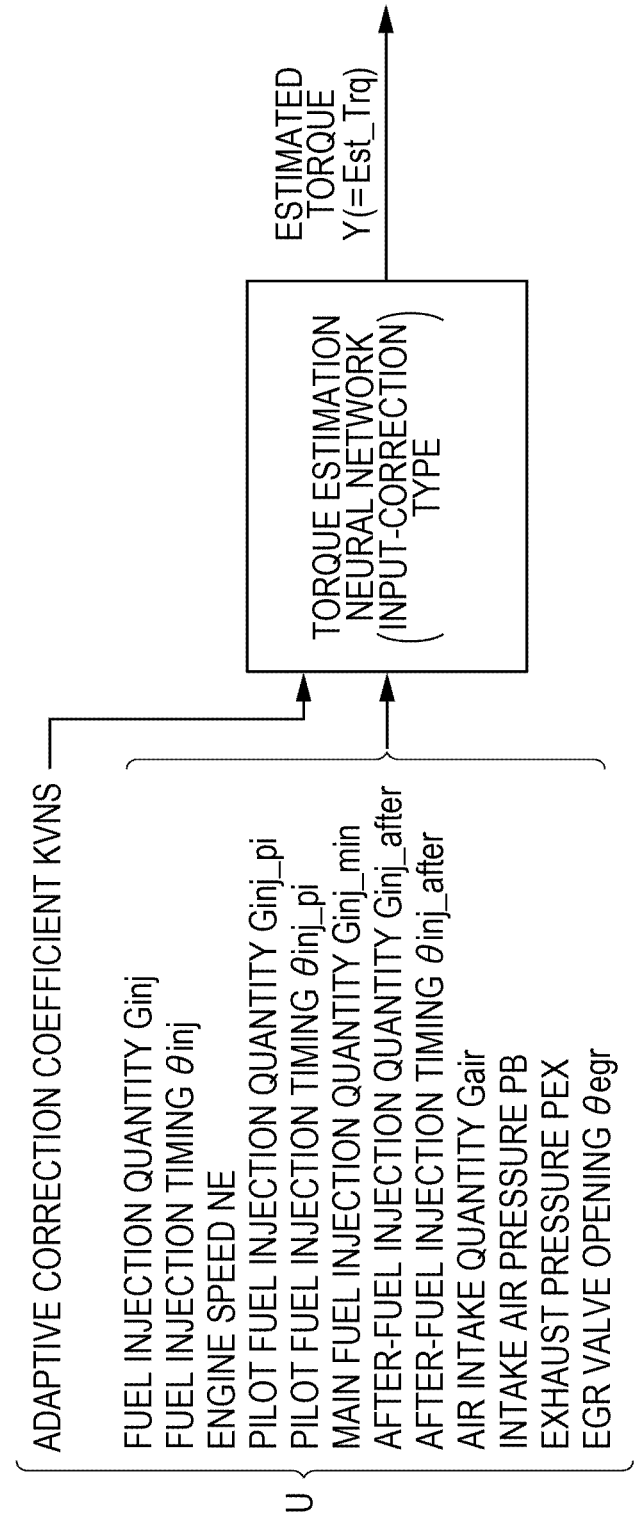
FIG. 9 is a block diagram of an input-correction type torque combustion model according to the first embodiment.

FIG. 9 is a block diagram of an input-correction type torque combustion model. When calculating an estimated torque Est_Trq, the input-correction type torque combustion model defines the input vector U for the neural network as shown in the following expression (2-21), which is the same as the input vector U of the expression (2-16) for the maximum cylinder pressure combustion model. Calculation values that are updated at the calculation cycle of the torque combustion model will be denoted by "tt".

$$U(tt) = \begin{bmatrix} U1(tt) \\ U2(tt) \\ U3(tt) \\ U4(tt) \\ U5(tt) \\ U6(tt) \\ U7(tt) \\ U8(tt) \\ U9(tt) \\ U10(tt) \\ U11(tt) \\ U12(tt) \end{bmatrix} = \begin{bmatrix} Ginj(k) \\ \theta inj(k) \\ NE(k) \\ Ginj\_pi(k) \\ \theta inj\_pi(k) \\ Ginj\_after(k) \\ \theta inj\_after(k) \\ Gair(k) \\ PB(k) \\ PEX(k) \\ \theta egr(k) \\ KVNS(k) \end{bmatrix} \quad (2\text{-}21)$$

As shown in the following expression (2-22), the output Y, which is obtained by inputting the input vector U to the neural network, is determined as the estimated torque Est_Trq.

$$Est\_Trq(tt)=Y(tt) \quad (2\text{-}22)$$

Learning of the torque estimate for neural network can be performed in the same manner as that of the maximum cylinder pressure combustion model described above. For the learning, data representing the correlation between the generated torque and the components (Ginj, θinj, NE, Ginj_pi, θinj_pi, Ginj_min, Ginj_after, θinj_after, Gair, PB, PEX, θegr, KVNS) of the expression (2-21), which are obtained based on an actual engine, is used.

2-2-2. Output-Correction Type Torque Combustion Model

Figure 10:
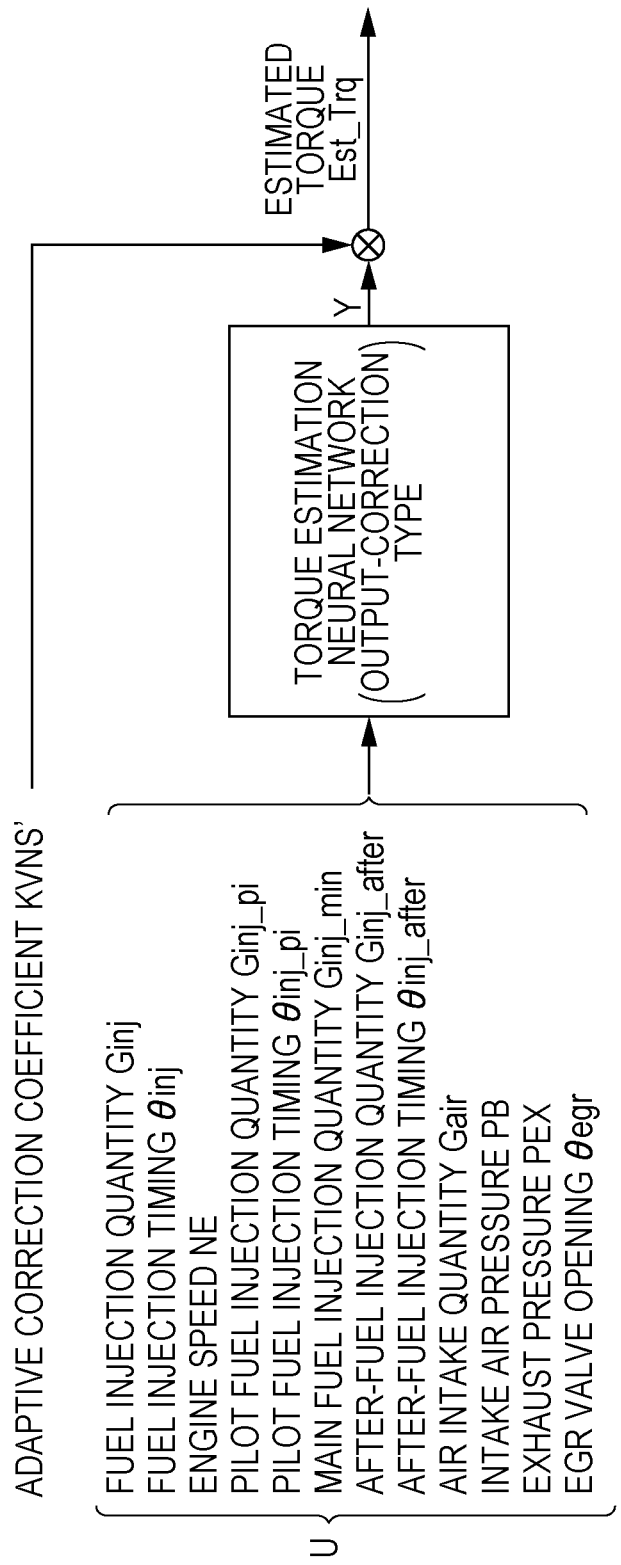
FIG. 10 is a block diagram of an output-correction type torque combustion model according to the first embodiment.

FIG. 10 is a block diagram of an output-correction type torque combustion model. As will be described below, a model adapter according to the present embodiment calculates an adaptive correction coefficient so as to reduce the deviation of the detection value of the sensor from the estimated maximum cylinder pressure that is calculated by the maximum cylinder pressure combustion model. When the adaptive correction coefficient is calculated this way based on an error that occurred in the maximum cylinder pressure combustion model, the estimated torque cannot be corrected in accordance with a change in the characteristics of an engine by calculating the product or the sum of the adaptive correction coefficient and the output of the neural network that is configured to estimate the torque.

Therefore, when configuring the output-correction type torque combustion model, an independent sensor for detecting a torque is prepared, and the model adapter calculates an adaptive correction coefficient KVNS' so as to reduce the deviation of the detection value of the sensor from the estimated torque that is calculated by the torque combustion model. In the output-correction type torque combustion model, as shown in the following expression (2-23), the estimated torque Est_Trq is defined as the product of the output Y of the neural network and the adaptive correction coefficient KVNS', which is calculated based on an error that occurred in the torque combustion model. The model adapter may use, instead of the detection value of the sensor, an estimated torque that is calculated based on, for example, the average effective pressure based on the detection value of the cylinder pressure sensor, a friction of the engine calculated based on a map, or the driving torque of auxiliaries.

$$Est\_Trq(tt) = Y(tt)KVNS'(k) \quad (2\text{-}23)$$

In this case, the input vector U for the neural network is defined as shown in the following expression (2-24).

$$U(tt) = \begin{bmatrix} U1(tt) \\ U2(tt) \\ U3(tt) \\ U4(tt) \\ U5(tt) \\ U6(tt) \\ U7(tt) \\ U8(tt) \\ U9(tt) \\ U10(tt) \\ U11(tt) \end{bmatrix} = \begin{bmatrix} Ginj(k) \\ \theta inj(k) \\ NE(k) \\ Ginj\_pi(k) \\ \theta inj\_pi(k) \\ Ginj\_after(k) \\ \theta inj\_after(k) \\ Gair(k) \\ PB(k) \\ PEX(k) \\ \theta egr(k) \end{bmatrix} \quad (2\text{-}24)$$

Learning of the neural network can be performed in the same manner as that of the maximum cylinder pressure combustion model described above. For the learning, data representing the correlation between the generated torque and the components (Ginj, θinj, NE, Ginj_pi, θinj_pi, Ginj_min, Ginj_after, θinj_after, Gair, PB, PEX, θegr, KVNS) of the expression (2-24), which are obtained based on an actual engine, is used.

3. Model Adapter

Figure 11:
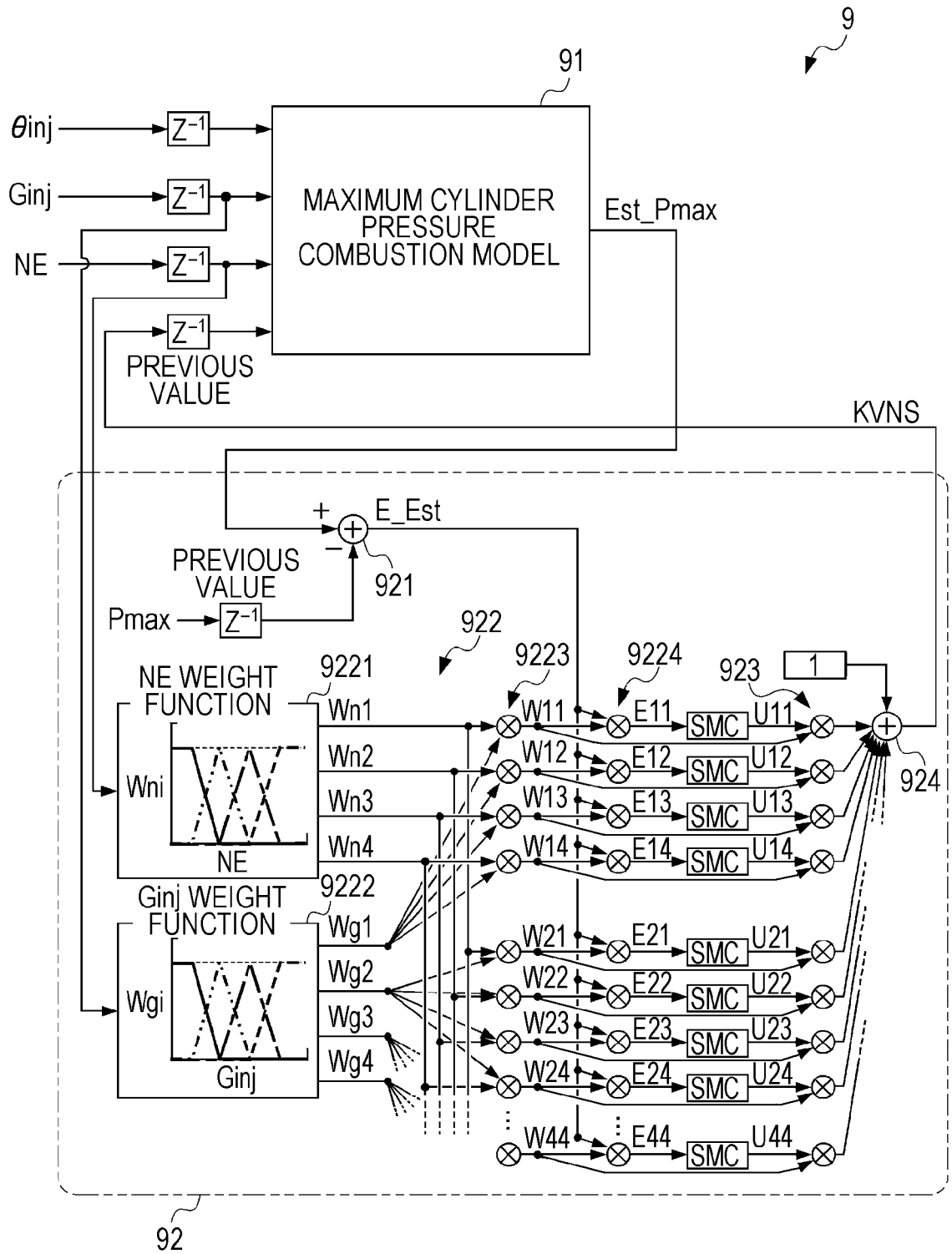
FIG. 11 is a block diagram of a model adapter according to the first embodiment.

FIG. 11 is a block diagram of the model adapter 9. The model adapter 9 includes a maximum cylinder pressure combustion model 91 and an adaptive corrector 92. The adaptive corrector 92 calculates the adaptive correction coefficient KVNS based on the estimated maximum cylinder pressure Est_Pmax, which is calculated by the maximum cylinder pressure combustion model 91, and the maximum cylinder pressure Pmax.

As the maximum cylinder pressure combustion model 91, one of the combustion models illustrated in FIGS. 3, 6, 7, and 8 is used. In the model adapter 9, the adaptive corrector 92 performs calculation at the calculation cycle Tk, and the combustion model 91 performs calculation at a calculation cycle Tn, which is equal to or shorter than the calculation cycle Tk. In particular, it is necessary to set the calculation cycle Tn to be shorter than the calculation cycle Tk if the combustion model 91 performs calculation at each estimated crank angle Est_θcrk as with the combustion models illustrated in FIGS. 3 and 6. To be specific, in this case, it is necessary to set the calculation cycle Tn so that the time during which the estimated crank angle Est_θcrk changes by 720 degrees (one combustion cycle of the combustion model) is equal to or shorter than one combustion cycle of an actual engine. Calculation values that are updated at the calculation cycle Tn are denoted by "n".

As illustrated in FIG. 11, except for the adaptive correction coefficient KVNS, previous values are used as the parameters that are input to the combustion model 91 when the combustion model 91 calculates the estimated maximum cylinder pressure Est_Pmax(k). For example, when the output-correction type combustion model illustrated in FIG. 3 is used as the combustion model 91, the input vector U shown in the following expression (3-1) is input to the neural network of the combustion model 91 instead of the vector U shown in the expression (2-3).

$$U(n) = \begin{bmatrix} U1(n) \\ U2(n) \\ U3(n) \\ U4(n) \\ U5(n) \\ U6(n) \\ U7(n) \\ U8(n) \\ U9(n) \\ U10(n) \\ U11(n) \\ U12(n) \end{bmatrix} = \begin{bmatrix} Ginj(k-1) \\ \theta inj(k-1) \\ NE(k-1) \\ Ginj\_pi(k-1) \\ \theta inj\_pi(k-1) \\ Ginj\_after(k-1) \\ \theta inj\_after(k-1) \\ Gair(k-1) \\ PB(k-1) \\ PEX(k-1) \\ \theta egr(k-1) \\ Est\_\theta crk(n) \end{bmatrix} \quad (3\text{-}1)$$

The adaptive corrector 92 includes a model deviation calculator 921, a weight function setter 922, a local correction coefficient calculator 923, and a correction coefficient calculator 924. As will be described below, the adaptive corrector 92, which is configured as described above, calculates a model deviation E_Est, which represents an error of the combustion model 91, and calculates the adaptive correction coefficient KVNS so as to reduce the model deviation E_Est.

As shown in the following expression (3-2), the model deviation calculator 921 calculates the model deviation E_Est (k) as the difference between the estimated maximum cylinder pressure Est_Pmax(k), which is calculated by the combustion model 91 based on the previous values of the parameters, and the previous value Pmax(k−1) of the maximum cylinder pressure.

$$E\_Est(k) = Est\_Pmax(k) - Pmax(k-1) \tag{3-2}$$

When the combustion model 91 calculates the estimated cylinder pressure Est_Pcyl at each estimated crank angle Est_θcrk illustrated in FIGS. 3 and 4, the model deviation E_Est(k) may be defined as the maximum value of the difference between the estimated cylinder pressure Est_Pcyl and the detection value of the sensor Pcyl in one combustion cycle or as the average of the difference between the estimated cylinder pressure Est_Pcyl and the detection value of the sensor Pcyl in one combustion cycle, as shown in the following expression (3-3).

$$E\_Est(k) = \begin{cases} \max_{i=0-719}(Est\_Pcyl(i) - Pcyl(i)) \\ \text{or} \\ \dfrac{1}{720}\sum_{i=0}^{719}(Est\_Pcyl(i) - Pcyl(i)) \end{cases} \tag{3-3}$$

The adaptive corrector 92 defines a space that has two reference parameters selected from the inputs for the combustion model 91 (for example, the engine speed NE and the fuel injection quantity Ginj) as a basis, and divides the space into a plurality of regions. Moreover, the adaptive corrector 92 calculates local correction coefficients Uij (i=1 to 4, j=1 to 4) for respective regions as described below, and calculates the adaptive correction coefficient KVNS by calculating a weighted combination of the local correction coefficients Uij and weight functions Wij (i=1 to 4, j=1 to 4) described below.

The effect of deterioration and production variation of the engine on the model deviation E_Est may be different in accordance with the driving condition of the engine, i.e., the values of the reference parameters. The adaptive corrector 92 calculates the local correction coefficient Uij for each of the regions in the space having the reference parameters as a basis, and thereby calculates the adaptive correction coefficient KVNS with consideration of the effect of the error described above, which are different in accordance with the values of the reference parameters.

Figure 12:
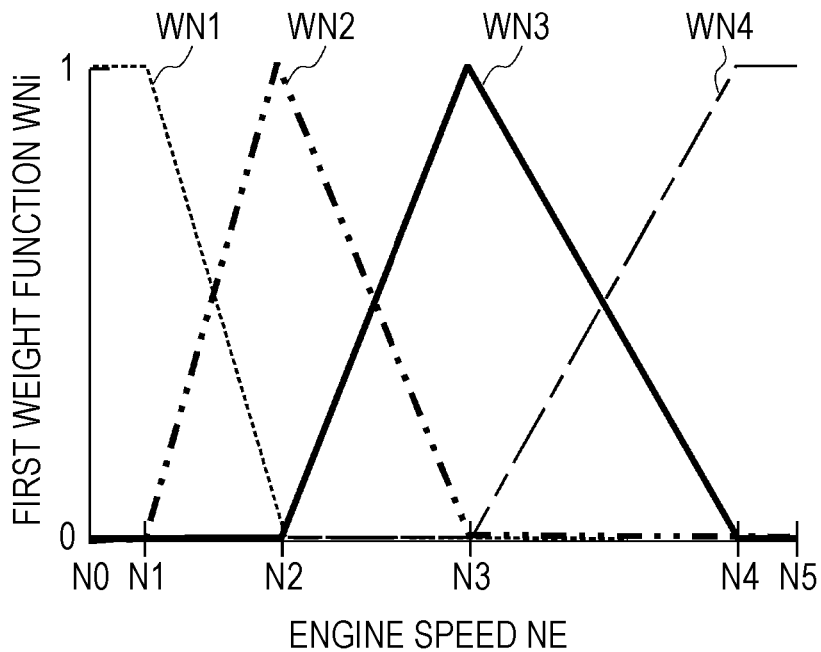
FIG. 12 is a graph illustrating four first weight functions, whose domains are the engine speed, according to the first embodiment.

FIG. 12 is a graph illustrating four first weight functions Wni (i=1 to 4), whose domains are the engine speed NE. As illustrated in FIG. 12, the four first weight functions Wni respectively define four overlapping regions in the domain and have nonzero values in these regions.

To be specific, the domain is divided into a first region [N0, N2], a second region [N1, N3], a third region [N2, N4], and a fourth region [N3, N5]. As illustrated in FIG. 12, N0<N1<N2<N3<N4<N5. Therefore, the first region and the second region overlap in an interval [N1, N2], the second region and the third region overlap in an interval [N2, N3], and a third region and a fourth region overlap in an interval [N3, N4].

The function WN1 has nonzero values in the first region [N0, N2]. To be specific, the value of the function WN1 is 1 in the interval [N0, N1] and decreases from 1 to 0 in the interval [N1, N2]. The function WN2 has nonzero values in the second region [N1, N3]. To be specific, the value of the function WN2 increases from 0 to 1 in the interval [N1, N2] and decreases from 1 to 0 in the interval [N2, N3]. Therefore, the function WN1 and the function WN2 intersect at the center of the interval [N1, N2]. The function WN3 has nonzero values in the third region [N2, N4]. To be specific, the value of the function WN3 increases from 0 to 1 in the interval [N2, N3] and decreases from 1 to 0 in the interval [N3, N4]. Therefore, the function WN2 and the function WN3 intersect at the center of the interval [N2, N3]. The function WN4 has nonzero values in the fourth region [N3, N5]. To be specific, the value of the function WN4 increases from 0 to 1 in the interval [N3, N4] and remains at 1 in the interval [N4, N5]. Therefore, the function WN3 and the function WN4 intersect at the center of the interval [N3, N4].

As shown in the following expression (3-4), the first weight functions Wni are normalized so that the sum of the functions is 1 irrespective of the engine speed NE. Hereinafter, the value Wni(NE(k)) of the first weight function, which has the engine speed NE(k) as the argument, will be simply denoted by Wni(k).

$$\sum_{i=1}^{4} WNi(k) = 1 \tag{3-4}$$

Figure 13:
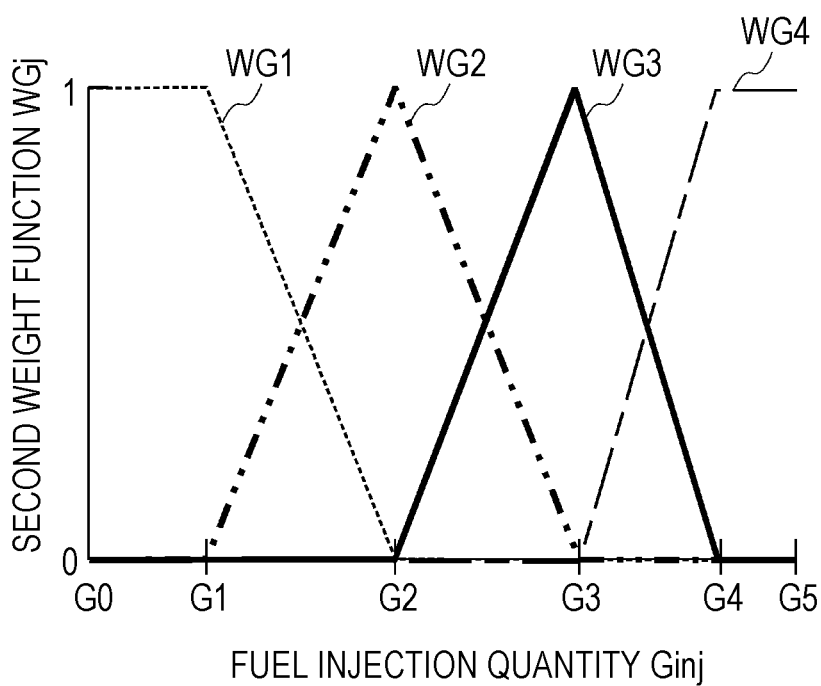
FIG. 13 is a graph illustrating four second weight functions, whose domains are the fuel injection quantity, according to the first embodiment.

FIG. 13 is a graph illustrating four second weight functions Wgj (j=1 to 4), whose domains are the fuel injection quantity Ginj. As illustrated in FIG. 13, the four second weight functions Wgj respectively define four overlapping regions in the domain and have nonzero values in these regions.

To be specific, the domain is divided into a first region [G0, G2], a second region [G1, G3], a third region [G2, G4], and a fourth region [G3, G5]. As illustrated in FIG. 13, G0<G1<G2<G3<G4<G5. Therefore, the first region and the second region overlap in an interval [G1, G2], the second region and the third region overlap in an interval [G2, G3], and a third region and a fourth region overlap in an interval [G3, G4].

The function WG1 has nonzero values in the first region [G0, G2]. To be specific, the value of the function WG1 is 1 in the interval [G0, G1], and decreases from 1 to 0 in the interval [G1, G2]. The function WG2 has nonzero values in the second region [G1, G3]. To be specific, the value of the function WG2 increases from 0 to 1 in the interval [G1, G2] and decreases from 1 to 0 in the interval [G2, G3]. Therefore, the function WG1 and the function WG2 intersect at the center of the interval [G1, G2]. The function WG3 has nonzero values in the third region [G2, G4]. To be specific, the value of the function WG3 increases from 0 to 1 in the interval [G2, G3] and decreases from 1 to 0 in the interval [G3, G4]. Therefore, the function WG2 and the function WG3 intersect at the center of the interval [G2, G3]. The function WG4 has nonzero values in the fourth region [G3, G5]. To be specific, the value of the function WG4 increases from 0 to 1 in the interval [G3, G4] and remains at 1 in the interval [G4, G5]. Therefore, the function WG3 and the function WG4 intersect at the center of the interval [G3, G4].

As shown in the following expression (3-5), the second weight functions Wgj are normalized so that the sum of the functions is 1 irrespective of the fuel injection quantity Ginj. Hereinafter, the value Wgj(Ginj(k)) of the second weight function, which has the fuel injection quantity Ginj(k) as the argument, will be simply denoted by Wgj(k).

$$\sum_{i=1}^{4} Wgi(k) = 1 \tag{3-5}$$

Figure 14:
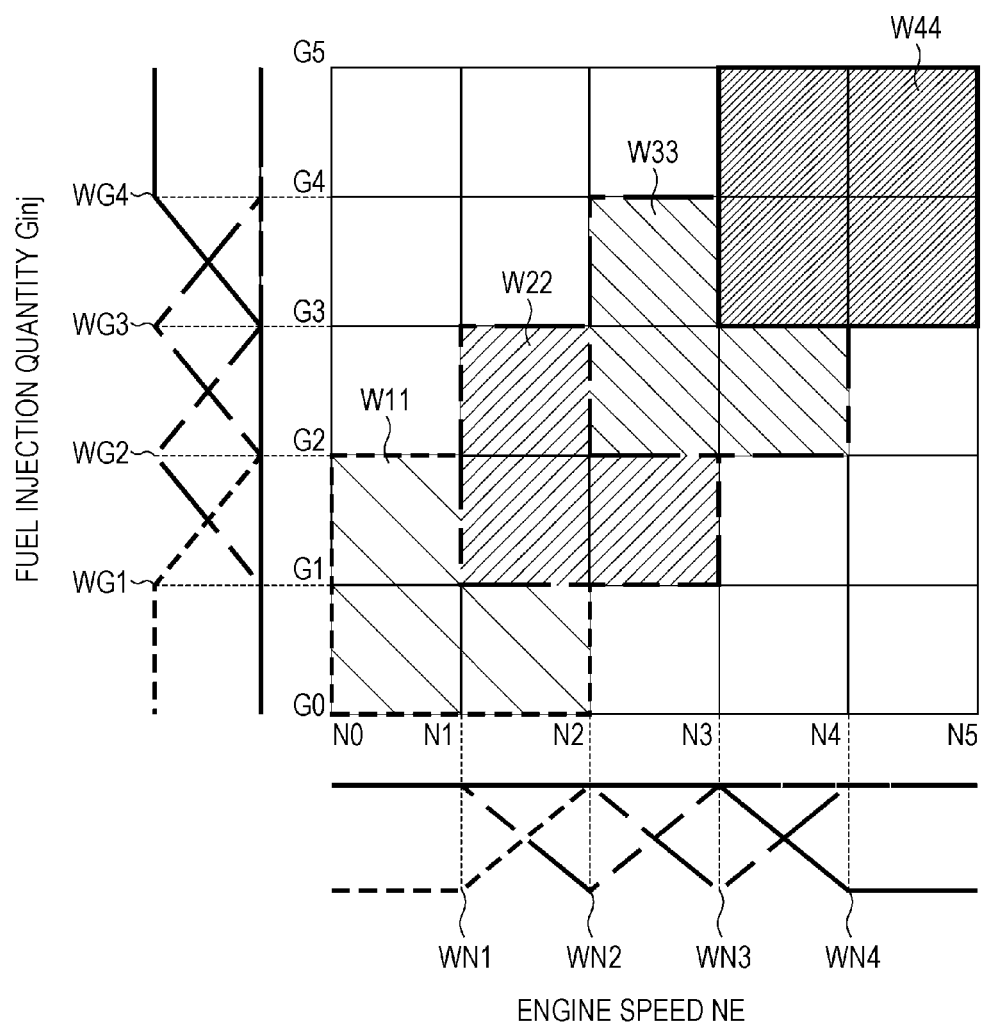
FIG. 14 a graph illustrating sixteen weight functions, whose domains are two reference parameters, according to the first embodiment.

FIG. 14 is a graph illustrating sixteen weight functions Wij (i=1 to 4, j=1 to 4), whose domains are the two reference parameters (NE, Ginj). In FIG. 14, the horizontal axis represents the engine speed NE, and the vertical axis represents the fuel injection quantity Ginj. As illustrated in FIG. 14, sixteen regions, which overlap each other, are defined in the domains of the two reference parameters (NE, Ginj).

As shown in the following expression (3-6), each of the sixteen weight functions Wij is defined as the product of one of the first weight functions Wni and one of the second weight functions Wgj. Thus, the weight functions Wij, each of which is nonzero in at least one of the sixteen regions, are defined. FIG. 14 illustrates only four weight functions W11, W22, W33, and W44 with different hatchings.

$$Wij = Wni\ Wgj \qquad (3\text{-}6)$$

As shown in the following expression (3-7), the weight functions Wij are normalized so that the sum of the functions is 1 irrespective of the values of the two reference parameters (NE(k), Ginj(k)), as with the expressions (3-4) and (3-5). Hereinafter, the value Wij(NE(k), Ginj(k)) of the weight function, which has the engine speed NE(k) and the fuel injection quantity Ginj(k) as the arguments, will be simply denoted by Wij(k).

$$\sum_{j=1}^{4}\sum_{i=1}^{4} Wij(k) = 1 \qquad (3\text{-}7)$$

Referring back to FIG. 11, the weight function setter 922 includes a first weight function calculator 9221, a second weight function calculator 9222, a multiplier 9223, and a multiplier 9224. The first weight functions Wni are set in the first weight function calculator 9221. The second weight functions Wgj are set in the second weight function calculator 9222. The multiplier 9223 calculates the weight functions Wij based on the first weight functions Wni and the second weight functions Wgj. The multiplier 9224 assigns a weight to the model deviation E_Est for each region.

The first weight function calculator 9221 calculates the value Wni(k) of the first weight function in accordance with the engine speed NE(k) by performing a search in the map illustrated in FIG. 12.

The second weight function calculator 9222 calculates the value Wgj(k) of the second weight function corresponding to the fuel injection quantity Ginj(k) by performing a search in the map illustrated in FIG. 13.

As shown in the following expression (3-8), the multiplier 9223 calculates the value Wij(k) of the weight function as the product of the value Wni(k) of the first weight function, which is calculated by a first weight function calculator 7151, and the value of the second weight function Wgj(k).

$$Wij(k) = Wni(k)Wgi(k) \qquad (3\text{-}8)$$

As shown in the following expression (3-9), the multiplier 9224 calculates an error signal WEVNSij(k), which is the weighted for each region, by calculating the product of the value of the weight function Wij(k) and the model deviation E_Est(k).

$$WEVNSij(k) = Wij(k)E\_Est(k) \qquad (3\text{-}9)$$

The local correction coefficient calculator 923 calculates the local correction coefficient Uij (i=1 to 4, j=1 to 4) for each region so that the error signal WEVNSij, which is weighted for the region, becomes 0.

In the present embodiment, the local correction coefficient Uij is calculated by using a response-specifying control algorithm that allows setting of the convergence speed of the error signal WEVNSij. Here, the term "response specifying control algorithm" refers to a control algorithm that allows specification of both the speed and the type of convergence of the deviation based on a function that defines the type of convergence of the deviation.

The local correction coefficient calculator 923 includes a plurality of sliding mode controllers that are configured to execute the response-specifying control algorithm. Hereinafter, the operation of the sliding mode controllers will be described.

First, as shown in the following expression (3-10), a switching function σ_vij(k) is defined as the sum of the error signal WEVNSij(k) and the product of a switching function set parameter POLE_v and the previous value of the error signal WEVNSij(k−1). The value of the switching function set parameter POLE_v is set between −1 and 0 based on a predetermined setting table.

$$\sigma\_vij(k) = WEVNSij(k) + POLE\_v\ WEVNSij(k-1) \qquad (3\text{-}10)$$

Next, as shown in the following expression (3-11), a local correction coefficient Uij(k) is defined as the sum of a reaching law input Urch_vij(k) and the previous value of an adaptation law input Uadp_vij(k−1).

$$Uij(k) = Urch\_vij(k) + Uadp\_vij(k-1) \qquad (3\text{-}11)$$

The reaching law input Urch_vij(k) is an input that makes a deviation state amount be on a switching curve. As shown the following expression (3-12), the reaching law input Urch_vij(k) is the product of a predetermined reaching law gain Krch_v and the switching function σ_vij(k).

$$Urch\_vij(k) = Krch\_v\ \sigma\_vij(k) \qquad (3\text{-}12)$$

The adaptation law input Uadp_vij(k) is an input that makes a deviation state amount be on a switching curve by suppressing the influence of a modeling error or a disturbance. As shown in the following expression (3-13), the adaptation law input Uadp_vij(k) is the sum of the adaptation law input Uadp_vij(k−1) for the previous control and the product of a predetermined adaptation law gain Kadp_v and the switching function σ_vij(k).

$$Uadp\_vij(k) = Uadp\_vij(k-1) + Kadp\_v\ \sigma\_vij(k) \qquad (3\text{-}13)$$

The correction coefficient calculator 924 calculates the adaptive correction coefficient KVNS by adding 1 to a weighted combination of the local correction coefficient Uij for respective regions and the weight functions Wij. That is, as shown in the following expression (3-14), the correction coefficient calculator 924 calculates the adaptive correction coefficient KVNS(k) by adding 1 to the sum of the products of the local correction coefficients Uij(k) and the values of weight function Wij for all regions (i=1 to 4, j=1 to 4).

$$KVNS(k) = 1 + \sum_{i=1}^{4}\sum_{j=1}^{4} Wij(k)Uij(k) \qquad (3\text{-}14)$$

In the expression (3-14), 1 is added so that, assuming that a state of a new engine corresponds to the adaptive correction coefficient KVNS=1, the initial value of the adaptation law input UADP_V_ij is set at 0 and the initial value of the adaptive correction coefficient KVNS is set at 1. If the initial value of the adaptation law input UADP_V_ij hag been set at 1, it is not necessary to add 1 as shown in the expression (3-14). If the initial value of the adaptive correction coefficient KVNS is set at 0, which represents a deteriorated engine, it is not necessary to add 1 as shown in the expression (3-14). If the combustion model is adaptively corrected by adding the adaptive correction coefficient KVNS as shown in the expression (2-6), it is not necessary to add 1 as shown in the expression (3-14).

As described above, the weight functions Wij are defined as the products of the functions Wni and Wgi, each of which has nonzero values only in some of the regions. Therefore, there are regions in which the values of the weight functions are 0. Therefore, when calculating the sum for all regions (i=1 to 4, j=1 to 4) in the expression (3-14), calculations for such regions in which the values of the weight functions Wij (k) are 0 may be omitted. Thus, the calculation load can be reduced.

4. Combustion Model-Based Controller

Figure 15:
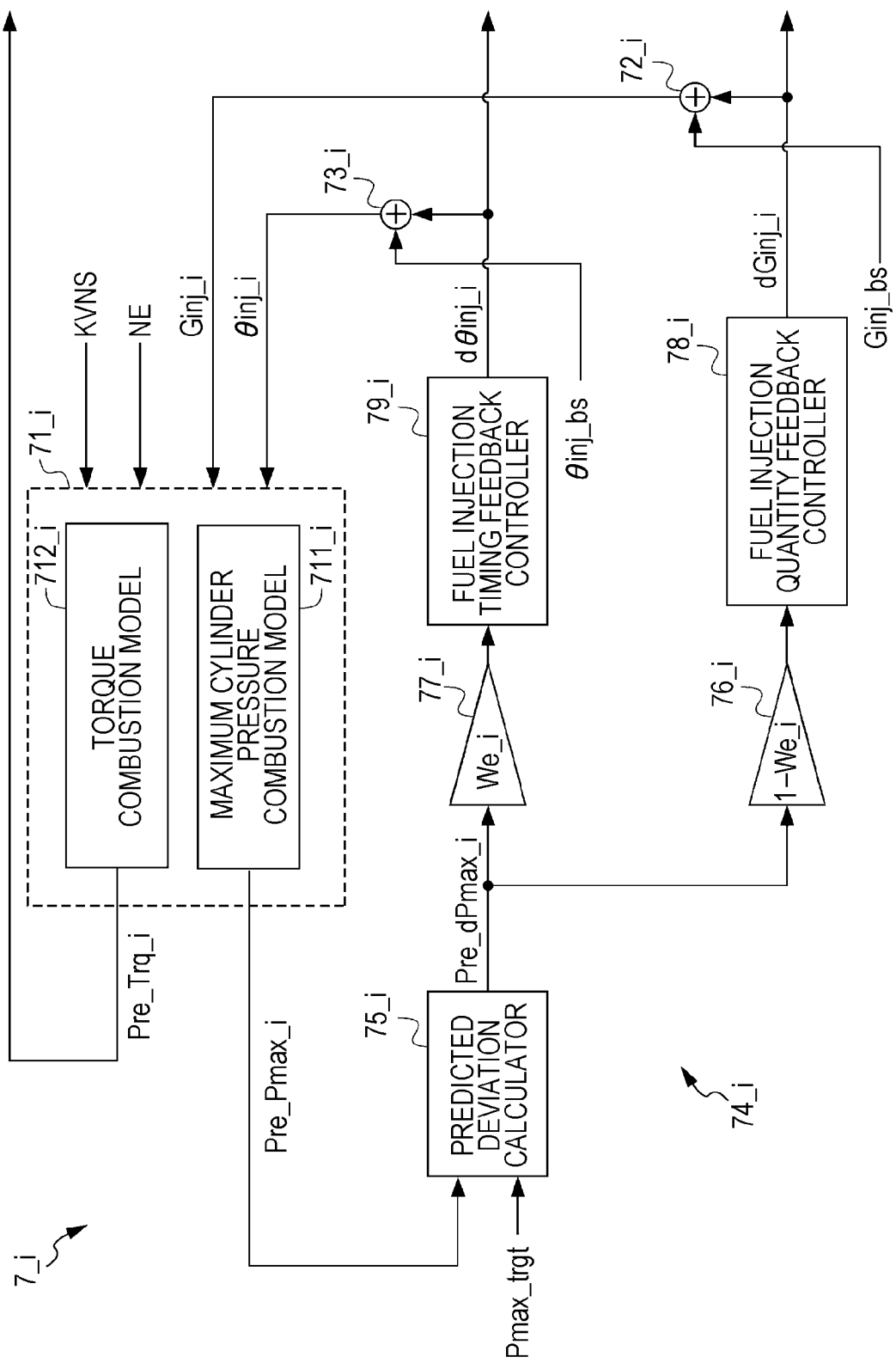
FIG. 15 is a block diagram of the i-th combustion model-based controller 7_i, which is one of N combustion model controllers according to the first embodiment.

Referring back to FIG. 2, the structure of the combustion model-based controller will be described. The correction value calculator 6 includes N combustion model-based controllers 7_1 to 7_N, which are parallely disposed. FIG. 15 is a block diagram of the i-th combustion model-based controller 7_i.

The combustion model-based controller 7_i includes a model predictor 71_i and a feedback controller 74_i. The model predictor 71_i includes a maximum cylinder pressure combustion model 711_i and a torque combustion model 712_i. The feedback controller 74_i calculates a predicted fuel injection timing correction value θdinj_i and a predicted fuel injection quantity correction value dGinj_i by performing recursive calculation on the assumption that the model predictor 71_i is a control target.

In the combustion model-based controller 7_i, the feedback controller 74_i performs calculation at a calculation cycle Tq that is shorter than the calculation cycle Tk. The model predictor 71_i of the combustion model-based controller 7_i performs calculation at a calculation cycle Tm that is equal to or shorter than the calculation cycle Tq. The feedback controller 74_i calculates the predicted fuel injection timing correction value dθinj_i and the predicted fuel injection quantity correction value dGinj_i by performing recursive calculation during one combustion cycle of an actual engine on the assumption that the model predictor 71_i is a control target. Therefore, it is necessary to perform a plurality of calculations during the calculation cycle Tk so that the correction values dθinj_i and dGinj_i converge on predetermined values. For this purpose, the calculation cycle Tq for the feedback controller 74_i is set at a value that is sufficiently shorter than the calculation cycle Tk. Calculation values that are updated at the calculation cycle Tq will be denoted by "q", and calculation values that are updated at the calculation cycle Tm will be denoted by "m".

The model predictor 71_i includes the maximum cylinder pressure combustion model 711_i and the torque combustion model 712_i. The maximum cylinder pressure combustion model 711_i calculates the predicted maximum cylinder pressure Pre_Pmax_i based on an input from the feedback controller 74_i. The torque combustion model 712_i calculates the predicted torque Pre_Trq_i based on an input from the feedback controller 74_i.

As the maximum cylinder pressure combustion model 711_i, one of the combustion models illustrated FIGS. 3, 6, 7, and 8 is used. Here, an example of using the output-correction type maximum cylinder pressure combustion model illustrated in FIG. 3 will be described. In this case, the input vector U for the neural network of the combustion model 711_i is represented by the following expression (4-1).

$$U(m) = \begin{bmatrix} U1(m) \\ U2(m) \\ U3(m) \\ U4(m) \\ U5(m) \\ U6(m) \\ U7(m) \\ U8(m) \\ U9(m) \\ U10(m) \\ U11(m) \\ U12(m) \end{bmatrix} = \begin{bmatrix} Ginj\_i(m) \\ \theta inj\_i(m) \\ NE(k-1) \\ Ginj\_pi(k) \\ \theta inj\_pi(k) \\ Ginj\_after(k) \\ \theta inj\_after(k) \\ Gair(k) \\ PB(k) \\ PEX(k) \\ \theta egr(k) \\ Pre\_\theta crk(m) \end{bmatrix} \quad (4\text{-}1)$$

In this case, as shown in the following expression (4-2), the predicted fuel injection quantity Ginj_i(m), which is input to the model predictor 71_i, is calculated by adding the basic fuel injection quantity Ginj_bs(k), which is calculated by the basic injection quantity calculator 52 at the calculation cycle Tk, and the previous value of the predicted fuel injection quantity correction value dGinj_i(q−1), which is calculated by the feedback controller 74_i at the calculation cycle Tq, by using an adder 72_i.

$$Ginj\_i(m) = Ginj\_bs(k) + dGinj\_i(q-1)(i=1 \text{ to } N) \quad (4\text{-}2)$$

As shown in the following expression (4-3), the predicted fuel injection timing θinj_i(m), which is input to the model predictor 71_i, is calculated by adding the basic fuel injection timing θinj_bs(k), which is calculated by the basic injection timing calculator 51 at the calculation cycle Tk, and the previous value of the predicted fuel injection timing correction value dθinj_i(q−1), which is calculated by the feedback controller 74_i at the calculation cycle Tq, by using an adder 73_i.

$$\theta inj\_i(m) = \theta inj\_bs(k) + d\theta inj\_i(q-1)(i=1 \text{ to } N) \quad (4\text{-}3)$$

As shown in the following expression (4-4), the predicted crank angle Pre_θcrk of the maximum cylinder pressure combustion model 711_i is advanced by a crank angle resolution dθcrk_pre at each calculation cycle Tm, and is reset when the predicted crank angle Pre_θcrk exceeds 720 degrees.

$$Pre\_\theta crk(m) = \begin{cases} Pre\_\theta crk(m-1) + d\theta crk\_pre & (4\text{-}4) \\ \quad (Pre\_\theta crk(m-1) + d\theta crk\_pre < 720) \\ Pre\_\theta crk(m-1) + d\theta crk\_pre - 720 \\ \quad (Pre\_\theta crk(m-1) + d\theta crk\_pre \geq 720) \end{cases}$$

When the input vector U represented by the expression (4-1) is input, the maximum cylinder pressure combustion model 711_i calculates a predicted maximum cylinder pressure Pre_Pmax_i(m). The predicted maximum cylinder pressure Pre_Pmax_i(m) is input to the feedback controller 74_i.

As the torque combustion model 712_i, one of the combustion models illustrated in FIGS. 9 and 10 is used. Here, an example of using the input-correction type torque combustion model illustrated in FIG. 9 will be described. In this case, the input vector U for the neural network of the combustion model 712_i is represented by the following expression (4-5).

$$U(m) = \begin{bmatrix} U1(m) \\ U2(m) \\ U3(m) \\ U4(m) \\ U5(m) \\ U6(m) \\ U7(m) \\ U8(m) \\ U9(m) \\ U10(m) \\ U11(m) \\ U12(m) \end{bmatrix} = \begin{bmatrix} Ginj\_i(m) \\ \theta inj\_i(m) \\ NE(k) \\ Ginj\_pi(k) \\ \theta inj\_pi(k) \\ Ginj\_after(k) \\ \theta inj\_after(k) \\ Gair(k) \\ PB(k) \\ PEX(k) \\ \theta egr(k) \\ KVNS(k) \end{bmatrix} \quad (4\text{-}5)$$

When the input vector U represented by the expression (4-5) is input, the torque combustion model 712_i calculates a predicted torque Pre_Trq_i(m). The predicted torque Pre_Trq_i(m) is input to the optimum input selector 8 described below.

In the expressions (4-1) and (4-5), the fourth to seventh components of the vector U are updated at the calculation cycle Tk, whereas the first and second components of the vector U are updated at the calculation cycle Tm. Therefore, the pilot fuel injection quantity Ginj_pi, the injection timing θinj_pi, the after-fuel injection quantity Ginj_after, and the after-injection timing θinj_after may be updated at the calculation cycle Tm as with the fuel injection quantity Ginj_i and the θinj_i, for example, by performing a search in a map.

The feedback controller 74_i includes a predicted deviation calculator 75_i, a fuel injection quantity feedback controller 78_i, a fuel injection timing feedback controller 79_i, and two amplifiers 76_i and 77_i.

The predicted deviation calculator 75_i calculates the maximum cylinder pressure deviation Pre_dPmax_i, which is a control variable to be compensated for by the two feedback controllers 78_i and 79_i. To be specific, as shown in the following expression (4-6), the maximum cylinder pressure deviation Pre_dPmax_i is defined as the difference between the predicted maximum cylinder pressure Pre_Pmax_i, which is calculated by the model predictor 71_i, and the target maximum cylinder pressure Pmax_trgt. If the predicted maximum cylinder pressure Pre_Pmax_i is lower than the target maximum cylinder pressure Pmax_trgt, the maximum cylinder pressure deviation Pre_dPmax_i is defined as 0.

$$Pre\_dPmax\_i(q) = \begin{cases} Pre\_Pmax\_i(q) - Pmax\_trg & (Pre\_Pmax\_i(q) \leq Pmax\_trgt) \\ 0 & (Pre\_Pmax\_i(q) < Pmax\_trgt) \end{cases} \quad (4\text{-}6)$$

By defining the control variable to be input to the two feedback controllers 78_i and 79_i as illustrated in the expression (4-6), the feedback controllers 78_i and 79_i calculate the predicted fuel injection timing correction value dθinj_i and the predicted fuel injection quantity correction value dGinj_i so that the predicted maximum cylinder pressure Pre_Pmax_i becomes equal to or lower than the target maximum cylinder pressure Pmax_trgt only if the predicted maximum cylinder pressure Pre_Pmax_i exceeds the target maximum cylinder pressure Pmax_trgt. Consequently, the predicted fuel injection quantity Ginj_i and the predicted fuel injection timing θinj_i, which are input to the model predictor 71_i, are corrected.

The maximum cylinder pressure deviation Pre_dPmax_i calculated here is weighted in different ways using the predetermined distribution coefficient We_i to yield different deviations, and these deviations are input to the fuel injection quantity feedback controller 78_i and the fuel injection timing feedback controller 79_i. To be specific, a deviation E_Ginj_i(q) represented by the following expression (4-7) is input to the fuel injection quantity feedback controller 78_i. A deviation E_θinj_i(q) represented by the following expression (4-8) is input to the fuel injection timing feedback controller 79_i.

$$E\_Ginj\_i(q) = (1 - We\_i)Pre\_dPmax\_i(q) \quad (4\text{-}7)$$

$$E\_\theta inj\_i(q) = We\_i\, Pre\_dPmax\_i(q) \quad (4\text{-}8)$$

As the distribution coefficient We_i in the expressions (4-7) and (4-8), a value in the range of 0 and 1 is set for each of the combustion model-based controllers 7_i. That is, as illustrated in FIG. 2, the N combustion model-based controllers 71_1 to 71_N are parallely disposed in the present embodiment, and the values of the distribution coefficients We_1 to We_N for the N combustion model-based controllers 71_1 to 71_N are different from each other. Therefore, the controllers 71_1 to 71_N respectively calculate the predicted fuel injection timing correction values dθinj_1 to dθinj_N, the predicted fuel injection quantity correction values dGinj_1 to dGinj_N, and the predicted torques Pre_Trq_1 to Pre_Trq_N under different conditions so that predicted maximum cylinder pressures Pre_Pmax_1 to Pre_Pmax_N are equal to or lower than the target maximum cylinder pressure Pmax_trgt.

The fuel injection timing feedback controller 79_i includes a sliding mode controller having the same structure as the local correction coefficient calculator 923 of the model adapter 9. The fuel injection timing feedback controller 79_i first calculates the sum of the deviation E_θinj_i(q) and the product of a switching function set parameter POLE_θinj and the previous value of the deviation E_θinj_i(q−1) as shown in the following expression (4-9), and defines the sum as the switching function σθinj_i(q). The switching function set parameter POLE_θinj is set in the range of −1 to 0 based on a predetermined setting table.

$$\sigma\theta inj\_i(q) = E\_\theta inj\_i(q) + POLE\_\theta inj\, E\_\theta inj\_i(q-1) \quad (4\text{-}9)$$

Next, as shown in the following expression (4-10), a predicted fuel injection timing correction value dθinj_i(q) is defined as the sum of a reaching law input dθinj_rch_i(q) and the previous value of an adaptation law input dθinj_adp_i(q−1).

$$d\theta inj\_i(q) = d\theta inj\_rch\_i(q) + d\theta inj\_adp\_i(q-1) \quad (4\text{-}10)$$

As shown in the following expression (4-11), the reaching law input dθinj_rch_i(q) is the product of a predetermined reaching law gain Krch_θinj and the switching function σθinj_i(q). As shown in the following expression (4-12), the adaptation law input dθinj_adp_i(q) is the product of the adaptation law gain Kadp_θinj and the sum of the switching function σθinj_i up to the present time q.

$$d\theta inj\_rch\_i(q) = Krch\_\theta inj\, \sigma\theta inj\_i(q) \quad (4\text{-}11)$$

$$d\theta inj\_adp\_i(q) = Kadp\_\theta inj \sum_{l=0}^{q} \sigma\theta inj\_i(l) \quad (4\text{-}12)$$

The fuel injection quantity feedback controller 78_i includes a sliding mode controller that operates in the same manner as the fuel injection timing feedback controller 791. First, as illustrated in the following expression (4-13), the fuel injection quantity feedback controller 78_i calculates the sum of the switching function set parameter POLE_Ginj and the previous value of deviation E_Ginj_i(q−1), and defines the sum as a switching function σGinj_i (q). The switching function set parameter POLE_Ginj is set at a value in the range of −1 to 0 based on a predetermined setting table.

$$\sigma Ginj\_i(q) = E\_Ginj\_i(q) + POLE\_Ginj\, E\_Ginj\_i(q-1) \quad (4\text{-}13)$$

Next, as illustrated in the following expression (4-14), a predicted fuel injection quantity correction value dGinj_i(q) is defined as the sum of the reaching law input dGinj_rch_i(q) and the previous value of the adaptation law input dGinj_adp_i(q−1).

$$dGinj\_i(q) = dGinj\_rch\_i(q) + dGinj\_adp\_i(q-1) \quad (4\text{-}14)$$

As show in the following expression (4-15), the reaching law input dGinj_rch_i(q) is the product of the predetermined reaching law gain Krch_Ginj and the switching function σGinj_i(q). As shown in the following expression (4-16), the adaptation law input dGinj_adp_i(q) is the product of an adaptation law gain Kadp_Ginj and the sum of the switching function σGinj_i up to the present time q.

$$dGinj\_rch\_i(q) = Krch\_Ginj\, \sigma Ginj\_i(q) \quad (4\text{-}15)$$

$$dGinj\_adp\_i(q) = Kadp\_Ginj \sum_{l=0}^{q} \sigma Ginj\_i(l) \quad (4\text{-}16)$$

5. Optimum Input Selector

Referring back to FIG. 2, the structure of the optimum input selector 8 will be described. As described above, the N combustion model-based controllers 7_1 to 7_N respectively calculate the predicted fuel injection timing correction values dθinj_1 to dθinj_N and the predicted fuel injection quantity correction values dGinj_1 to dGinj_N by performing recursive calculation under different optimization conditions. A predetermined priority condition is set in the optimum input selector 8. The optimum input selector 8 selects one of the N sets of correction values (dθinj_1, dGinj_1) to (dθinj_N, dGinj_N) that best matches the priority condition, and determines the correction values of the selected set as the optimum fuel injection quantity correction value dGinj_opt and the optimum fuel injection timing correction value dθinj_opt.

In the present embodiment, the predetermined priority condition is set with respect to the predicted torque Pre_Trq_i that is calculated together with the set of correction values (dθinj_i, dGinj_i). The set of correction values (dθinj_i, dGinj_i), which is calculated by the combustion model-based controller 7_i, is determined so that the predicted maximum cylinder pressure Pre_Pmax_i is equal to or lower than the target maximum cylinder pressure Pmax_trgt. However, because the optimization conditions are different, the values of the predicted torque Pre_Trq_i differ among the controllers. Therefore, as illustrated in the following expression (5-1), the number iop of the controller that best matches a priority condition is determined so that the predicted torque Pre_Trq_i is maximized. In the following expression (5-1), the calculation time me is a time at which the optimum input selector 8 operates. The calculation time me is appropriately set so as to be in time for the fuel injection in the next combustion cycle.

$$iop \leftarrow \text{the number of combustion model base optimization controller that maximizes } Pre\_Trq\_i(me, \theta inj\_i(me), Ginj\_i(me))(i \leq iop \leq N) \quad (5\text{-}1)$$

As shown in the following expressions (5-2) and (5-3), the correction values (dθinj_iop, dGinj_iop) that are calculated by the controller having the number iop is determined as the fuel injection timing correction value dθinj and the fuel injection quantity correction value dGinj.

$$d\theta inj(k) \leftarrow d\theta inj\_iop(me) \quad (5\text{-}2)$$

$$dGinj(k) \leftarrow dGinj\_iop(me) \quad (5\text{-}3)$$

As shown in the expressions (1-1) and (1-2), the fuel injection timing θinj and the fuel injection quantity Ginj are determined based on the fuel injection timing correction value dθinj and the fuel injection quantity correction value dGinj, which have been thus determined.

6. Flowchart

Figure 16:
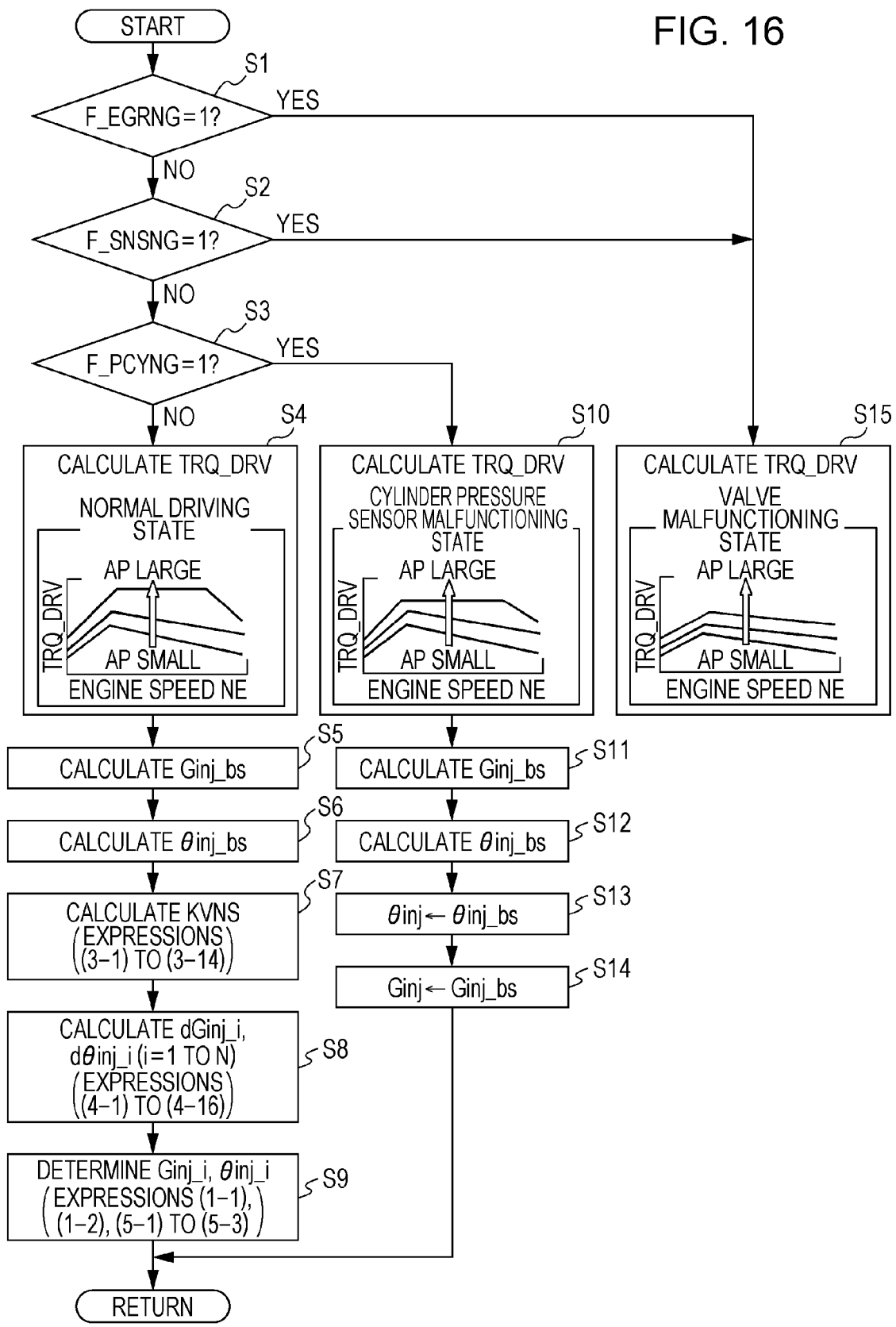
FIG. 16 is a flowchart of the maximum cylinder pressure control process performed by the control device according to the first embodiment.

Next, referring to FIG. 16, the process of controlling the maximum cylinder pressure performed by the control device 2 will be described. FIG. 16 is a flowchart of the process of maximum cylinder pressure control performed by the control device 2. In step S1, whether or not the EGR valve malfunction flag F_EGRNG is 1 is determined. In a determination procedure (not shown), the EGR valve malfunction flag F_EGRNG has been set at 1 if it is determined that the EGR valve is malfunctioning and otherwise set at 0. If the determination is "NO", the process proceeds to step S2.

In step S2, whether or not the sensor malfunction flag F_SNSNG is 1 is determined. In a determination procedure (not shown), the sensor malfunction flag F_SNSNG has been set at 1 if it is determined that any of the intake pressure sensor, the exhaust pressure sensor, the EGR valve opening sensor, and the airflow sensor is malfunctioning, and otherwise set at 0. If the determination is "NO", the process proceeds to step S3.

In step S3, whether or not the cylinder pressure sensor malfunction flag F_PCYLNG is 1 is determined. In a determination procedure (not shown), the cylinder pressure sensor malfunction flag F_PCYLNG has been set at 1 is it is determined that the cylinder pressure sensor is malfunctioning, and otherwise set at 0. If the determination is "NO", the process proceeds to step S4.

In step S4, the driver requested torque TRQ_DRV is calculated based on the engine speed NE and the accelerator opening AP by performing a search in a map used for a normal driving state illustrated in FIG. 16, and the process proceeds to step S5.

In step S5, the basic fuel injection quantity Ginj_bs is calculated based on the engine speed NE and the driver requested torque TRQ_DRV by performing a search in a predetermined map, and the process proceeds to step S6. In step S6, the basic fuel injection timing θinj_bs is calculated based on the engine speed NE and the driver requested torque TRQ_DRV by performing a search in a predetermined map, and the process proceeds to step S7.

In step S7, the model adapter 9 calculates the adaptive correction coefficient KVNS in accordance with the expressions (3-1) to (3-14), and the process proceeds to step S8. In step S8, the N combustion model-based controllers 7_i (i=1 to N) calculate the N sets of correction values (dGinj_i, dθinj_i) (i=1 to N) in accordance with the expressions (4-1) to (4-16). In step S9, the optimum input selector 8 selects the optimum set of correction values (dGinj_opt, dθinj_opt) from the sets of correction values (dGinj_i, dθinj_i) (i=1 to N) (see the expressions (5-1) to (5-3)), determines the fuel injection timing θinj and the fuel injection quantity Ginj based on the optimum set of correction values (see the expressions (1-1) and (1-2)), and then the process is finished.

If the determination in step S3 is "YES", which means that the cylinder pressure sensor is malfunctioning, the process proceeds to step S10 to stop the correction value calculator 6. In step S10, the driver requested torque TRQ_DRV is calculated based on the engine speed NE and the accelerator opening AP by performing a search in a map used for a cylinder pressure sensor malfunctioning state illustrated in FIG. 16, and the process proceeds to step S11. The value of driver requested torque TRQ_DRV, which is calculated by performing a search in the map used for a cylinder pressure sensor malfunctioning state, is slightly smaller than the value calculated by performing a search in the map used for a normal driving state so that the maximum cylinder pressure does not exceed the target maximum cylinder pressure even if the correction value calculator 6 is stopped.

In step S11, the basic fuel injection quantity Ginj_bs is calculated based on the engine speed NE and the driver requested torque TRQ_DRV by performing a search in a predetermined map, and the process proceeds to step S12. In step S12, the basic fuel injection timing θinj_bs is calculated based on the engine speed NE and the driver requested torque TRQ_DRV by performing a search in a predetermined map, and the process proceeds to step S13.

In step S13, the basic fuel injection quantity Ginj_bs is determined as the fuel injection quantity Ginj, and the process proceeds to step S14. In step S14, the basic fuel injection timing θinj_bs is determined as the fuel injection timing, and the process is finished.

If the determination in step S1 or S2 is "YES", which means that at least one of the sensors or the EGR valve is malfunctioning, the process proceeds to step S15 to stop the correction value calculator 6. In step S15, the driver requested torque TRQ_DRV is calculated based on the engine speed NE and the accelerator opening AP by performing a search in a map used for a valve malfunctioning state illustrated in FIG. 16, and the process proceeds to step S11. The value of driver requested torque TRQ_DRV, which is calculated by performing a search in the map used for a valve malfunctioning state, is smaller than the value calculated by performing a search in the map used for the cylinder pressure sensor malfunctioning state so that the maximum cylinder pressure does not exceed the target maximum cylinder pressure even if the correction value calculator 6 is stopped and so that the engine is protected.

7. Simulation Result

A simulation result of the maximum cylinder pressure control performed by the control device 2 according to the present embodiment will be described.

Figure 17:
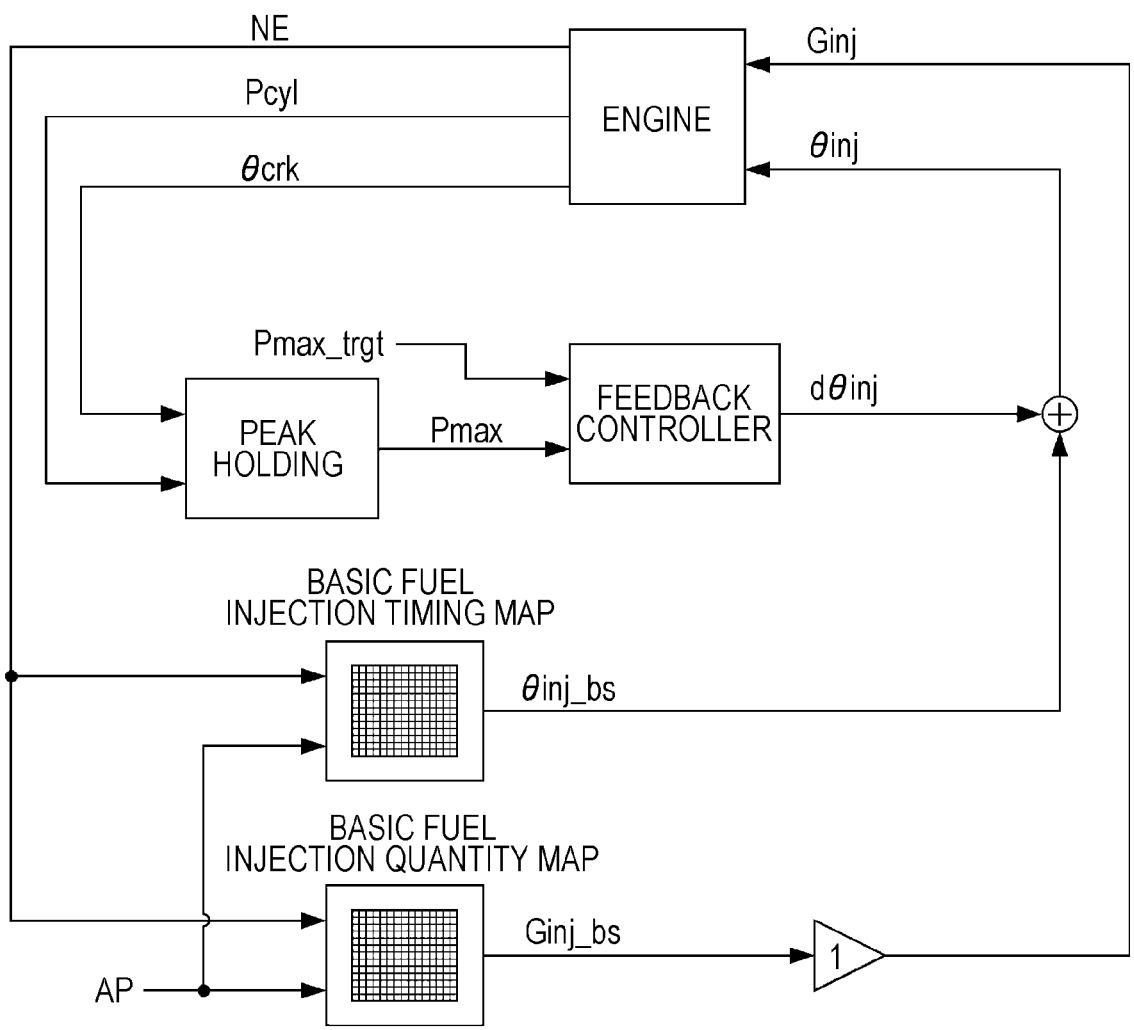
FIG. 17 is a block diagram of an existing control device.

First, referring to FIGS. 17 and 18, a simulation result of the maximum cylinder pressure control performed by an existing control device will be described for comparison with the present embodiment. FIG. 17 is a block diagram of the existing control device. As with the present embodiment, the existing control device calculates the basic fuel injection timing θinj_bs and the basic fuel injection quantity Ginj_bs by performing a search in a map.

As shown in the following expression (6-1), a feedback controller calculates the maximum cylinder pressure deviation dPmax. To be specific, the maximum cylinder pressure deviation dPmax is defined as the difference between the maximum cylinder pressure Pmax and the target maximum cylinder pressure Pmax_trgt. The maximum cylinder pressure deviation dPmax is set at 0, if the maximum cylinder pressure Pmax is lower than the target maximum cylinder pressure Pmax_trgt.

$$dP\max(k) = \begin{cases} P\max(k) - P\max\_trgt & (P\max(k) \geq P\max\_trgt) \\ 0 & (P\max(k) < P\max\_trgt) \end{cases} \quad (6\text{-}1)$$

The feedback controller calculates the fuel injection timing correction value dθinj so that the maximum cylinder pressure deviation dPmax becomes 0, that is, the detection value Pmax becomes equal to or smaller than the target value Pmax_trgt when the maximum cylinder pressure Pmax exceeds the target maximum cylinder pressure Pmax_trgt. As a feedback algorithm, a sliding mode algorithm, which is similar to that shown in expressions (4-9) to (4-12), is used.

Figure 18:
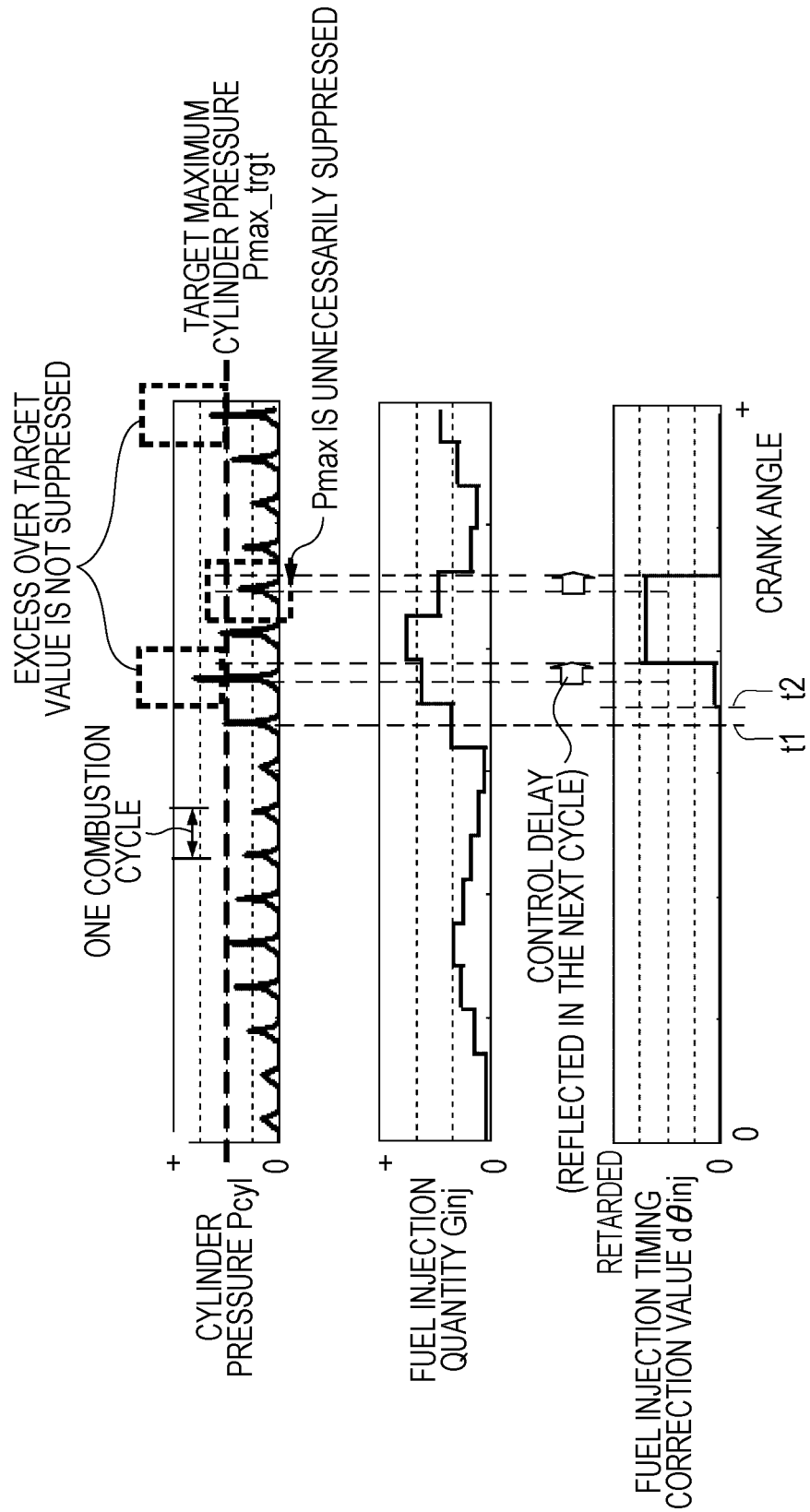
FIG. 18 is a graph illustrating changes in the fuel injection quantity, the fuel injection timing correction value, and the cylinder pressure when the existing control device performs a maximum cylinder pressure control.

FIG. 18 is a graph illustrating changes in the fuel injection quantity, the fuel injection timing correction value, and the cylinder pressure when the existing control device performs the maximum cylinder pressure control. As illustrated in FIG. 18, in the existing control device, the feedback controller starts operating when the cylinder pressure value exceeds the target value Pmax_trgt at time t1, and calculates the fuel injection timing correction value dθinj that is not 0 at time t2. Thus, a control delay inevitably occurs, so that the maximum cylinder pressure Pmax may considerably exceed the target value Pmax_trgt, if occasionally. Conversely, due to the occurrence of such a control delay, the maximum cylinder pressure Pmax may be unnecessarily suppressed so that the maximum cylinder pressure Pmax becomes considerably lower than the target value Pmax_trgt.

Next, referring to FIGS. 19 to 22, simulation results according to the present embodiment will be described. The simulation is performed under three different conditions illustrated in FIG. 19. Under a condition 1, the operation of the combustion model-based controller 7_i of the optimization controller 5 is turned on, and the operation of the model adapter 9 is turned off. Under a condition 2, the operation of the combustion model-based controller 7_i of the optimization controller 5 is turned on, the operation of the model adapter 9 is turned off, and a modeling error was provided. The modeling error is an error that occurs when the state of an engine that is represented by the combustion model, which is included in the combustion model-based controller 7_i and the model adapter 9, is different from the state of an actual engine. Under a condition 3, the operation of the combustion model-based controller 7_i of the optimization controller 5 is turned on, the operation of the model adapter 9 is turned on, and a modeling error was provided.

Figure 20:
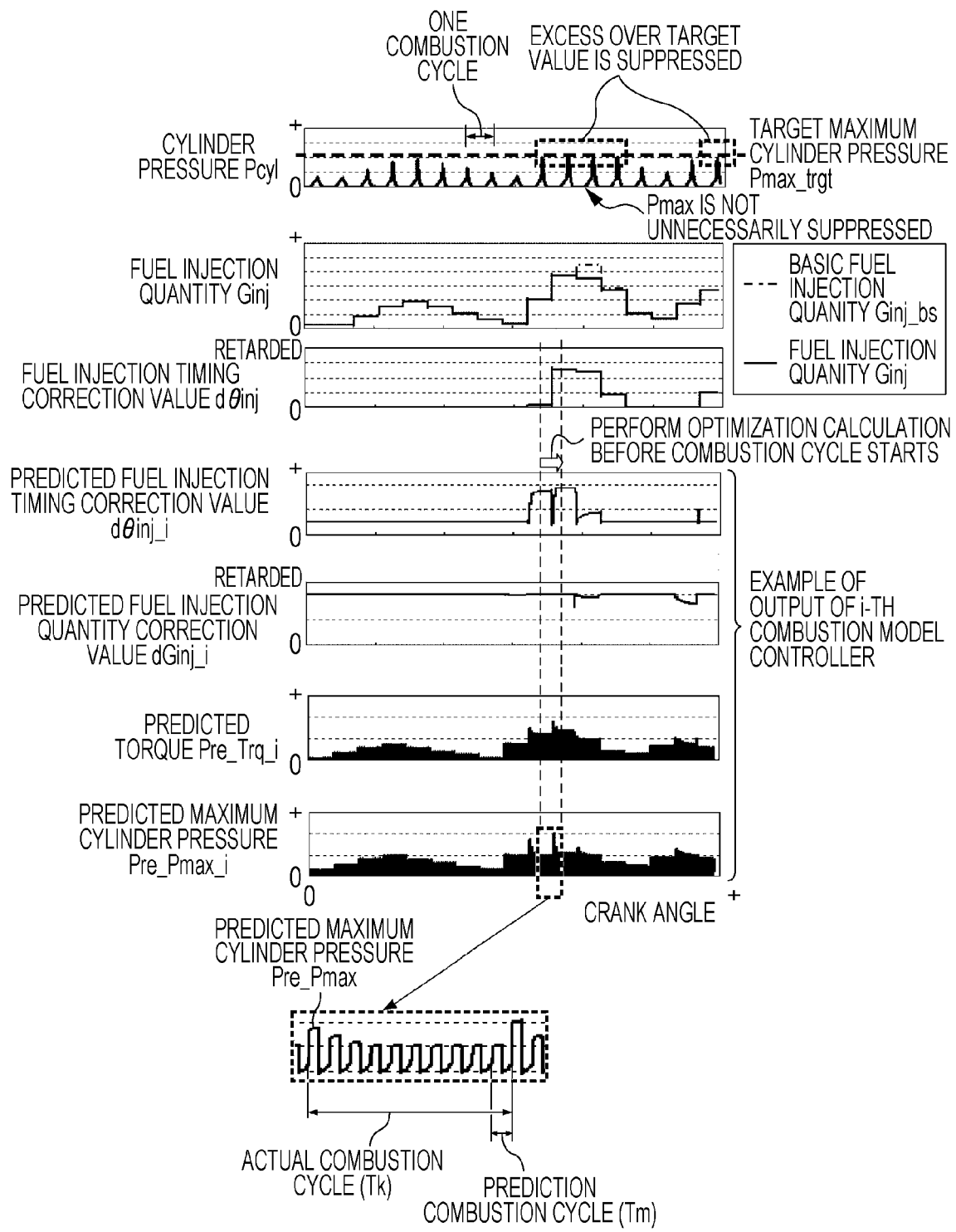
FIG. 20 is a graph illustrating a simulation result obtained when the control device according to the first embodiment is operated under the condition 1.

FIG. 20 is a graph illustrating changes in the following values and quantities when the control device according to the present embodiment is operated under the condition 1: the cylinder pressure detection value Pcyl, the fuel injection quantity Ginj, the basic fuel injection quantity Ginj_bs, the fuel injection timing correction value dθinj, the predicted fuel injection timing correction value dθinj_i, the predicted fuel injection quantity correction value dGinj_i, the predicted torque Pre_Trq_i, and the predicted maximum cylinder pressure Pre_Pmax_i. At the bottom of FIG. 20, an enlarged view of the predicted maximum cylinder pressure Pre_Pmax_i, which is calculated at the calculation cycle Tm, over the calculation cycle Tk is illustrated.

As described above, the combustion model-based controller calculates the predicted fuel injection timing correction value dθinj_i and the predicted fuel injection quantity correction value dGinj_i so that the predicted maximum cylinder pressure Pre_Pmax_i does not exceed the target maximum cylinder pressure Pmax_trgt by performing recursive calculation using a combustion model until the fuel injection timing θinj and the fuel injection quantity Ginj of the next injection are determined. Then, out of the sets of the correction values (dθinj_i, dGinj_i) (i=1 to N), which are calculated by the N controllers, the fuel injection quantity Ginj and the fuel injection timing correction value dθinj are determined based on the correction values that are calculated by the controller that outputs the largest predicted torque Pre_Trq_i (i=1 to N). Therefore, as illustrated in FIG. 20, the cylinder pressure detection value Pcyl does not exceed the target maximum cylinder pressure Pmax_trgt. As can be seen from the comparison with the simulation result for the existing control device illustrated in FIG. 18, according to the present embodiment, control that unnecessary suppresses the maximum cylinder pressure Pmax is not performed after control to suppress the maximum cylinder pressure Pmax is performed. Moreover, it can be seen that the balances of the corrections of the fuel injection quantity Ginj and the fuel injection timing θinj change. This is because, while suppressing the maximum cylinder pressure Pmax to be equal to or lower than the target value Pmax_trgt, correction is performed so as to maximize the torque, that is, to maximize the combustion efficiency.

Figure 21:
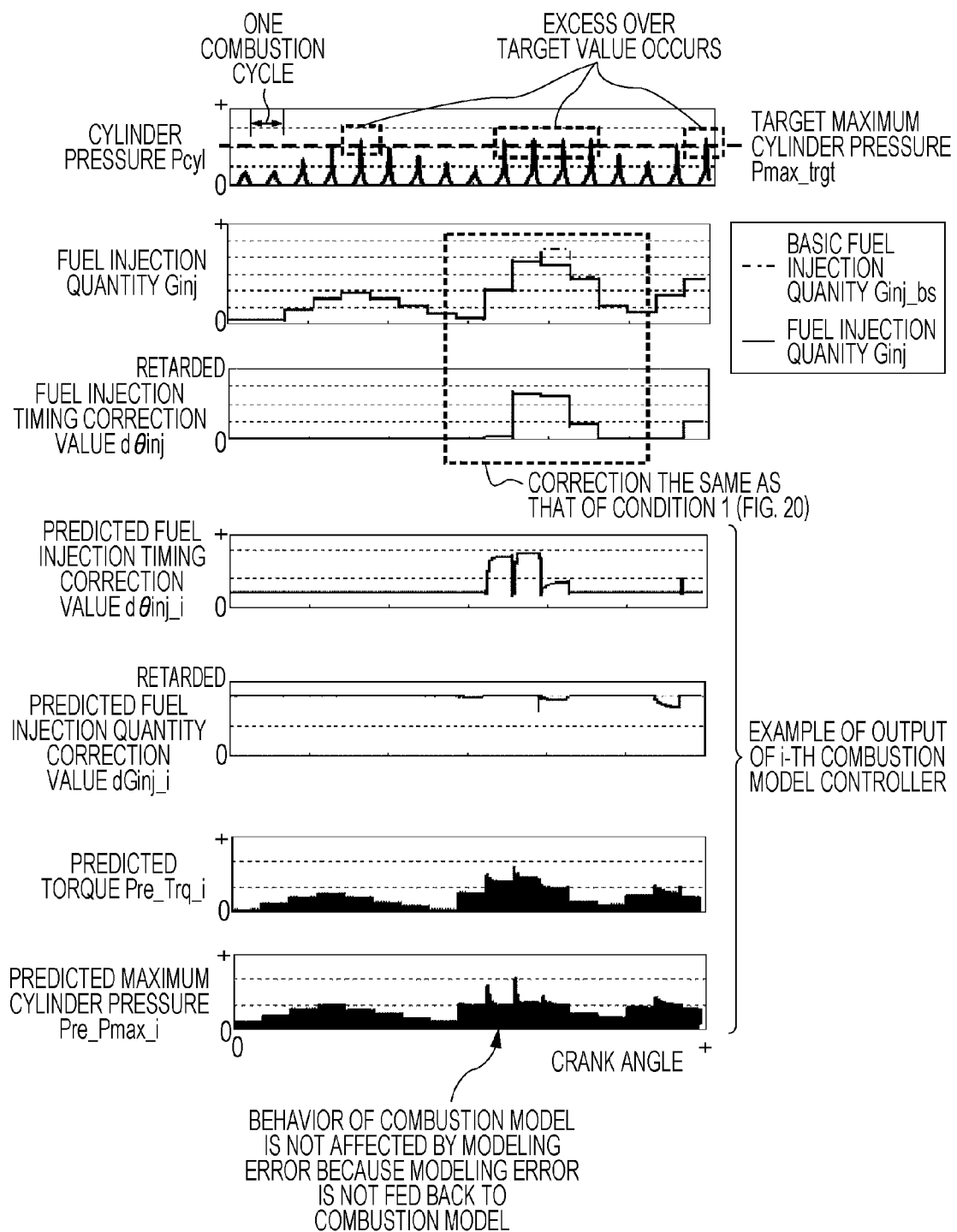
FIG. 21 is a graph illustrating a simulation result obtained when the control device according to the first embodiment is operated under the condition 2.

FIG. 21 is a graph illustrating changes in the following values and quantities when the control device according to the present embodiment is operated under the condition 2: the cylinder pressure detection value Pcyl, the fuel injection quantity Ginj, the basic fuel injection quantity Ginj_bs, the fuel injection timing correction value dθinj, the predicted fuel injection timing correction value dθinj_i, the predicted fuel injection quantity correction value dGinj_i, the predicted torque Pre_Trq_i, and the predicted maximum cylinder pressure Pre_Pmax_i.

To be more specific, under the condition 2, a modeling error that makes the predicted value of the combustion model be 20% larger than the detection value of the actual engine is provided. Under the condition 2, the model adapter is not operated. Therefore, the optimization controller does not perform a feedback operation that makes the predicted value Pre_Pmax_i be the same as the detection value Pmax, and the fuel injection quantity Ginj and the fuel injection timing θinj are determined in a feed-forward manner. As a result, the maximum cylinder pressure Pmax may exceed the target value Pmax_trgt.

Figure 22:
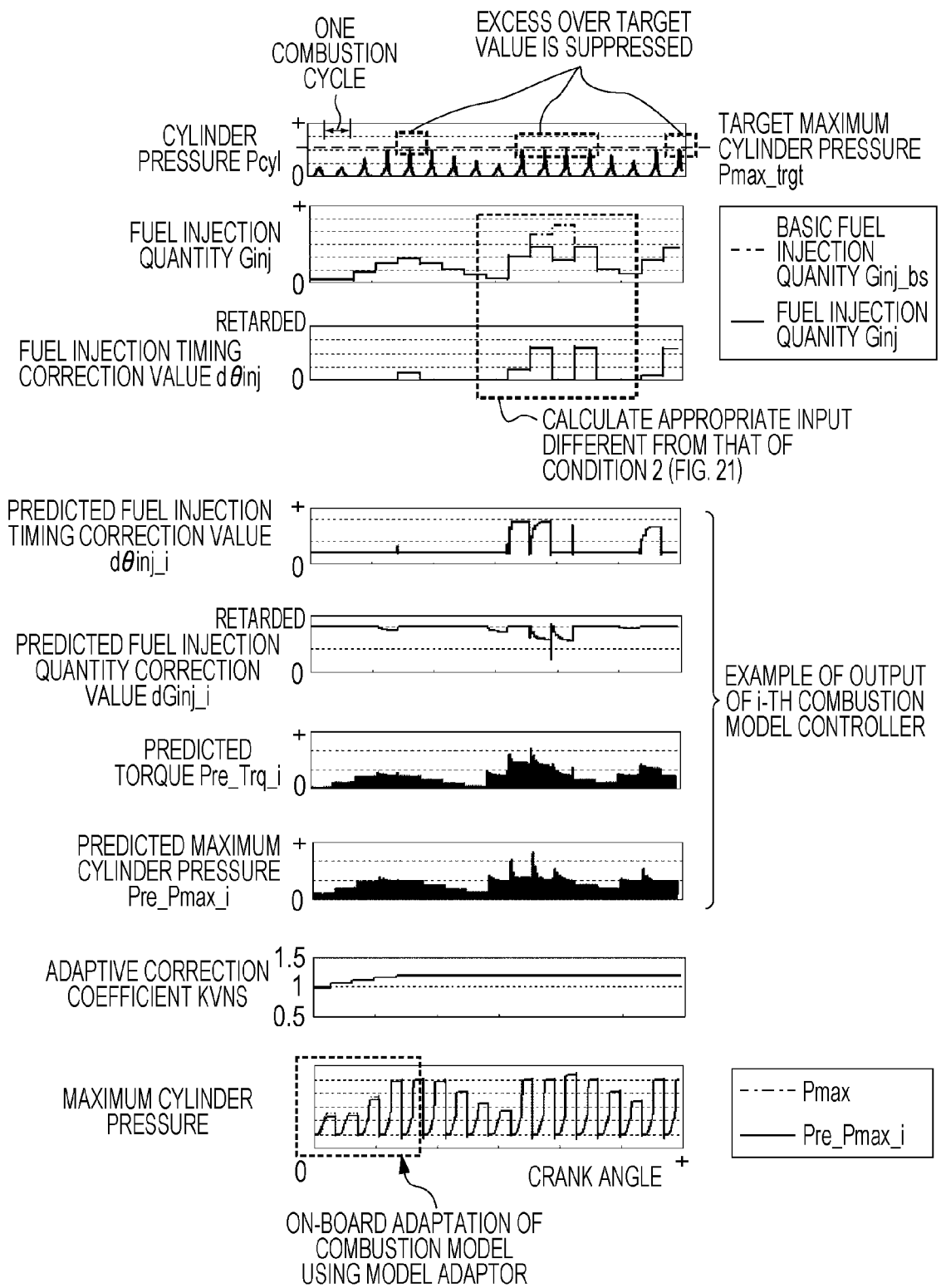
FIG. 22 is a graph illustrating a simulation result obtained when the control device according to the first embodiment is operated under the condition 3.

FIG. 22 is a graph illustrating changes in the following values and quantities when the control device according to the present embodiment is operated under the condition 3: the cylinder pressure detection value Pcyl, the fuel injection quantity Ginj, the basic fuel injection quantity Ginj_bs, the fuel injection timing correction value dθinj, the predicted fuel injection timing correction value dθinj_i, the predicted fuel injection quantity correction value dGinj_i, the predicted torque Pre_Trq_i, the predicted maximum cylinder pressure Pre_Pmax_i, the predicted value Pre_Pmax_i of the maximum cylinder pressure, and the maximum cylinder pressure Pmax.

Under the condition 3, a modeling error is provided as with the condition 2, and the model adapter was operated. Therefore, as shown by a broken line in the bottom section of FIG. 22, right after the simulation starts, there is an error between the maximum cylinder pressure predicted value Pre_Pmax_i calculated by the combustion model and the actual detection value Pmax. However, as the model adapter gradually changes the adaptive correction coefficient KVNS to an appropriate value, the error between the predicted value Pre_Pmax_i and the detection value Pmax disappears. That is, the modeling error provided at the start of the simulation automatically disappears. Therefore, the cylinder pressure detection value Pcyl does not exceed the target value Pmax_trgt. By comparing FIG. 22 with FIG. 21, it can be seen that the balances of corrections of the fuel injection quantity Ginj and the fuel injection timing θinj after the combustion model is corrected by the model adapter (FIG. 22) differ from those before the combustion model is corrected by the model adapter (FIG. 21). This is realized by using the neural network that includes an adaptive corrector as the combustion model and by successively selecting the optimum control input using the optimization controller in accordance with a change in the combustion model, which is difficult to realize by using an existing method using a map.

According to the present embodiment, the following advantages are obtained.

(1) According to the present embodiment, the combustion model-based controller 7_i of the optimization controller 5 corrects the predicted fuel injection quantity Ginj_i and the predicted fuel injection timing θinj_i so that the predicted maximum cylinder pressure Pre_Pmax_i that is calculated by the combustion model when the predicted fuel injection quantity Ginj_i and the predicted fuel injection timing θinj_i are input to the combustion model becomes equal to or smaller than the target maximum cylinder pressure Pmax_trgt. Moreover, the optimization controller 5 determines a control input to the engine based on the predicted fuel injection quantity Ginj_i and the predicted fuel injection timing θinj_i that have been corrected. Thus, the control input is determined so that the maximum cylinder pressure Pmax is always equal to or lower than the target maximum cylinder pressure Pmax_trgt. As a result, according to the present embodiment, the control input is determined by the combustion model in a feed-forward manner before the maximum cylinder pressure Pmax exceeds the target maximum cylinder pressure Pmax_trgt. Therefore, the maximum cylinder pressure Pmax is prevented from considerably exceeding the target maximum cylinder pressure Pmax_trgt due to a control delay. Conversely, control that unnecessarily suppresses the maximum cylinder pressure Pmax to be lower than the target maximum cylinder pressure Pmax_trgt is prevented from being performed.

(2) According to the present embodiment, the N combustion model-based controllers correct the predicted fuel injection quantity Ginj_i and the predicted fuel injection timing θinj_i under different optimization conditions so that the predicted maximum cylinder pressure Pre_Pmax_i is lower than the target maximum cylinder pressure Pmax_trgt. From the predicted fuel injection quantity Ginj_i and the predicted fuel injection timing θinj_i, which have been calculated by the combustion model-based controllers, the optimum input selector 8 selects the predicted fuel injection quantity Ginj_i and the predicted fuel injection timing θinj_i that maximize the predicted torque Pre_Trq_i, and determines the selected Ginj_i and θinj_i as the control input to the engine. Thus, a negative effect that may occur, for example, when the torque is controlled to be excessively small by determining the control input so that maximum cylinder pressure Pmax is lower than the target maximum cylinder pressure Pmax_trgt, is prevented. That is, undesired change in torque is prevented while maintaining the maximum cylinder pressure Pmax at an appropriate level.

(3) According to the present embodiment, by using a neural network as the plant model, precise calculation having only a small modeling error can be performed with computational complexity that can be handled by an automobile computer. Although the neural network has many parameters, the parameters can be set at appropriate values by using an existing method, because the neural network does not identify these parameters as model parameters having physical meanings.

(4) According to the present embodiment, the model adapter 9 adaptively corrects the combustion model so as to reduce the deviation of the predicted maximum cylinder pressure Pre_Pmax_i, which is calculated by the combustion model, from the maximum cylinder pressure Pmax. Thus, even if the engine has a problem due to deterioration or production variation, the predicted maximum cylinder pressure Pre_Pmax_i that is calculated by the combustion model can be always adjusted to the maximum cylinder pressure Pmax, so that an appropriate control input can be determined irrespective of the deterioration or the production variation.

(5) According to the present embodiment, the model adapter 9 calculates the adaptive correction coefficient KVNS, which is input to the neural network of the combustion model, so as to reduce the deviation of the estimated maximum cylinder pressure Est_Pmax, which is calculated by the combustion model, from the maximum cylinder pressure Pmax. Thus, if the engine has a problem due to deterioration or production variation, the estimated maximum cylinder pressure Est_Pmax that is calculated by the combustion model can be always adjusted to the maximum cylinder pressure Pmax of an actual engine, so that an appropriate control input can be determined irrespective of the deterioration or the production variation.

(6) According to the present embodiment, when calculating the product or the sum of the adaptive correction coefficient KVNS and the output of the neural network (in the case of the output-correction type), it is not necessary to learn a change in the characteristics of the engine. Therefore, if the engine is changed in an unexpected manner as described above, the modeling error can be compensated for with a comparatively high precision.

(7) According to the present embodiment, the local correction coefficient Uij is calculated for each region in the space having the reference parameter (NE, Ginj) as a basis. Thus, the adaptive correction coefficient KVNS can be determined with consideration of an error that varies in accordance with the state of the engine.

(8) According to the present embodiment, the predicted fuel injection quantity Ginj_i and the predicted fuel injection timing θinj_i are corrected so that the predicted maximum cylinder pressure Pre_Pmax_i that is calculated by the combustion model when temporary values of the predicted fuel injection quantity Ginj_i and the predicted fuel injection timing θinj_i are input to the combustion model does not exceed the target maximum cylinder pressure Pmax_trgt. Then, the fuel injection quantity Ginj and the fuel injection timing θinj are determined based on the predicted fuel injection quantity Ginj_i and the predicted fuel injection timing θinj_i, which have been corrected, and input to the engine. Thus, the maximum cylinder pressure Pmax is prevented from exceeding the target maximum cylinder pressure Pmax_trgt, and thereby the strength of the engine block can be maximally utilized.

Second Embodiment

Next, a second embodiment of the present invention will be described with reference to the drawings. In the following description of the second embodiment, the elements the same as those of the first embodiment will be denoted by the same numerals, and the description of such elements will be omitted or shortened.

Figure 23:
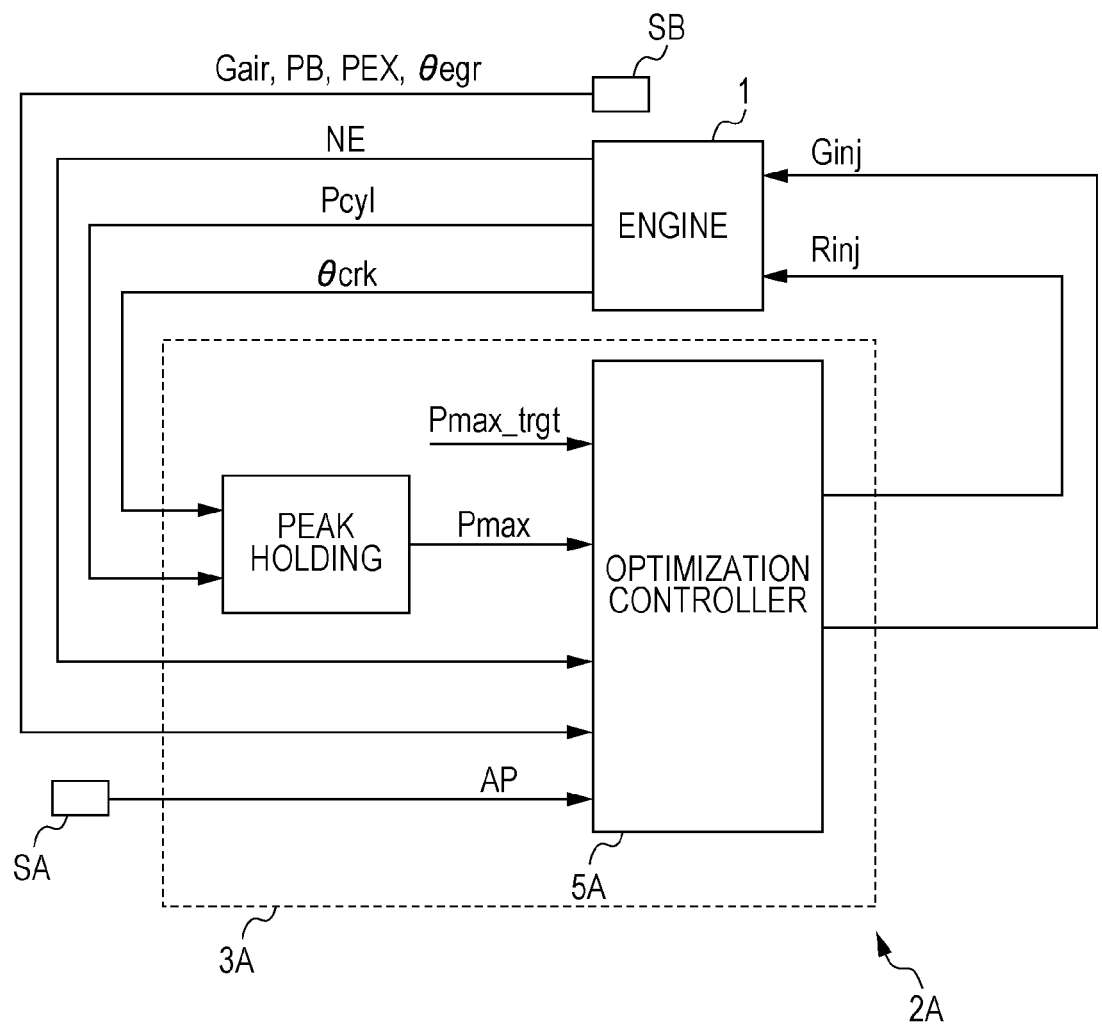
FIG. 23 is a block diagram of an engine and a control device for the engine according to a second embodiment of the present invention.

FIG. 23 is a block diagram of the engine 1 (i.e., a plant) and a control device 2A according to the present embodiment. In the present embodiment, the control device 2A includes an ECU 3A including an optimization controller 5A. In order to control the maximum cylinder pressure Pmax to be equal to or lower than the target maximum cylinder pressure Pmax_trgt, the optimization controller 5A determines the fuel injection quantity Ginj, which is input to the fuel injection valve of the engine 1 at each combustion cycle, and the fuel injection split ratio Rinj for the main injection, which is input at each combustion cycle, to be at optimum values.

If the main injection is performed, for example, in two stages, the fuel injection split ratio Rinj is the ratio of a first main fuel injection quantity Ginj_min1 to a second main fuel injection quantity Ginj_min2. The fuel injection split ratio is set in the range of 0 to 1. To be specific, by using the fuel injection split ratio Rinj, the first main fuel injection quantity Ginj_min1 and the second main fuel injection quantity Ginj_min2 are determined as shown in the following expressions (7-1) and (7-2).

$$Ginj\_min1(k) = Rinj\, Ginj\_min(k) \quad (7\text{-}1)$$

$$Ginj\_min2(k) = (1 - Rinj) Ginj\_min(k) \quad (7\text{-}2)$$

Figure 24:
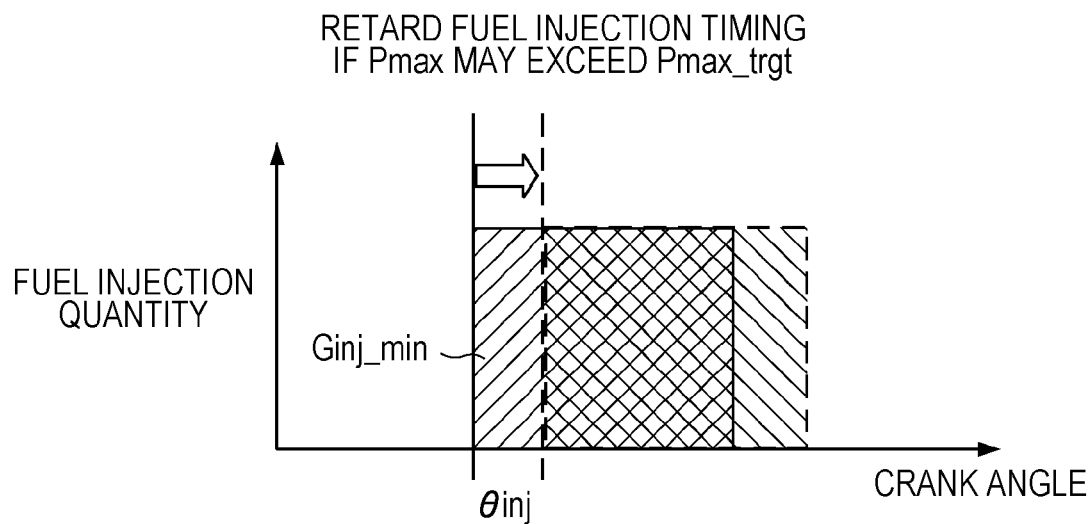
FIG. 24 is a schematic graph illustrating retardation of the fuel injection timing.
Figure 25:
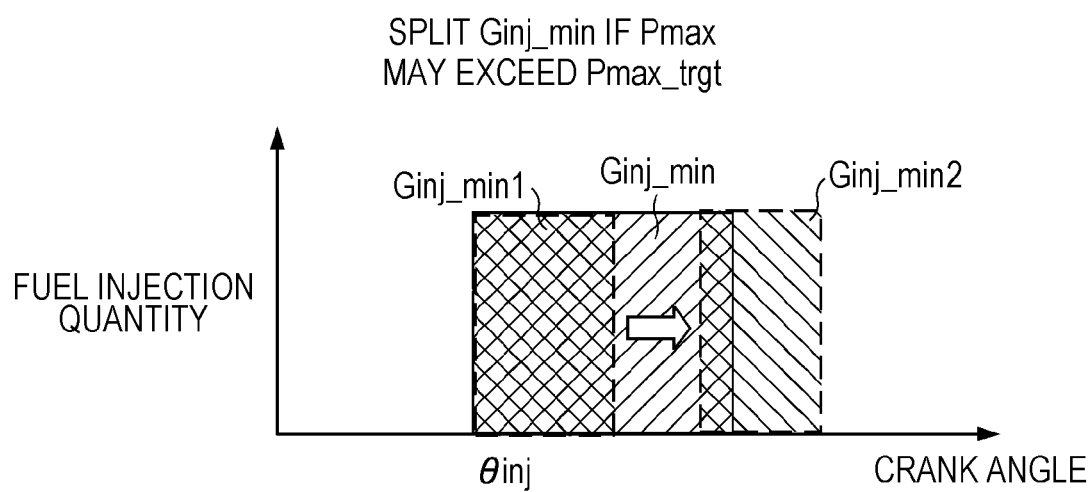
FIG. 25 is a schematic graph illustrating splitting of the main injection.

FIG. 24 is a schematic graph illustrating retardation of the fuel injection timing θinj. FIG. 25 is a schematic graph illustrating splitting of the main injection. In the first embodiment, if the maximum cylinder pressure Pmax may exceed the target value Pmax_trgt, correction is performed so as to reduce the fuel injection quantity Ginj or, as shown in FIG. 24, the fuel injection timing θinj is corrected so as to retard the timing at which the main injection is performed. In contrast, in the second embodiment, if the maximum cylinder pressure Pmax may exceed the target value Pmax_trgt, correction is performed so as to reduce the fuel injection quantity Ginj, or as shown in FIG. 25, the ratio of the first main fuel injection quantity Ginj_min1 to the second main fuel injection quantity Ginj_min2 is changed while maintaining the sum of the first main fuel injection quantity Ginj_min1 and the second main fuel injection quantity Ginj_min2 to be equal to the main fuel injection quantity Ginj_min.

According to the present embodiment, the following advantage is obtained in addition to the advantages described above in (1) to (7).

(9) According to the present embodiment, temporary values of the fuel injection quantity Ginj and the fuel injection split ratio Rinj for the main fuel injection are corrected so that the predicted maximum cylinder pressure Pre_Pmax_i that is calculated by the combustion model when the temporary values are input to the combustion model does not exceed the target maximum cylinder pressure Pmax_trgt. Then, the fuel injection quantity Ginj and the fuel injection split ratio Rinj are determined based on the corrected temporary values, and input to the engine. Thus, the maximum cylinder pressure Pmax is prevented from exceeding the target maximum cylinder pressure Pmax_trgt, whereby the strength of the engine block can be maximally utilized.

In the first embodiment, the fuel injection quantity Ginj and the fuel injection timing θinj are adjusted in order to control the maximum cylinder pressure Pmax to be equal to or lower than the target value Pmax_trgt. In the second embodiment, the fuel injection quantity Ginj and the fuel injection split ratio Rinj are adjusted for the same purpose. However, the control parameters for controlling the maximum cylinder pressure Pmax are not limited thereto. Examples of other control parameters include the pilot fuel injection quantity, the number of times of the pilot injection is performed, the EGR ratio, and the supercharging pressure. The EGR ratio and the supercharging pressure, which have a long response delay, may be considered to be unsuitable for suppression control of the maximum cylinder pressure Pmax, for which a rapid response is required. However, the combustion model included in the combustion model-based controller, which uses a neural network that is capable of taking a delay characteristic into account, can determine other control parameters so as to compensate for the delay.

Third Embodiment

Next, a third embodiment of the present invention will be described with reference to the drawings. In the following description of the third embodiment, the elements the same as those of the first embodiment will be denoted by the same numerals and the description of such elements will be omitted or shortened.

Figure 26:
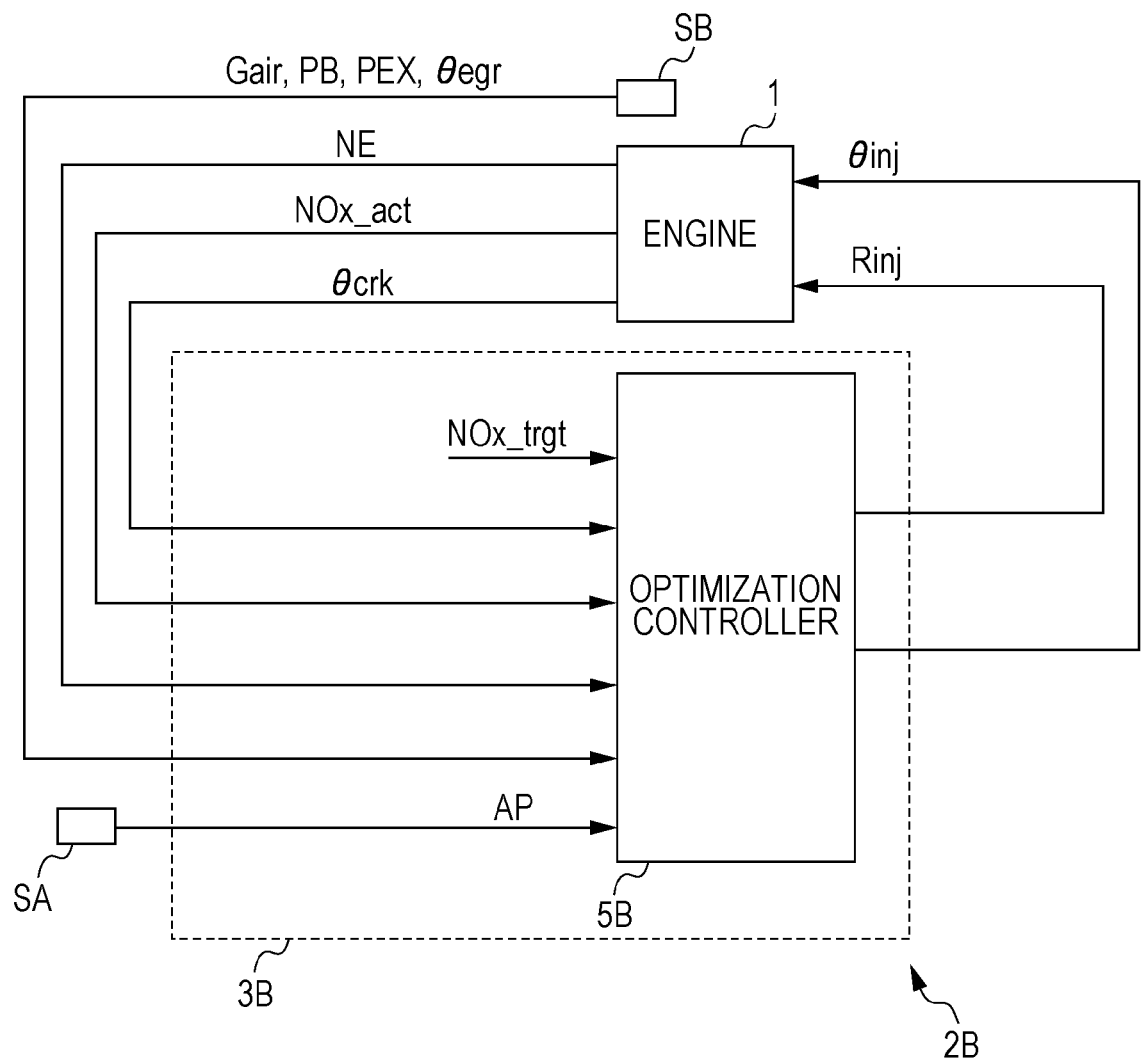
FIG. 26 is a block diagram of an engine and a control device for the engine according to a third embodiment of the present invention.

FIG. 26 is a block diagram of an engine 1 (i.e., a plant) and a control device 2B for the engine 1 according to the present embodiment. The control device 2B includes an NOx sensor (not shown), a crank angle position sensor (not shown), and an ECU 3B. The NOx sensor detects the amount of NOx (hereinafter referred to as feed NOx) exhausted from the engine 1. In the present embodiment, the ECU 3B includes an optimization controller 5B. The optimization controller 5B determines the fuel injection quantity Ginj, which is input to the fuel injection valve of the engine 1 at each combustion cycle, and the fuel injection split ratio Rinj for main fuel injection, which is input at each combustion cycle, at optimum values in order to control a detection value NOx act of the NOx sensor to be equal to or smaller than a maximum feed NOx target value NOx_trgt in accordance with the operation status of the engine 1.

According to the present embodiment, the following advantage is obtained in addition the advantages described above in (1) to (7).
(10) According to the present embodiment, temporary values of the fuel injection quantity Ginj and the fuel injection split ratio Rinj for the main fuel injection are corrected so that the estimated amount of NOx that is calculated by the combustion model when the temporary values are input to the combustion model does not exceed the maximum feed NOx target value NOx_trgt. Then, the fuel injection quantity Ginj and the fuel injection split ratio Rinj are determined based on the corrected temporary values, and input to the engine. Thus, for example, the amount of NOx exhausted from the engine is prevented from exceeding the maximum feed NOx target value NOx_trgt even under a transient condition. Therefore, the exhaust amount of NOx can be reduced and a load on the emission control device can be reduced.

Fourth Embodiment

Next, a fourth embodiment of the present invention will be described with reference to the drawings. In the following description of the fourth embodiment, the elements the same as those of the first embodiment will be denoted by the same numerals and the description of such elements will be omitted or shortened.

Figure 27:
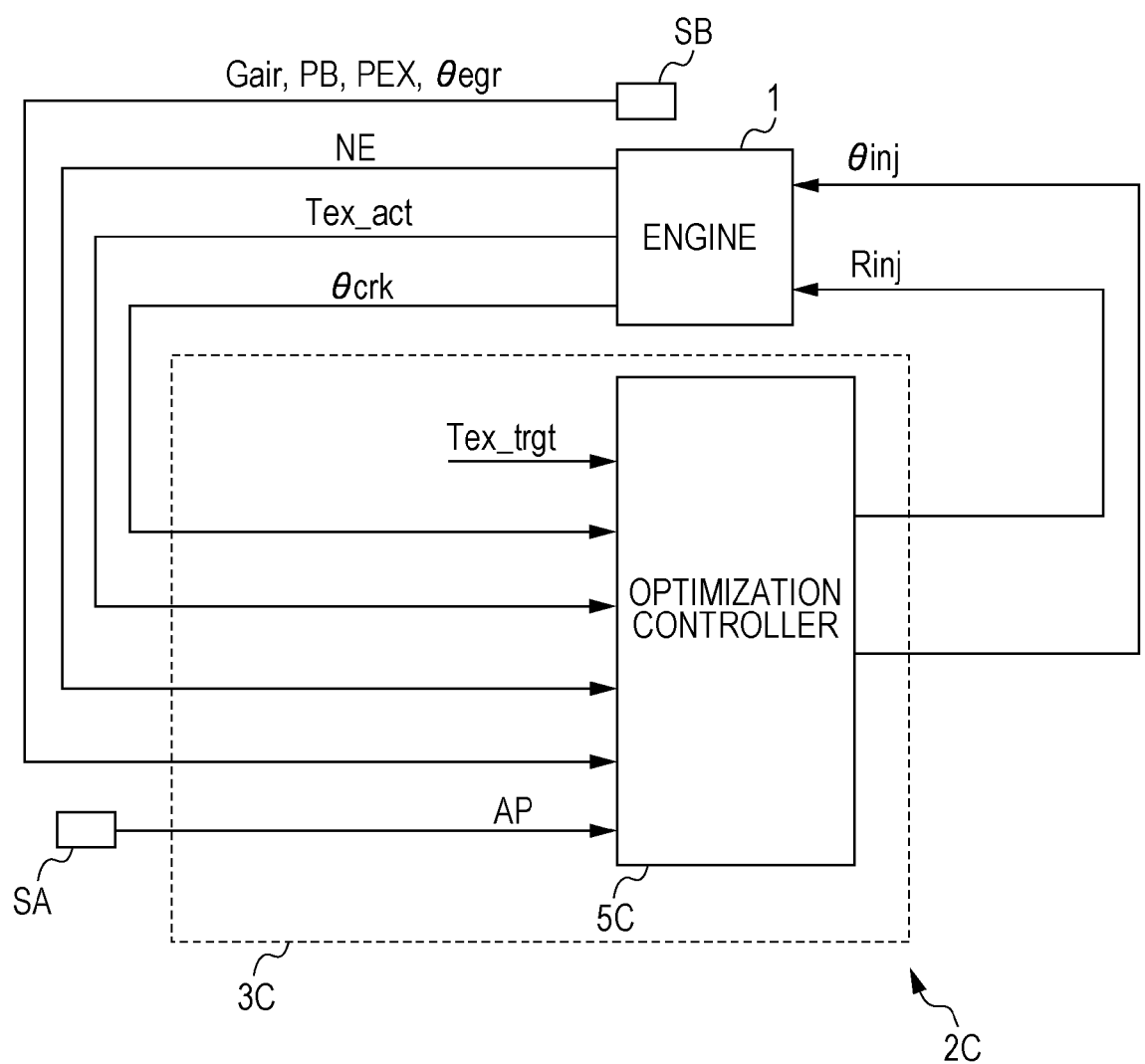
FIG. 27 is a block diagram of an engine and a control device for the engine according to a fourth embodiment of the present invention.

FIG. 27 is a block diagram of the engine 1 (i.e., a plant) and a control device 2C for the engine 1 according to the present embodiment. The control device 2C includes an exhaust temperature sensor (not shown), a crank angle position sensor (not shown), and an ECU 3C. The exhaust temperature sensor detects the temperature of gas that is exhausted from the engine 1. In the present embodiment, the ECU 3C includes an optimization controller 5C. The optimization controller 5C determines the fuel injection quantity Ginj, which is input to the fuel injection valve of the engine 1 at each combustion cycle, and the fuel injection split ratio Rinj for the main injection, which is input at each combustion cycle, at optimum values in order to perform control so as to maintain a detection value Tex_act of the exhaust temperature sensor to be at a target temperature Tex_trgt, which is set in accordance with the activation temperature of the catalytic converter disposed in the exhaust passage of the engine 1.

In the first embodiment, in order to prevent the maximum cylinder pressure Pmax from exceeding the target value Pmax_trgt, the deviation Pre_dPmax_i, which is input to the feedback controller of the combustion model-based controller, is defined as 0 as shown in expression (4-6) if the predicted value Pre_Pmax_i is smaller than the target value Pmax_trgt. In the present embodiment, in order to maintain the detection value Tex_act of the exhaust temperature at the target temperature Tex_trgt, the deviation Pre_dTex_i, which is input to the feedback controller of the combustion model-based controller, is defined as the difference between the predicted value Pre_Tex_i, which is the predicted value of the exhaust temperature that is calculated by the combustion model, and the target value Tex_trgt, as shown in the following expression (7-3) instead of expression (4-6).

$$Pre\_dTex\_i(q) = Pre\_Tex\_i(q) - Tex\_trgt \quad (7\text{-}3)$$

According to the present embodiment, the following advantage is obtained in addition to the advantages described above in (1) to (7).
(11) According to the present embodiment, temporary values of the fuel injection quantity Ginj and the fuel injection split ratio Rinj for the main fuel injection are corrected so that the estimated value of the exhaust temperature that is calculated by the combustion model when the temporary values are input to the combustion model does not deviate from the target temperature Tex_trgt. Then, the fuel injection quantity Ginj and the fuel injection split ratio Rinj are determined based on the corrected temporary values, and input to the engine. Thus, the exhaust temperature Tex_act is prevented from deviating from the target temperature Tex_trgt, whereby the conversion efficiency of the catalytic converter can be maintained at a high level.

In the present embodiment, the combustion model-based controllers may include, in addition to the combustion models for calculating the predicted values Pre_Tex_i (i=1 to N) of the exhaust gas temperature, combustion models for calculating the predicted values Pre_Ita_i (i=1 to N) of the combustion efficiency of the engine and combustion models for calculating the predicted values Pre_Gfuel_i (i=1 to N) of the fuel consumption of the engine. In this case, N combustion model-based controllers calculate the predicted fuel injection quantity correction values dGinj_i (i=1 to N) and the predicted fuel injection split ratios dRinj_i (i=1 to N). Among the calculated values and ratios, it is preferable that the optimum fuel injection quantity correction value dGinj_opt and the optimum fuel injection split ratio correction value dRinj_opt be respectively determined as the value and the ratio that are calculated by the controller with which the predicted value Pre_Ita_i of the combustion efficiency is the highest and by the controller with which the predicted value Pre_Gfuel_i of the fuel consumption is the lowest. Thus, fuel economy is improved while maintaining the exhaust temperature Tex_act at the target value Tex_trgt.

Fifth Embodiment

Next a fifth embodiment of the present invention will be described with reference to the drawings. In the following description of the fifth embodiment, the elements the same as those of the first embodiment will be denoted by the same numerals and the description of such elements will be omitted or shortened.

Figure 28:
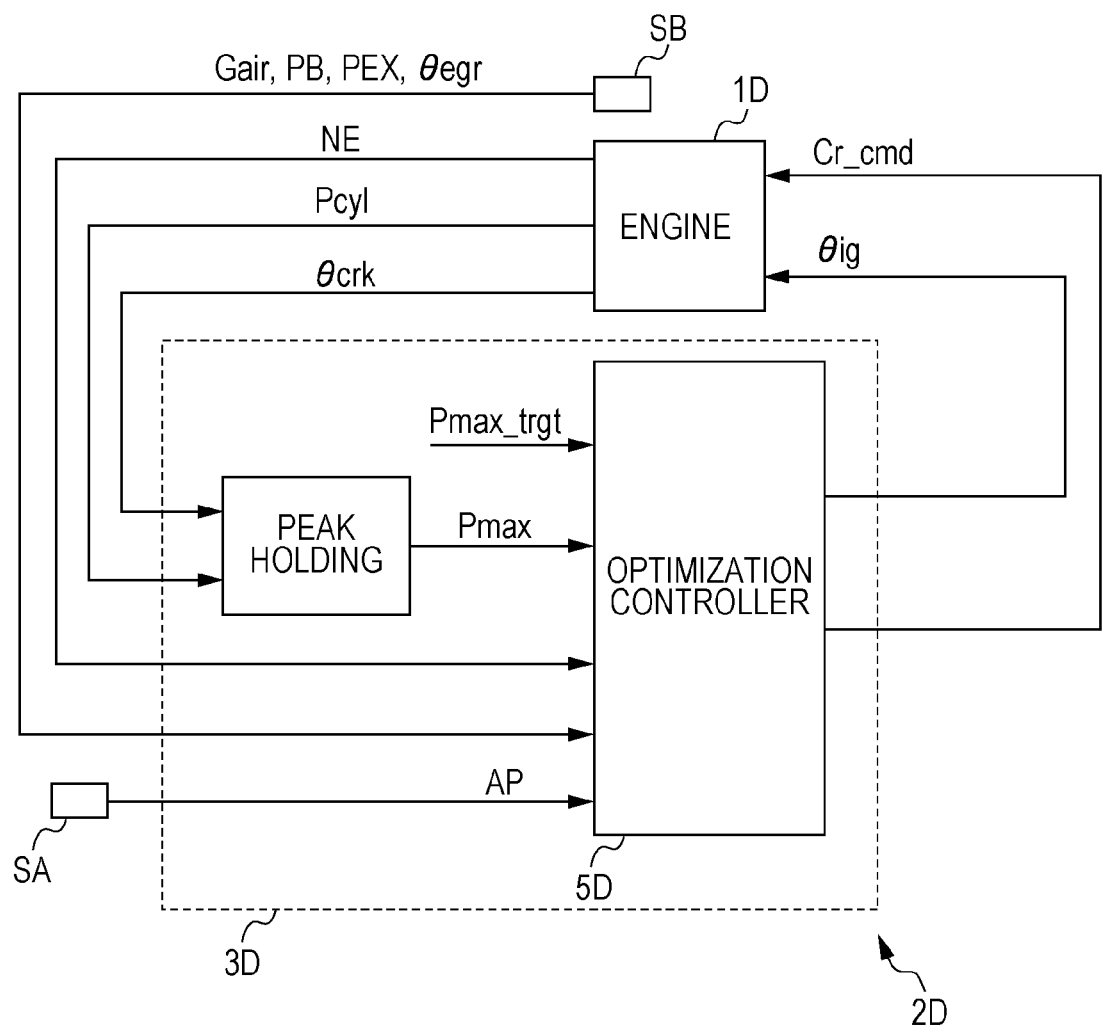
FIG. 28 is a block diagram of an engine and a control device for the engine according to a fifth embodiment of the present invention.

FIG. 28 is a block diagram of an engine 1D (i.e., a plant) and a control device 2D for the engine 1D according to the present embodiment. In the present embodiment, the engine 1D is a gasoline engine that includes a variable compression mechanism (not shown) for changing the compression ratio of the combustion chamber. In the present embodiment, an ECU 3D includes an optimization controller 5D. The optimization controller 5D determines the ignition timing θig of the engine 1D and the compression ratio command Cr_cmd for the variable compression mechanism at optimum values in order to control the maximum cylinder pressure Pmax to be equal to or lower than the target maximum cylinder pressure Pmax_trgt.

According to the present embodiment, the following advantage is obtained in addition to the advantages described above in (1) to (7).

(12) According to the present embodiment, temporary values of the ignition timing θig and the compression ratio command Cr_cmd are corrected so that the estimated value of the knock intensity that is calculated by the combustion model when the temporary values are input to the combustion model does not exceed the knock intensity target value Pknock_trgt. Then, the ignition timing θig and the compression ratio command Cr_cmd are determined based on the corrected temporary values, and input to the engine. Thus, fuel economy is improved while preventing the knock intensity Pknock from exceeding the knock intensity target value Pknock_trgt.

Sixth Embodiment

Next, a sixth embodiment of the present invention will be described with reference to the drawings. In the following description of the sixth embodiment, the elements the same as those of the fifth embodiment will be denoted by the same numerals, and the description of such elements will be omitted or shortened.

Figure 29:
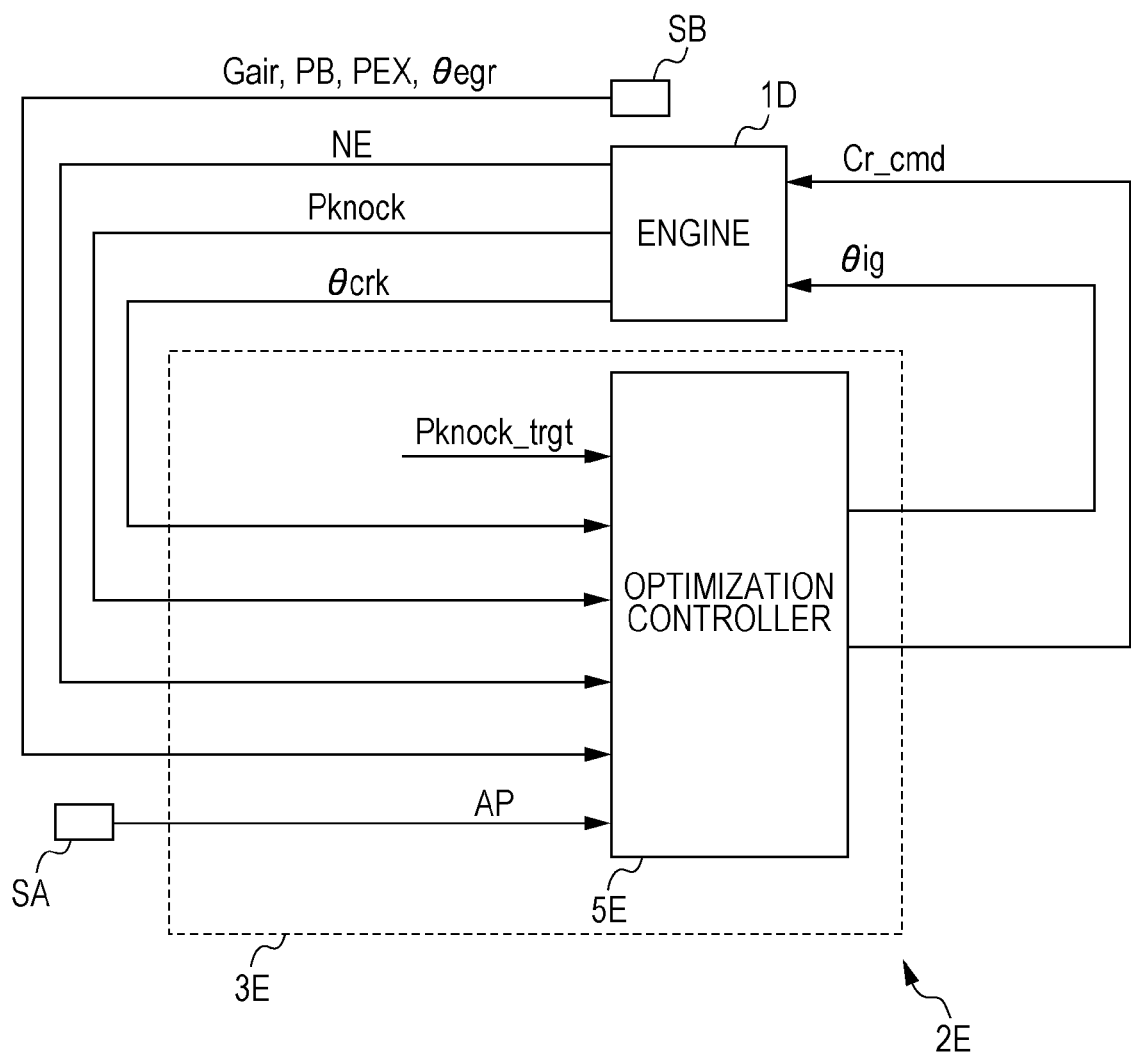
FIG. 29 is a block diagram of an engine and a control device for the engine according to a sixth embodiment of the present invention.
Figure 30:
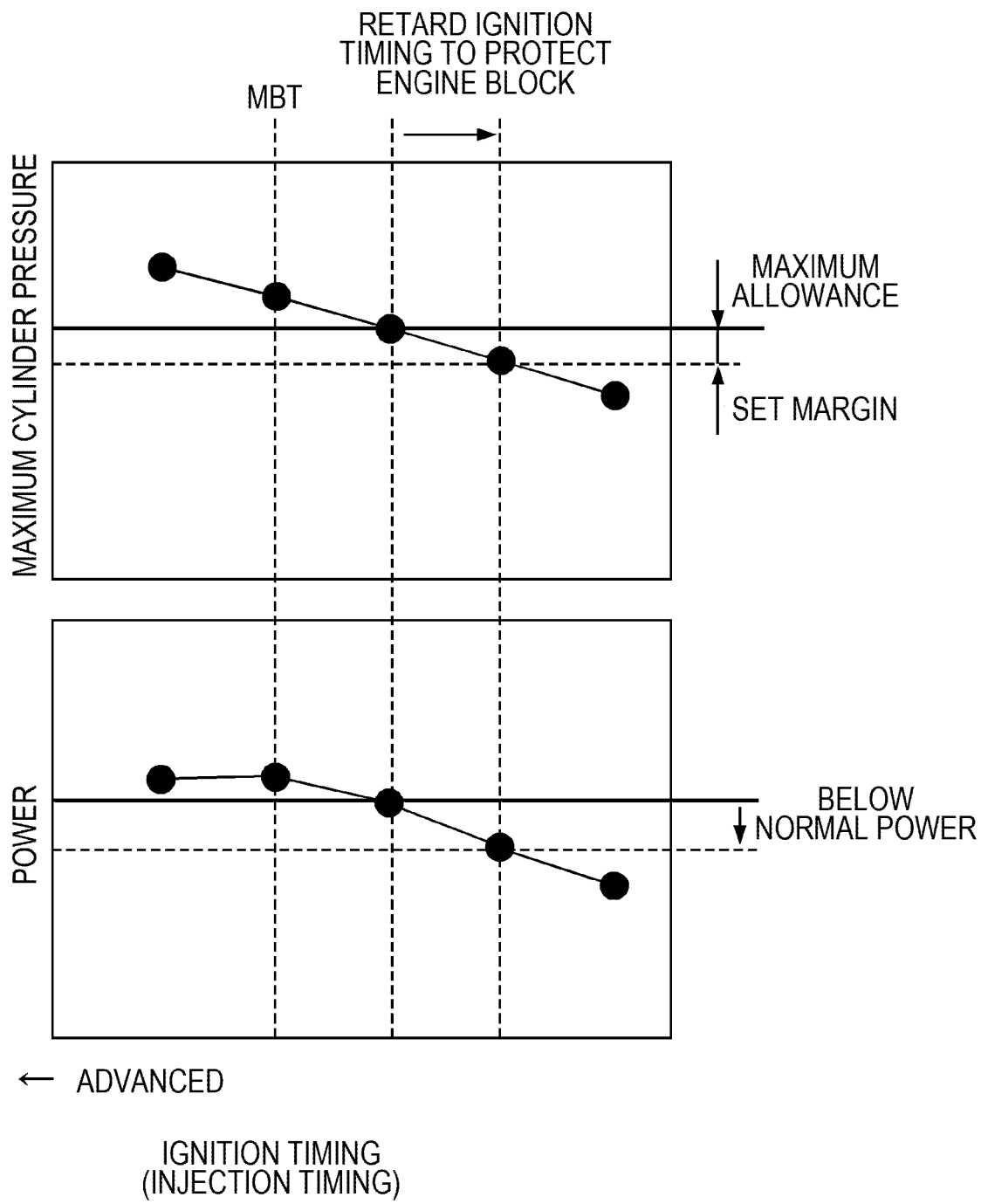
FIG. 30 is a schematic graph illustrating the relationship between the ignition (injection) timing and the engine power and the relationship between the ignition (injection) timing and the maximum cylinder pressure.

FIG. 29 is a block diagram of the engine 1D (i.e., a plant) and a control device 2E for the engine 1D according to the present embodiment. In the present embodiment, the control device 2E includes a knock sensor (not shown), a crank angle position sensor (not shown), and an ECU 3E. The knock sensor detects the knock intensity of the engine 1D. In the present embodiment, the ECU 3E includes an optimization controller 5E. The optimization controller 5E determines the ignition timing θig of the engine 1D and the compression ratio command Cr_cmd for the variable compression mechanism at optimum values in order to control the detection value Pknock of the knock sensor to be equal to or smaller than the knock intensity target value Pknock_trgt. According to the present embodiment, the advantages the same as those of the fifth embodiment are obtained.

The present invention is not limited to the embodiments described above, and can be modified in various ways.

In the embodiments described above, the combustion model is constructed on the basis a neural network, which excels at reproducing nonlinear dynamic characteristics. However, the present invention is not limited thereto. For example, sufficient advantages are obtained when the combustion model is constructed based on a physical model of the engine or a control map.

In the embodiments described above, the model adapter defines a weight function in a two dimensional space having the two reference parameters (engine speed, fuel injection quantity) as a basis, and calculates the adaptive correction coefficient KVNS by using the weight function. However, the present invention is not limited thereto. That is, the dimension of the space in which the weight function is defined and the physical quantities used as the reference parameters are not limited to those described in the embodiment. The dimension of the space may be, for example, one or higher than two. As the reference parameters, the other components of the input vector for the combustion model may be used. For example, any of the fuel injection timing θinj, the pilot fuel injection quantity Ginj_pi, the pilot fuel injection timing θinj_pi, the main fuel injection quantity Ginj_min, the after-fuel injection quantity Ginj_after, the after-fuel injection timing θinj_after, the air intake quantity Gair, the intake air pressure PB, the exhaust pressure PEX, and the EGR valve opening θegr may be used.

In the embodiments described above, the model adapter calculates the local correction coefficient Uij for each region by using a sliding mode control algorithm. However, the present invention is not limited thereto. For example, the local correction coefficient Uij for each region may be calculated by using a known feedback control algorithm, such as a backstepping control algorithm, a PID control algorithm, or an optimum control algorithm.

According to the embodiment of the invention, the control input determining unit corrects the temporary value of the control parameter so that the first control variable model value that is output from the plant model when the temporary value of the control parameter is input to the plant model satisfies the predetermined constraint. Moreover, the control input determining unit determines the control input for the plant on the basis the temporary value of the control parameter that is corrected so that the first control variable model value satisfies the constraint. Thus, the control input can be determined so that the first control variable always satisfies the constraint. Therefore, the plant model can determine the control input in a feed forward manner even when the actual value of the first control variable satisfies the constraint. As a result, the first control variable is prevented from temporarily deviating from the constraint due to a control delay. Conversely, control to make the first control variable satisfy the constraint is prevented from unnecessarily performed.

It is preferable that a second control variable model value be defined as an estimated value of a second control variable (for example, a predicted torque Pre_Trq_i) that is calculated by the plant model when a temporary value of the control parameter is input to the plant model, and that the control input determining unit include a plurality of optimizers (for example, N combustion model-based controllers 7_i (i=1 to N)) that correct the temporary value of the control parameter under different optimization conditions (for example, using different distribution coefficients We_i) so that the first control variable model value satisfies the constraint, and an optimum value selector (for example, an optimum input selector 8) that selects a temporary value of the control parameter, the temporary value making the second control variable model value best fit a predetermined priority condition (for example, a condition that the second control variable model is large), from corrected temporary values of the control parameter (for example, a predicted fuel injection timing correction value dθinj_i (i=1 to N) or a predicted fuel injection quantity correction value dGinj_i (i=1 to N)) that have been corrected by the plurality of optimizers, and determines the selected temporary value of the control parameter as the control input for the plant.

In this case, a plurality of optimizers correct the temporary value of the control parameter under different optimization conditions so that the first control variable model value satisfies the constraint. Then, the optimum value selector selects one of the temporary values of the control parameter, which have been corrected by the optimizers, at which the second control variable model value best fits the predetermined priority condition, and determines the selected temporary value as the control input for the plant. Thus, for example, when the control input is determined so that the first control variable satisfies the constraint, the second control variable of the plant is prevented from failing to satisfy the priority condition and causing a negative effect. That is, an undesired change in the second control variable is prevented while maintaining the first control variable at an appropriate level.

It is preferable that the plant model include a neural network including a plurality of neurons that are connected to each other, each of the neurons outputting a value in accordance with a predetermined function.

For example, a physical model represented by a difference equation or the like is used as the plant model, an excessively high load is required for performing calculation for the model. Therefore, a small computer such as an automobile computer may be unable to execute such calculation. Moreover, a physical model cannot estimate a complex elementary process of a plant that cannot be represented by mathematical formulas, so that the physical model has a large modeling error. Furthermore, a physical model includes a large number of indefinite model parameters for modeling. It is necessary to indentify the model parameters with appropriate values by experiment beforehand. In reality, however, many of the model parameters are nonlinearly combined, so that it is often difficult to perform the identification with an existing system identification theory. In contrast, with the embodiment of the present invention, a neural network is used as the plant model, so that precise calculation having only a small modeling error can be performed with calculation complexity that can be handled by an automobile computer. Although the neural network includes a large number of parameters, the neural network does not identify these parameters as model parameters having physical meanings. Therefore, the parameters can be set at appropriate values by using an existing method.

It is preferable that the control device further includes a first control variable detector (for example, a cylinder pressure sensor, an NOx sensor, an exhaust temperature sensor, or a knock sensor) that detects the first control variable; and a model corrector (for example, a model adapter 9) that adaptively corrects the plant model so as to reduce a deviation (for example, a model deviation E_Est) of a detection value of the first control variable from the estimated value of the first control variable, the estimated value being calculated by the plant model.

In this case, the model corrector adaptively corrects the plant model so as to reduce the deviation of the detection value of the first control variable from the estimated value of the first control variable that is calculated by the plant model. Thus, even if the plant has a problem due to deterioration or production variation, the estimated value of the first control variable that is calculated by the plant model can be always adjusted to the value of the first control variable of an actual plant, so that an appropriate control input can be determined irrespective of the deterioration or the production variation.

It is preferable that the control device further includes a first control variable detector that detects the first control variable; and a model corrector (for example, a model adapter 9) that calculates a correction coefficient (for example, an adaptive correction coefficient KVNS) so as to reduce a deviation (for example, a model deviation E_Est) of a detection value of the first control variable from the estimated value of the first control variable, the estimated value being calculated by the plant model, wherein the correction coefficient is included in an input (for example, an input vector U) for the neural network, the correction coefficient being used for adaptively correcting a correlation between the input and an output (for example, an output Y).

In this case, the model corrector calculates the correction coefficient, which is input to the neural network of the plat model, so as to reduce the deviation of the detection value of the first control variable from the estimated value of the first control variable that is calculated by the plant model. Thus, even if the plant has a problem due to deterioration or production variation, the estimated value of the first control variable that is calculated by the plant model can be always adjusted to the value of the first control variable of an actual plant, so that an appropriate control input can be determined irrespective of the deterioration or the production variation.

It is preferable that the control device further includes a first control variable detector that detects the first control variable; and a model corrector (for example, a model adapter 9) that calculates a correction coefficient so as to reduce the deviation (for example, a model deviation E_Est) of a detection value of the first control variable from the estimated value of the first control variable, the estimated value being calculated by the plant model, wherein the plant model calculates the first control variable based on the product or the sum of an output (for example, an output Y) of the neural network and the correction coefficient (for example, an adaptive correction coefficient KVNS).

In this case, the model corrector calculates the correlation coefficient, which is multiplied by or added to the output of the plant model, so as to reduce the deviation of the detection value of the first control variable from the estimated value of the first control variable that is calculated by the plant model. Thus, even if the plant has a problem due to deterioration or production variation, the estimated value of the first control variable that is calculated by the plant model can be always adjusted to the value of the first control variable of an actual plant, so that an appropriate control input can be determined irrespective of the deterioration or the production variation. As described above, when inputting the correction coefficient to a neural network (in the case where the neural network is of an input-correction type), it is necessary for the neural network to learn beforehand, through the correction coefficient, changes in the characteristics of a plant, such as the deterioration or the production variation of the plant. Therefore, if the plant undergoes a change that is unexpected in the learning process, the correction coefficient may not be able to compensate for a modeling error. In contrast, when the correction coefficient is added to or multiplied by the output of the neural network (in the case where the neural network is an output-correction type), it is not necessary to for the neural network to learn beforehand such changes in the characteristics of the plant. Therefore, even if the plant undergoes an unexpected change as described above, a modeling error can be compensate for with comparatively high precision. That is, the output-correction type has a higher robustness than the input-correction type with respect to a static change in characteristics, while the input-correction type has a higher robustness than the output-correction type with respect to a dynamic change in characteristics.

It is preferable that a reference parameter (for example, a fuel injection quantity Ginj or an engine speed NE,) including at least one of inputs for the plant model be defined, and the model corrector include a weight function setting unit (for example, a weight function setter 922) that defines a plurality of regions that overlap each other in a space having the reference parameter as a basis, and sets a plurality of weight functions (for example, weight functions Wij) in respective regions, the weight functions being normalized and having nonzero values in the regions, a correction value calculation unit (for example, a local correction coefficient calculator 923) that calculates a correction value for each of the regions so as to minimize the product of the value of the weight function and the deviation, and a determination unit (for example, a correction coefficient calculator 924) that determines the correction coefficient based on the sum of the products of the values of the weight functions and the correlation coefficient over all of the regions.

In this case, a plurality of regions are defined in a space having the reference parameter as a basis, and weight functions are set for respective regions. For each region, a correction value is calculated so as to minimize the product of the weight function and the deviation. A correction coefficient is determined based on the sum of the product of the weight function and the correction value. The effect of the deterioration and the production variation of the plant on the error in the estimated value of the first control variable differs in accordance with the state of the plant. With this structure, the correction value is calculated for each region in the space having the reference parameter, which represent the state of the plant, as a basis. Therefore, the correction coefficient can be determined with consideration of the error that varies in accordance with the state of the plant.

It is preferable that the plant be an internal combustion engine, the first control variable be a maximum cylinder pressure for each combustion cycle of the internal combustion engine, the control parameter include a fuel injection quantity (for example, a fuel injection quantity Ginj) for each combustion cycle of the internal combustion engine and a fuel injection timing (for example, a fuel injection timing $\theta$inj), and the constraint be that the first control variable model value is equal to or smaller than a predetermined upper limit (for example, a target maximum cylinder pressure Pmax_trgt).

In this case, the temporary values of the fuel injection quantity and the fuel injection timing are corrected so that the estimated value of the maximum cylinder pressure that is calculated by the plant model when the temporary values are input to the plant model does not exceed the upper limit. Then, the fuel injection quantity and the fuel injection timing are determined based on the corrected temporary values, and input to the internal combustion engine. Thus, the maximum cylinder pressure is prevented from exceeding the upper limit, whereby the strength of the engine block of the internal combustion engine can be maximally utilized.

It is preferable that wherein the plant be an internal combustion engine, the first control variable be a maximum cylinder pressure for each combustion cycle of the internal combustion engine, the control parameter include a fuel injection quantity (for example, a fuel injection quantity Ginj) for each combustion cycle of the internal combustion engine and a split injection ratio (for example, a fuel injection split ratio Rinj) for main fuel injection, and the constraint is that the first control variable model value be equal to or smaller than a predetermined upper limit (for example, a target maximum cylinder pressure Pmax_trgt).

In this case, the temporary values of the fuel injection quantity and the split fuel injection ratio of the main fuel injection are corrected so that the estimated value of the maximum cylinder pressure that is calculated by the plant model when the temporary values are input to the plant model does not exceed the upper limit. Then, the fuel injection quantity and the split fuel injection ratio are determined based on the corrected temporary values, and input to the internal combustion engine. Thus, the maximum cylinder pressure is prevented from exceeding the upper limit, whereby the strength of the engine block of the internal combustion engine can be maximally utilized.

It is preferable that the plant be an internal combustion engine, the first control variable be an amount of NOx exhausted from the internal combustion engine, the control parameter include a fuel injection timing (for example, a fuel injection timing $\theta$inj) for each combustion cycle of the internal combustion engine and a split injection ratio (for example, a fuel injection split ratio Rinj) for main fuel injection, and the constraint be that the first control variable model value is equal to or smaller than an upper limit (for example, a maximum feed NOx target value NOx_trgt) that is set in accordance with an operation state of the internal combustion engine.

Emission control devices that have been developed in recent years can remove most of NOx that is exhausted from an internal combustion engine. However, in order to reduce NOx emission further and reduce a load on the emission control device, it is necessary to reduce the amount of NOx exhausted from the internal combustion engine. For this purpose, an NOx detector may be provided to detect the amount of NOx exhausted from an internal combustion engine, and feedback control may be performed so that the output of the NOx detector does not exceed the upper limit. However, with this method, a control delay occurs as described above, and the amount of NOx may temporarily exceed the upper limit. In particular, under a transient condition, such an increase in the amount of NOx frequently occurs. In the case described above, the temporary values of the fuel injection quantity and the split fuel injection ratio of the main fuel injection are corrected so that the estimated value of the amount of NOx that is calculated by the plant model when the temporary values are input to the plant model does not exceed the upper limit. Then, the fuel injection quantity and the split fuel injection ratio are determined based on the corrected temporary values, and input to the internal combustion engine. Thus, the amount of NOx that is exhausted from the internal combustion engine is prevented from exceeding the upper limit even under a transient condition, whereby the amount of NOx that is exhausted can be reduced and a load on the emission control device can be reduced.

It is preferable that the plant be an internal combustion engine including a catalytic converter disposed in an exhaust passage thereof, the catalytic converter purifying exhaust gas, the first control variable be a temperature of the internal combustion engine, the control parameter include a fuel injection timing (for example, a fuel injection timing $\theta$inj) for each combustion cycle of the internal combustion engine and a split injection ratio (for example, a fuel injection split ratio Rinj) for a main fuel injection, and the constraint be that the first control variable model value is close to a target temperature (for example, a target exhaust temperature Tex_trgt) that is set in accordance with an activation temperature of the exhaust purifying catalyst.

Catalytic converters for a lean burn internal combustion engine that have been developed in recent years can maintain a high conversion efficiency only in a very small range of catalyst temperature. In recent years, in order to maintain the catalyst temperature to be at an appropriate level and thereby maintain a high conversion efficiency, control may be performed so as to maintain the exhaust temperature of the internal combustion engine to be close to a target temperature that is set in accordance with an activation temperature of the catalyst. Therefore, an exhaust temperature detector for detecting the exhaust temperature of an internal combustion engine may be provided, and feedback control may be performed so that the output of the exhaust temperature sensor does not deviate from the target temperature. However, with this method, a control delay may occur as described above, and the exhaust temperature may deviate from the target value. In the case described above, the temporary values of the fuel injection quantity and the split fuel injection ratio of the main fuel injection are corrected so that the estimated value of the exhaust temperature that is calculated by the plant model when the temporary values are input to the plant model does not deviate from the target value. Then, the fuel injection quantity and the split fuel injection ratio are determined based on the corrected temporary values, and input to the internal combustion engine. Thus, the exhaust temperature is prevented from deviating from the target value, whereby the conversion efficiency of the catalytic converter can be maintained at a high level.

When the exhaust temperature increases, the combustion efficiency of the internal combustion engine decreases. Therefore, an object of an exhaust temperature control is to maintain a high conversion efficiency while providing an improved fuel economy. In general, the exhaust temperature is significantly affected by the burning velocity of the internal combustion engine. The burning velocity varies in accordance with various factors: the property of fuel, variation in the flow rate of the EGR valve or deterioration of the EGR valve, variation in the characteristics of the supercharger and deterioration of the supercharger, and the like. In the case described above, the model corrector adaptively corrects the plant model, whereby the catalyst conversion efficiency can be maintained at a high level and an improved fuel economy is provided even if such a change in characteristics occurs.

It is preferable that the plant be an internal combustion engine including a variable compression mechanism capable of changing a compression ratio in a combustion chamber, the first control variable be a maximum cylinder pressure for each combustion cycle of the internal combustion engine, the control parameter include an ignition timing (for example, an ignition timing θinj) for each combustion cycle of the internal combustion engine and a compression ratio command (for example, a compression ratio command Cr_cmd) to the variable compression mechanism, and the constraint be that the first control variable model value is equal to or smaller than a predetermined upper limit (for example, a target maximum cylinder pressure Pmax_trgt).

By increasing the compression ratio using a variable compression mechanism, the fuel economy of an internal combustion engine is improved irrespective of whether the engine is an gasoline engine or a diesel engine. However, if the internal combustion engine is a gasoline engine, a knock often occurs under a high load condition. If the internal combustion engine is a diesel engine, the maximum cylinder pressure tends to increase. Therefore, for an internal combustion engine having a variable compression mechanism, it is necessary to improve the fuel economy while preventing occurrence of excessive knock and an excessively high maximum cylinder pressure. In the case described above, temporary values of the ignition timing of the internal combustion engine and the compression ratio command are corrected so that the estimated value of knock intensity that is calculated by the plant model when the temporary values are input to the plant model does not exceed the upper limit. Then, the ignition timing and the compression ratio command are determined based on the corrected temporary values, and input to the internal combustion engine. Thus, fuel economy can be improved while preventing the knock intensity from exceeding the upper limit.

In general, a variable compression mechanism detects the compression ratio of an internal combustion engine based on the displacement or the angle of a portion of the mechanism, so that an error due to deterioration or production variation often occurs. In the case described above, the model corrector adaptively corrects the plant model, whereby occurrence of excessive knock is prevented while improving the fuel economy, even when such as change in characteristics occurs.

It is preferable that the plant be an internal combustion engine including a variable compression mechanism capable of changing a compression ratio in a combustion chamber, the first control variable be a knock intensity of the internal combustion engine, the control parameter include an ignition timing (for example, an ignition timing θinj) of the internal combustion engine and a compression ratio command (for example, a compression ratio command Cr_cmd) to the variable compression mechanism, and the constraint be that the first control variable model value is equal to or smaller than a predetermined upper limit (for example, a knock intensity target value Pknock_trgt).

Obviously, numerous modifications and variations of the present invention are possible in light of the above teachings. It is therefore to be understood that within the scope of the appended claims, the invention may be practiced otherwise than as specifically described herein.

What is claimed is:

1. A plant control apparatus comprising:
a plant model to estimate a control variable of a plant based on an input including a control parameter to adjust a first control variable of the plant, the first control variable model value being defined as an estimated value of the first control variable calculated by the plant model when the temporary value of the control parameter is input to the plant model;
an optimizer configured to correct a temporary value of the control parameter at a first cycle so that a first control variable model value satisfies a predetermined constraint; and
a control input determining device configured to determine a control input for the plant based on the temporary value of the control parameter that has been corrected, the control input determining device configured to determine the control input at a second cycle, the first cycle being shorter than the second cycle so that the optimizer corrects the temporary value of the control parameter a plurality of times during the second cycle.

2. The plant control apparatus according to claim 1, wherein a second control variable model value is defined as an estimated value of a second control variable that is calculated by the plant model when a temporary value of the control parameter is input to the plant model, and wherein the plant control apparatus includes
a plurality of the optimizers configured to correct the temporary value of the control parameter under different optimization conditions so that the first control variable model value satisfies the predetermined constraint, and
an optimum value selector configured to select a temporary value of the control parameter, the temporary value making the second control variable model value best fit a predetermined priority condition, from corrected temporary values of the control parameter that have been corrected by the plurality of the optimizers, and configured to determine a selected temporary value of the control parameter as the control input for the plant.

3. The plant control apparatus according to claim 1,
wherein the plant model includes a neural network including a plurality of neurons connected to each other, each of the neurons outputting a value in accordance with a predetermined function.

4. The plant control apparatus according to claim 1, further comprising:
a first control variable detector configured to detect the first control variable; and
a model corrector configured to adaptively correct the plant model so as to reduce a deviation of a detection value of the first control variable from the estimated value of the first control variable, the estimated value being calculated by the plant model.

5. The plant control apparatus according to claim 3, further comprising:
a first control variable detector configured to detect the first control variable; and
a model corrector configured to calculate a correction coefficient so as to reduce a deviation of a detection value of the first control variable from the estimated value of the first control variable, the estimated value being calculated by the plant model,
wherein the correction coefficient is included in an input for the neural network, the correction coefficient being used for adaptively correcting a correlation between the input and an output.

6. The plant control apparatus according to claim 3, further comprising:
a first control variable detector configured to detect the first control variable; and
a model corrector configured to calculate a correction coefficient so as to reduce the deviation of a detection value of the first control variable from the estimated value of the first control variable, the estimated value being calculated by the plant model,
wherein the plant model is configured to calculate the first control variable based on a product or a sum of an output of the neural network and the correction coefficient.

7. The plant control apparatus according to claim 5,
wherein a reference parameter including at least one of inputs for the plant model is defined, and
wherein the model corrector includes
a weight function setting device to define a plurality of regions that overlap each other in a space having the reference parameter as a basis, and to set a plurality of weight functions in respective regions, the weight functions being normalized and having nonzero values in the regions,
a correction value calculator configured to calculate a correction value for each of the regions so as to minimize the product of a value of the weight function and the deviation, and
a determination device configured to determine the correction coefficient based on a sum of products of values of the weight functions and the correlation coefficient over all of the regions.

8. The plant control apparatus according to claim 1,
wherein the plant comprises an internal combustion engine,
wherein the first control variable comprises a maximum cylinder pressure for each combustion cycle of the internal combustion engine,
wherein the control parameter includes a fuel injection quantity for each combustion cycle of the internal combustion engine and a fuel injection timing, and
wherein the predetermined constraint is that the first control variable model value is equal to or smaller than a predetermined upper limit.

9. The plant control apparatus according to claim 1,
wherein the plant comprises an internal combustion engine,
wherein the first control variable comprises a maximum cylinder pressure for each combustion cycle of the internal combustion engine,
wherein the control parameter includes a fuel injection quantity for each combustion cycle of the internal combustion engine and a split injection ratio for main fuel injection, and
wherein the predetermined constraint is that the first control variable model value is equal to or smaller than a predetermined upper limit.

10. The plant control apparatus according to claim 1,
wherein the plant comprises an internal combustion engine,
wherein the first control variable comprises an amount of NOx exhausted from the internal combustion engine,
wherein the control parameter includes a fuel injection timing for each combustion cycle of the internal combustion engine and a split injection ratio for main fuel injection, and
wherein the predetermined constraint is that the first control variable model value is equal to or smaller than an upper limit set in accordance with an operation state of the internal combustion engine.

11. The plant control apparatus according to claim 1,
wherein the plant comprises an internal combustion engine including a catalytic converter disposed in an exhaust passage thereof, the catalytic converter purifying exhaust gas,
wherein the first control variable comprises a temperature of the internal combustion engine,
wherein the control parameter includes a fuel injection timing for each combustion cycle of the internal combustion engine and a split injection ratio for a main fuel injection, and
wherein the predetermined constraint is that the first control variable model value is close to a target temperature set in accordance with an activation temperature of the exhaust purifying catalyst.

12. The plant control apparatus according to claim 1,
wherein the plant comprises an internal combustion engine including a variable compression mechanism capable of changing a compression ratio in a combustion chamber,
wherein the first control variable comprises a maximum cylinder pressure for each combustion cycle of the internal combustion engine,
wherein the control parameter includes an ignition timing for each combustion cycle of the internal combustion engine and a compression ratio command to the variable compression mechanism, and
wherein the predetermined constraint is that the first control variable model value is equal to or smaller than a predetermined upper limit.

13. The plant control apparatus according to claim 1,
wherein the plant comprises an internal combustion engine including a variable compression mechanism capable of changing a compression ratio in a combustion chamber,
wherein the first control variable is a knock intensity of the internal combustion engine, wherein the control parameter includes an ignition timing of the internal combustion engine and a compression ratio command to the variable compression mechanism, and wherein the predetermined constraint is that the first control variable model value is equal to or smaller than a predetermined upper limit.

14. The plant control apparatus according to claim 2, wherein the plant model includes a neural network including a plurality of neurons connected to each other, each of the neurons outputting a value in accordance with a predetermined function.

15. The plant control apparatus according to claim 2, further comprising:
    a first control variable detector configured to detect the first control variable; and
    a model corrector configured to adaptively correct the plant model so as to reduce a deviation of a detection value of the first control variable from the estimated value of the first control variable, the estimated value being calculated by the plant model.

16. The plant control apparatus according to claim 3, further comprising:
    a first control variable detector configured to detect the first control variable; and
    a model corrector configured to adaptively correct the plant model so as to reduce a deviation of a detection value of the first control variable from the estimated value of the first control variable, the estimated value being calculated by the plant model.

17. The plant control apparatus according to claim 14, further comprising:
    a first control variable detector configured to detect the first control variable; and
    a model corrector configured to adaptively correct the plant model so as to reduce a deviation of a detection value of the first control variable from the estimated value of the first control variable, the estimated value being calculated by the plant model.

18. The plant control apparatus according to claim 14, further comprising:
    a first control variable detector configured to detect the first control variable; and
    a model corrector configured to calculate a correction coefficient so as to reduce a deviation of a detection value of the first control variable from the estimated value of the first control variable, the estimated value being calculated by the plant model,
    wherein the correction coefficient is included in an input for the neural network, the correction coefficient being used for adaptively correcting a correlation between the input and an output.

19. The plant control apparatus according to claim 14, further comprising:
    a first control variable detector configured to detect the first control variable; and
    a model corrector configured to calculate a correction coefficient so as to reduce the deviation of a detection value of the first control variable from the estimated value of the first control variable, the estimated value being calculated by the plant model,
    wherein the plant model is configured to calculate the first control variable based on a product or a sum of an output of the neural network and the correction coefficient.

20. A plant control apparatus comprising:
    plant model means for estimating a control variable of a plant based on an input including a control parameter to adjust a first control variable of the plant, the first control variable model value being defined as an estimated value of the first control variable calculated by the plant model means when the temporary value of the control parameter is input to the plant model;
    optimizer means for correcting a temporary value of the control parameter at a first cycle so that a first control variable model value satisfies a predetermined constraint; and
    control input determining means for determining a control input for the plant based on the temporary value of the control parameter that has been corrected, the control input determining means determining the control input at a second cycle, the first cycle being shorter than the second cycle so that the optimizer means corrects the temporary value of the control parameter a plurality of times during the second cycle.

* * * * *